(12) United States Patent
Sadananda et al.

(10) Patent No.: US 8,463,122 B2
(45) Date of Patent: Jun. 11, 2013

(54) QUALITY OF SERVICE IN AN OPTICAL NETWORK

(75) Inventors: Santosh Kumar Sadananda, San Jose, CA (US); Christopher M. Look, Pleasanton, CA (US); Jeffery J. Maki, Fremont, CA (US)

(73) Assignee: Dynamic Method Enterprise Limited, Hong Kong (HK)

( * ) Notice: Subject to any disclaimer, the term of this patent is extended or adjusted under 35 U.S.C. 154(b) by 0 days.

(21) Appl. No.: 13/584,655

(22) Filed: Aug. 13, 2012
(Under 37 CFR 1.47)

(65) Prior Publication Data
US 2013/0039651 A1    Feb. 14, 2013

Related U.S. Application Data

(62) Division of application No. 11/921,620, filed as application No. PCT/US2006/021986 on Jun. 6, 2006, now Pat. No. 8,244,127.

(60) Provisional application No. 60/688,166, filed on Jun. 6, 2005.

(51) Int. Cl.
*H04B 10/08* (2006.01)

(52) U.S. Cl.
USPC .................. 398/29; 398/27; 398/26; 398/25; 398/34

(58) Field of Classification Search
USPC .................... 398/29, 27, 26, 25, 34
See application file for complete search history.

(56) References Cited

U.S. PATENT DOCUMENTS

| | | | |
|---|---|---|---|
| 5,351,146 | A | 9/1994 | Chan et al. |
| 5,781,537 | A | 7/1998 | Ramaswami et al. |
| 5,914,798 | A | 6/1999 | Liu |
| 6,069,894 | A | 5/2000 | Holender et al. |
| 6,111,673 | A | 8/2000 | Chang et al. |
| 6,266,170 | B1 | 7/2001 | Fee |

(Continued)

FOREIGN PATENT DOCUMENTS

| | | |
|---|---|---|
| WO | PCT/US04/17735 | 11/2004 |
| WO | PCT/US04/17845 | 1/2005 |

OTHER PUBLICATIONS

Lang, et al., "Link Management Protocol", draft-ietf-mpls-lmp-02.txt, 2001.

(Continued)

*Primary Examiner* — Kinam Park
(74) *Attorney, Agent, or Firm* — Blakely, Sokoloff, Taylor & Zafman LLP

(57) ABSTRACT

A method and apparatus for performing a path based quality check for a specified bit rate in a wavelength division multiplexing optical network is described. According to one embodiment of the invention, a method selects from a database one of the available paths as a currently selected path. The database stores a representation of the available paths from an access node of the optical network to other access nodes of the optical network. The method further determines a cumulative noise, cumulative chromatic dispersion, and a maximum allowable chromatic dispersion for the currently selected path. In addition, the method determines whether the currently selected path passes the path based quality check based on whether the cumulative noise is less than the maximum allowable noise at a specific bit rate and whether the chromatic dispersion is less than the maximum allowable chromatic dispersion at the specified bit rate.

5 Claims, 21 Drawing Sheets

U.S. PATENT DOCUMENTS

| | | | |
|---|---|---|---|
| 6,304,349 | B1 | 10/2001 | Alanyali et al. |
| 6,445,844 | B1 | 9/2002 | Neukermans et al. |
| 6,738,354 | B1 | 5/2004 | Ashwood Smith |
| 6,741,572 | B1 | 5/2004 | Graves et al. |
| 6,760,549 | B2 | 7/2004 | Chang et al. |
| 6,791,948 | B1 | 9/2004 | Desnoyers et al. |
| 6,889,011 | B1 | 5/2005 | Fee et al. |
| 6,917,759 | B2 | 7/2005 | de Boer et al. |
| 6,987,899 | B2 | 1/2006 | Fukashiro et al. |
| 7,013,084 | B2 | 3/2006 | Battou et al. |
| 7,020,394 | B2 | 3/2006 | Zhang et al. |
| 7,039,009 | B2 | 5/2006 | Chaudhuri et al. |
| 7,065,580 | B1 | 6/2006 | Eberle et al. |
| 7,171,124 | B2 | 1/2007 | Smith et al. |
| 7,249,169 | B2 | 7/2007 | Blouin et al. |
| 7,283,741 | B2 | 10/2007 | Sadananda |
| 7,286,756 | B1 | 10/2007 | Marshall et al. |
| 7,327,683 | B2 | 2/2008 | Ogier et al. |
| 2002/0018264 | A1 | 2/2002 | Kodialam et al. |
| 2002/0030864 | A1 | 3/2002 | Chaudhuri et al. |
| 2002/0097671 | A1 | 7/2002 | Doverspike et al. |
| 2002/0118647 | A1 | 8/2002 | Maeno |
| 2002/0120766 | A1 | 8/2002 | Okajima et al. |
| 2002/0126343 | A1 | 9/2002 | Fumagalli et al. |
| 2002/0154357 | A1 | 10/2002 | Ozveren et al. |
| 2002/0186432 | A1 | 12/2002 | Roorda et al. |
| 2002/0194339 | A1 | 12/2002 | Lin et al. |
| 2002/0196808 | A1 | 12/2002 | Karri et al. |
| 2003/0009582 | A1 | 1/2003 | Qiao et al. |
| 2003/0016414 | A1* | 1/2003 | Solheim et al. ............... 359/127 |
| 2003/0020982 | A1 | 1/2003 | Rychlicki et al. |
| 2003/0035166 | A1 | 2/2003 | Zhang et al. |
| 2003/0043427 | A1 | 3/2003 | Robidas et al. |
| 2003/0065811 | A1 | 4/2003 | Lin et al. |
| 2003/0074443 | A1 | 4/2003 | Melaku et al. |
| 2003/0090995 | A1 | 5/2003 | Illikkal et al. |
| 2003/0172356 | A1 | 9/2003 | Pulkkinen et al. |
| 2003/0198227 | A1 | 10/2003 | Matsuura et al. |
| 2004/0190019 | A1 | 9/2004 | Li et al. |
| 2004/0228323 | A1 | 11/2004 | Acharya et al. |
| 2005/0243375 | A1 | 11/2005 | Ohyama et al. |

OTHER PUBLICATIONS

S. Sengupta et al., "Analysis of Enhanced OSPF for Routing Lightpaths in Optical Mesh Networks," IEEE 2002.
Moy, RFC-2328, "OSPF Version 2," IETF, Apr. 1998.
"Telecommunication System Engineering" by R. Freeman, John Wiley & Sons, 1980, pp. 99-103.
"Graph Theory with Applications to Engineering and Computer Science" by N. Deo, Prentice-Hall, 1974.
Jukan et al., Service-Specific Wavelength Allocation in QoS-Routed Optical Networks. IEEE 1998, pp. 2272.
Braden et al., RFC-2205. Resource Reservation Protocol (RSVP)—Version 1 Functional Specification. IETF, Sep. 1997, pp. 34-35.
Francisco et al., End-to-End Signaling and Routing for Optical IP Networks. IEEE 2002, Fig. 5.
Postel, RFC-791, Internet Protocol, IETF Sep. 1981, pp. 16.
A. Shami et al., "Performance Evaluation of Two GMPLS-Based Distributed Control and Management Protocols for Dynamic Lightpath Provisioning in Future IP Networks," ICC 2002, Apr. 28-May 2, 2002.
Optical Networking and Real-Time Provisioning: An Integrated Vision for the Next-Generation Internet; Chadi Assi, Abdallah Shami, and Mohamed Al. Ali, dated Jul./Aug. 2001 (pp. 36-45).
Inference of Shared Risk Link Groups, Internet Working Group, Internet Draft, Document: draft-many-inference-srlg-01.txt, Category: Internet Draft, Expires: Jan. 2002; D. Papadimitriou, F. Poppe, J. Jones, S. Venkatachalam Alcatel, S. Dharanikota, R. Jain, Nayna Networks, R. Hartani, Caspian Networks, D. Griffith, NIST, Yong Xue, UUNet, Jul. 2001 (32 pages).
Inter-domain routing with Shared Risk Groups, draft-many-ccamp-srg-01.txt, CCAMP Working Group, Internet Draft, Document: draft-many-ccamp-srg-00.txt, Category: Internet Draft, Expires: Jun. 2002; S. Dharanikota, R. Jain (Nayna), D. Papadimitriou (Alcatel), R. Hartani (Cespian Networks), G. Bernstein (Ciena), V. Sharma (Metanoia), C. Brownmiller, Y. Xue (Worldcom), Dec. 2001 (32 pages).
Cisco MPLS Tunnel Builder Pro, Cisco Systems, Inc., 1992-2002 (10 pages).
International Telecommunication Union, ITU-T G.7715/Y.1706 (Jun. 2002), Series G: Transmission Systems and Media, Digital Systems and Networks, Digital terminal equipments—Operations, administration and maintenance features of transmission equipment, Series Y: Global Information Infrastructure and Internet Protocol Aspects, Internet protocol aspects—Operation, administration and maintenance, Architecture and requirements for routing in the automatically switched optical networks, ITU-T Recommendation G7715/Y.1706 (35 pages).
Effectiveness of Shared Risk Link Group Auto-Discovery in Optical Networks, Panagiotis Sebos, Jennifer Yates, Dan Rubenstein and Albert Greenberg 2000 (3 pages).
Survivable Networks Algorithms for Diverse Routing by Ramesh Bhandari, Ph.D, AT&T Laboratories, New Jersey, Kluwer Academic Publishers, Boston/Dordrecht/London 1999 (in it's entirety).
Standards Report, Standards Update: Routing for Optical Networks, Greg Bernstein, Grotto Networking, and Lyndon Ong, Ciena Corp., IEEE Optical Communications, Aug. 2003 (p. S4 and S6).
T.E. Stern and Krishna Bala, "Wavelength/Waveband Routed Networks", Multipwavelength Optical Network, Addiso-Wesley, 2000.
Yuji Imai et al., "ECAST6: eXplicit Multicast on Ipv6", 2003 Symposium on Applications and The Internet Workshops, Jan. 27-31, 2003, pp. 238-243.
Rajiv Ramaswami et al., "Optical Networks, A Practical Perspective", Second Edition, Moran Kaufmann Publishers, ISBN 1-55860-655-6, San Francisco, CA USA. (831 pages).
Ramu Ramamurthy, "Capacity Performance of Dynamic Provisioning in Optical Networks", 2001, pp. 40-48.
Hui Zang and Jason P. Lee, "Dynamic Lightpath Establishment in Wavelength-Routed WDM Networks", 2001, pp. 100-108.
Sudipta Sengupta and Ramu Ramamurthy, "Capacity Efficient Distributed Routing of Mesh-Restored Lightpaths in Optical Networks", 2001, 5 pages.
P Ho et al., "A Novel Distributed Control Protocol in Dynamic Wavelength-Routed Optical Networks", IEEE Communications Magazine, Nov. 2002.
A. Sichani, et al., "A Novel Distributed Progressive Reservation Protocol for WDM All-Optical Networks", IEEE International Conferences on Communication, ICC'03, May 11-14, 2003.
K. Teng, et al., "Limited Scope Probing: A Distributed Approach for QoS-Based Routing", IEEE 2001.
P.Ho, et al., "A Framework for Service-Guaranteed Shared Protection in WDK Mesh Networks", IEEE Communications Magazine, Feb. 2002, pp. 97-103.
http://tisure.netw/cs311/fall-00/noes/graphs.html, notes for CC-311, Data Structures, Fall 2000.
C.Assi, et al., "A Hybrid Distributed Fault-Management Protocol for Combating Single-Fiber Failures in Mesh-Based DWDM Optical Networks", Global Telecommunications Conference, Nov. 17-21, 2002, pp. 2676-2680.
C. Assi, et al., "Efficient Path Selection and Fast Restoration Algorithms for Shared Restorable Optical Networks", International Conference on Communications, ICC'03, May 11-15, 2003, pp. 1412-1416.
S. Sengupta, et al., "From Network Design to Dynamic Provisioning and Restoration in Optical Cross-Connect Mesh Networks: An Architectural and Algorithmic Overview", IEEE Network, Jul./Aug. 2001, pp. 46-54.
G. Papadimitriou, et al., "Optical Switching: Switch Fabrics, Techniques, and Architectures", Journal of Lightwave Technology, vol. 21, No. 2, Feb. 2003, pp. 384-405.
Decibel dBm Definition, http:www.kingfisher.com.au/appnotes/A01.html, Sep. 7, 2004. (5 pages).
Wissam Fawaz et al, "Service Level Agreement and Provisional in Optical Networks", IEEE, Jan. 2004, pp. 36-43. (8 pages).
John Strand et al, "Issues for Routing in the Optical Layer", IEEE, Feb. 2001, vol. 39, No. 2, pp. 81-87. (8 pages).

Bin Xiao et al,"Design and Analysis of Improved Shortest Path Tree Update for Network Routing". (6 pages).

Xipeng Xiao, "Reducing Routing Table Computation Cost in OSPF", mhtml:file://C:\Documents%c20and%20Settings\dandevos.SVBSTZ\My%20Document . . . , Jun. 2, 2005., (11 pages).

Jennifer Yates, et al, "Wavelength Converters in Dynamically Reconfigurable WDM Networks", IEEE, Second Quarter 1999, pp. 2-15. (14 pages).

Sid Chaudhuri et al, "Control of Lightpaths in an Optical Network", Aug. 2000. (21 pages).

Date,C.J. "An Introduction to Database Systems" by C. Date, Addision-Wesley, 1986, pp. 5-9, 29-41. (37 pages).

John Strand et al, "Impairments and Other Constraints on Optical Layer Routing", http://www.ietf.org/internet-draft/draft-ietf-ipo-impairments-05.txt., May 2003. (18 pages).

Golmie, Nada et al., "A Differentiated Optical Services Model for WDM Networks," IEEE Communications Magazine, Feb. 2000. (8 pages).

Jukan, Admela et al. (A. Jukan et al.), "Constraint-based Path Selection Methods for On-demand Provisioning in WDM Networks," IEEE INOFOCOM 2002. (10 pages).

* cited by examiner

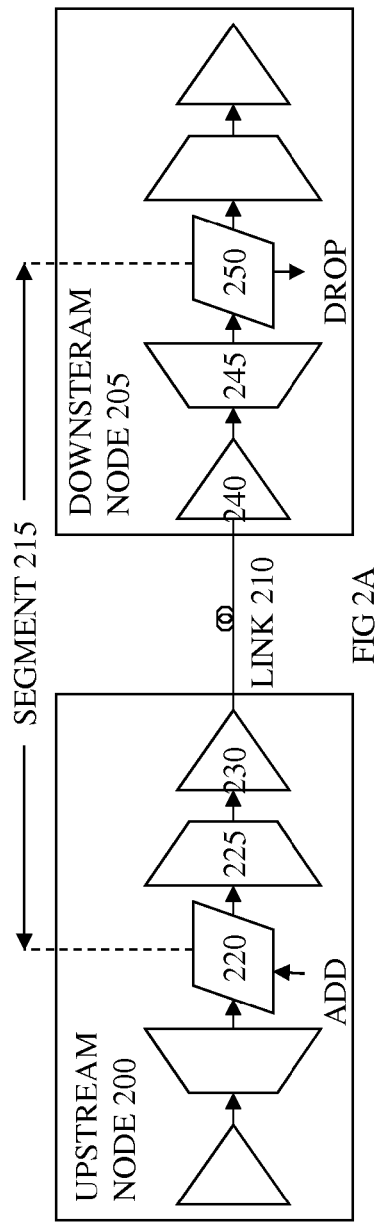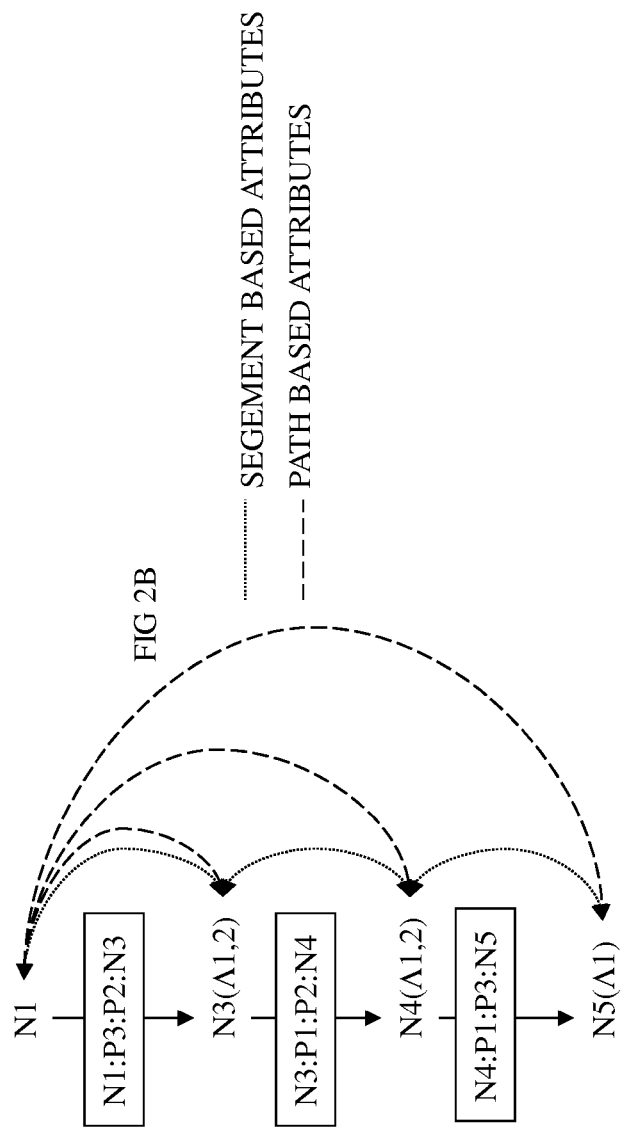

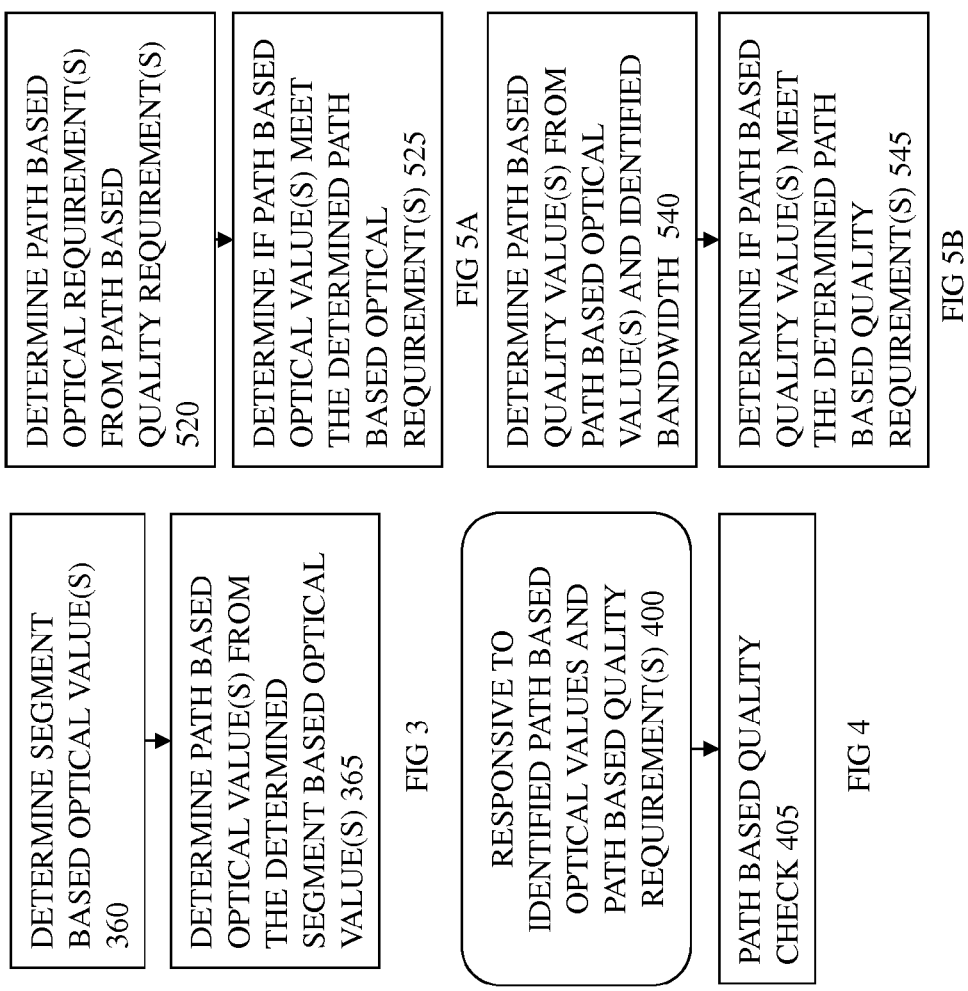

FIG 9A — N2

| PATH(S) | PATH CHANNEL SET |
|---|---|
| N1:P1:P3:N2 | λ1 |
| N1:P2:P3:N3:P1:P2:N4:P3:P1:N2 | λ1 |
| N1:P3:P2:N3:P1:P2:N4:P3:P1:N2 | λ1 |

FIG 9B — N3

| PATH(S) | PATH CHANNEL SET |
|---|---|
| N1:P2:P3:N3 | λ1,2 |
| N1:P3:P2:N3 | λ1,2 |
| N1:P1:P3:N2:P1:P3:N4:P2:P1:N3 | λ1 |

FIG 9C — N4

| PATH(S) | PATH CHANNEL SET |
|---|---|
| N1:P1:P3:N2:P1:P3:N4 | λ1 |
| N1:P2:P3:N3:P1:P2:N4 | λ1,2 |
| N1:P3:P2:N3:P1:P2:N4 | λ1,2 |

FIG 9D — N5

| PATH(S) | PATH CHANNEL SET |
|---|---|
| N1:P1:P3:N2:P1:P3:N4:P1:P3:N5 | λ1 |
| N1:P2:P3:N3:P1:P2:N4:P1:P3:N5 | λ1 |
| N1:P3:P2:N3:P1:P2:N4:P1:P3:N5 | λ1 |

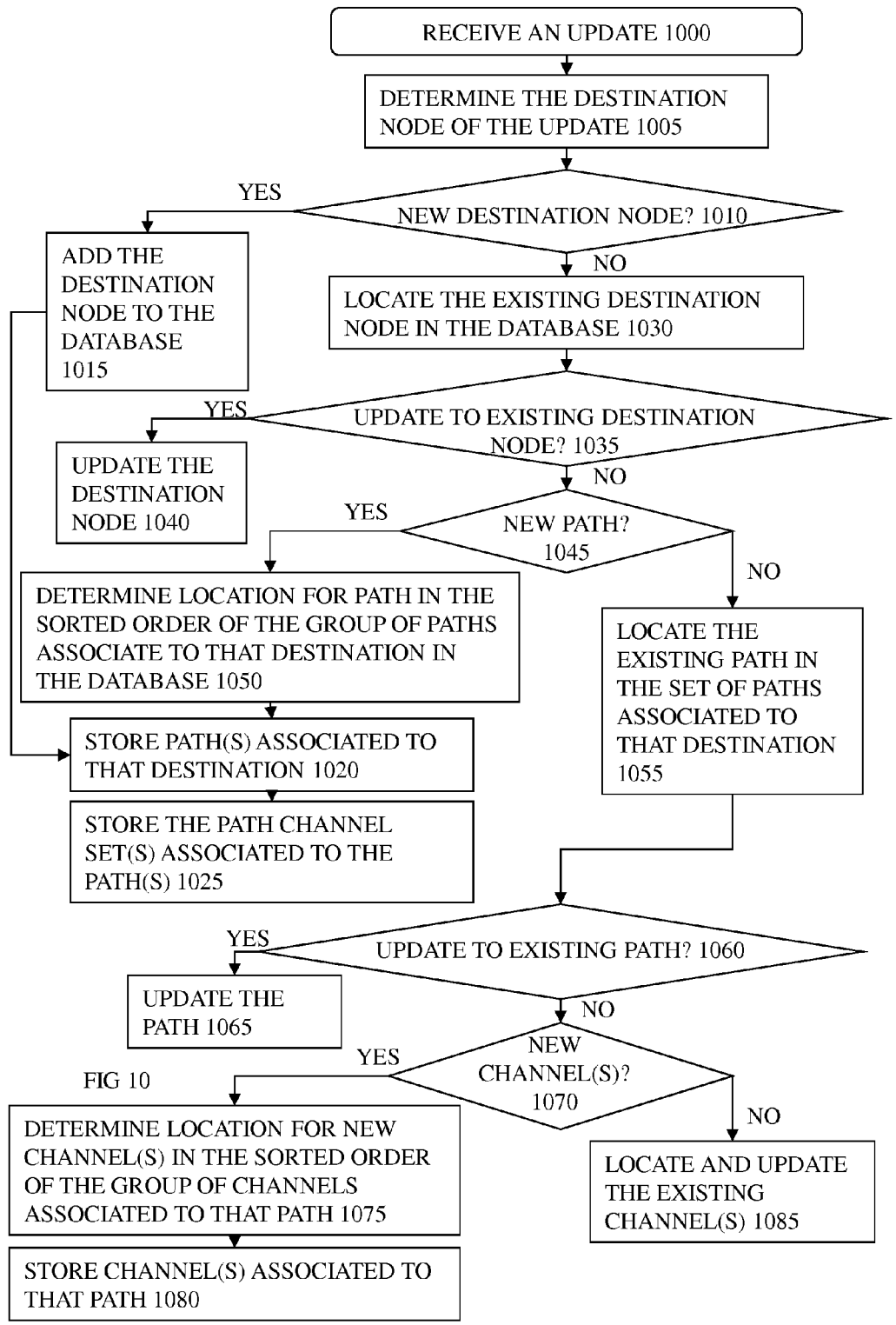

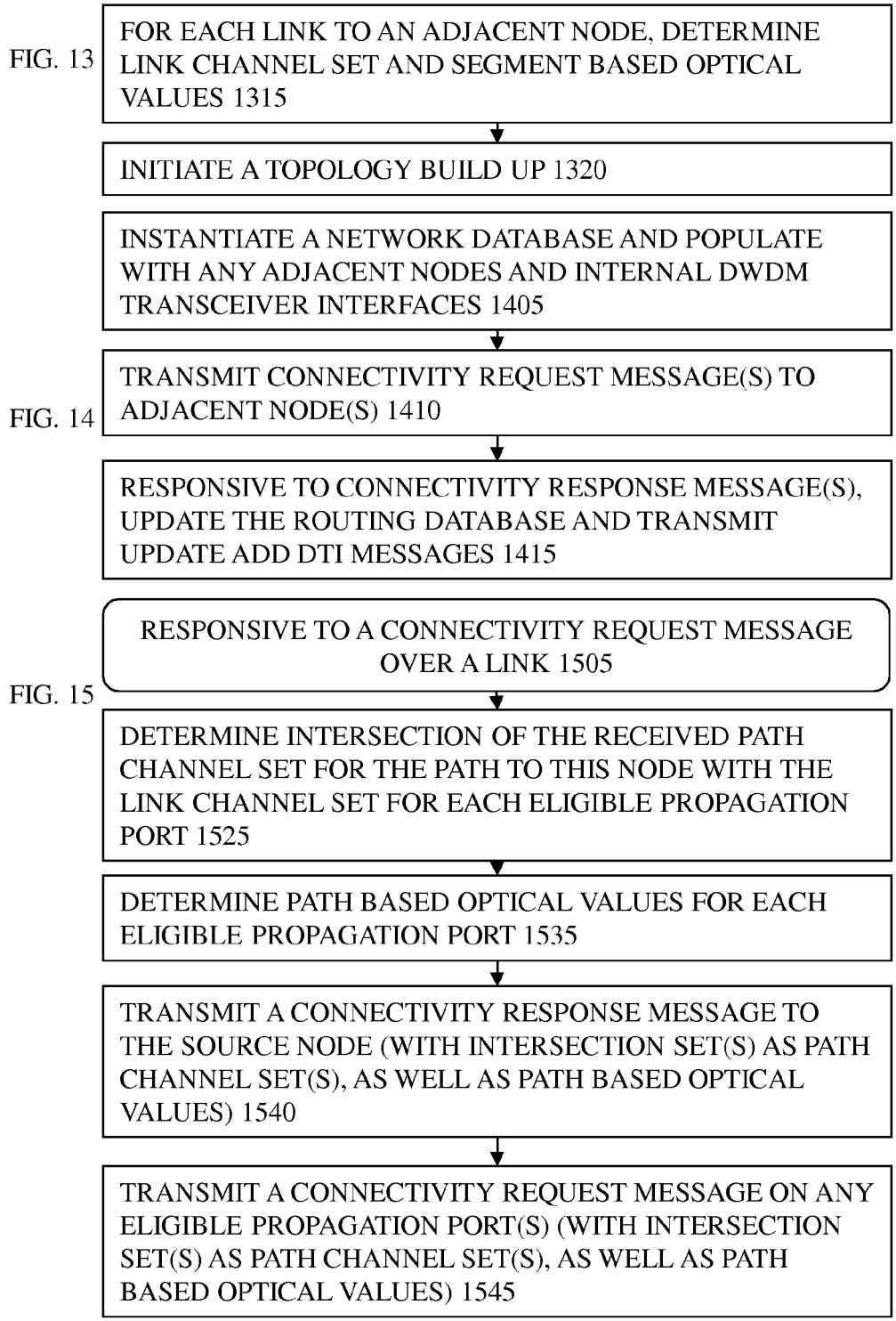

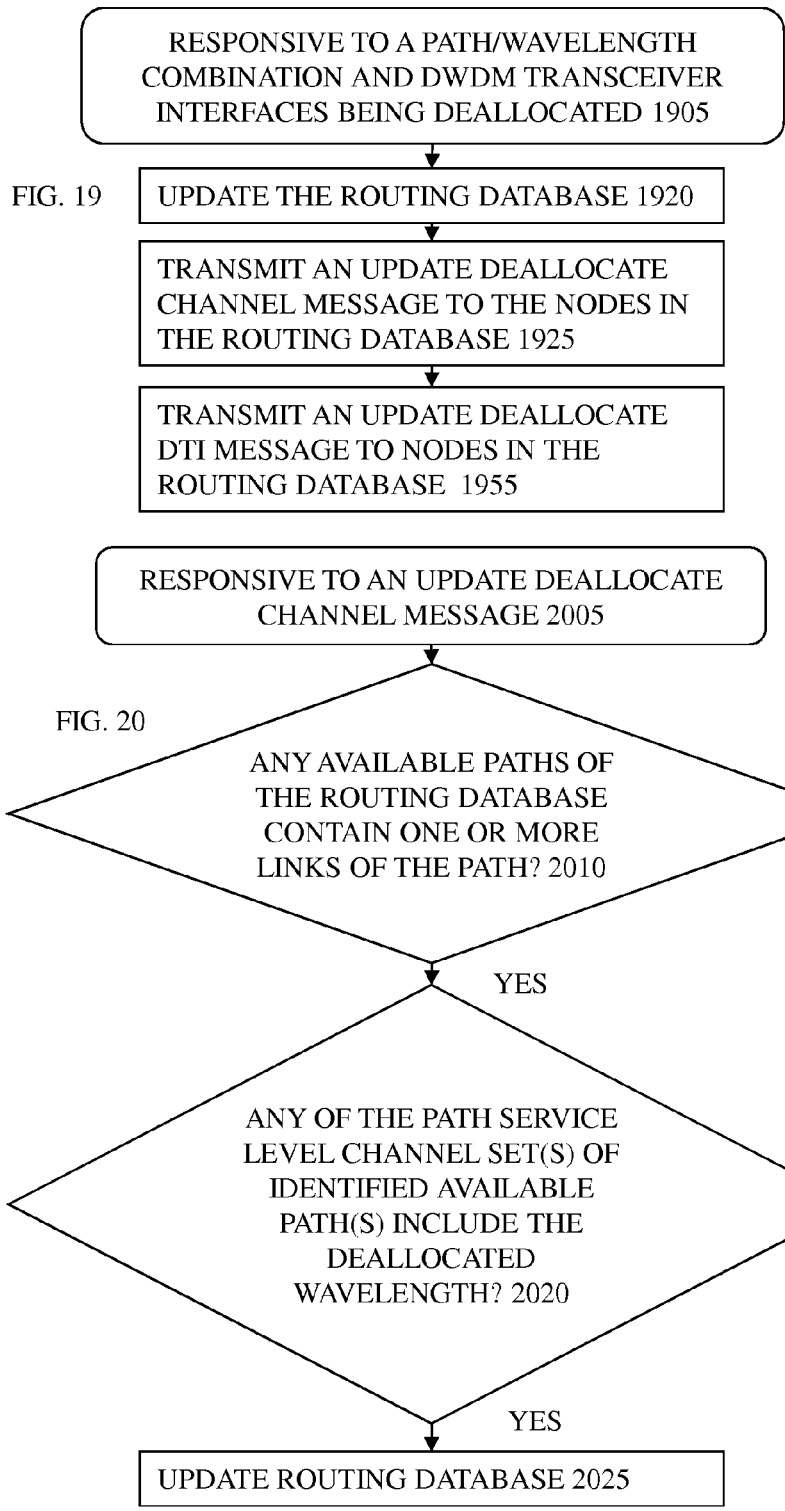

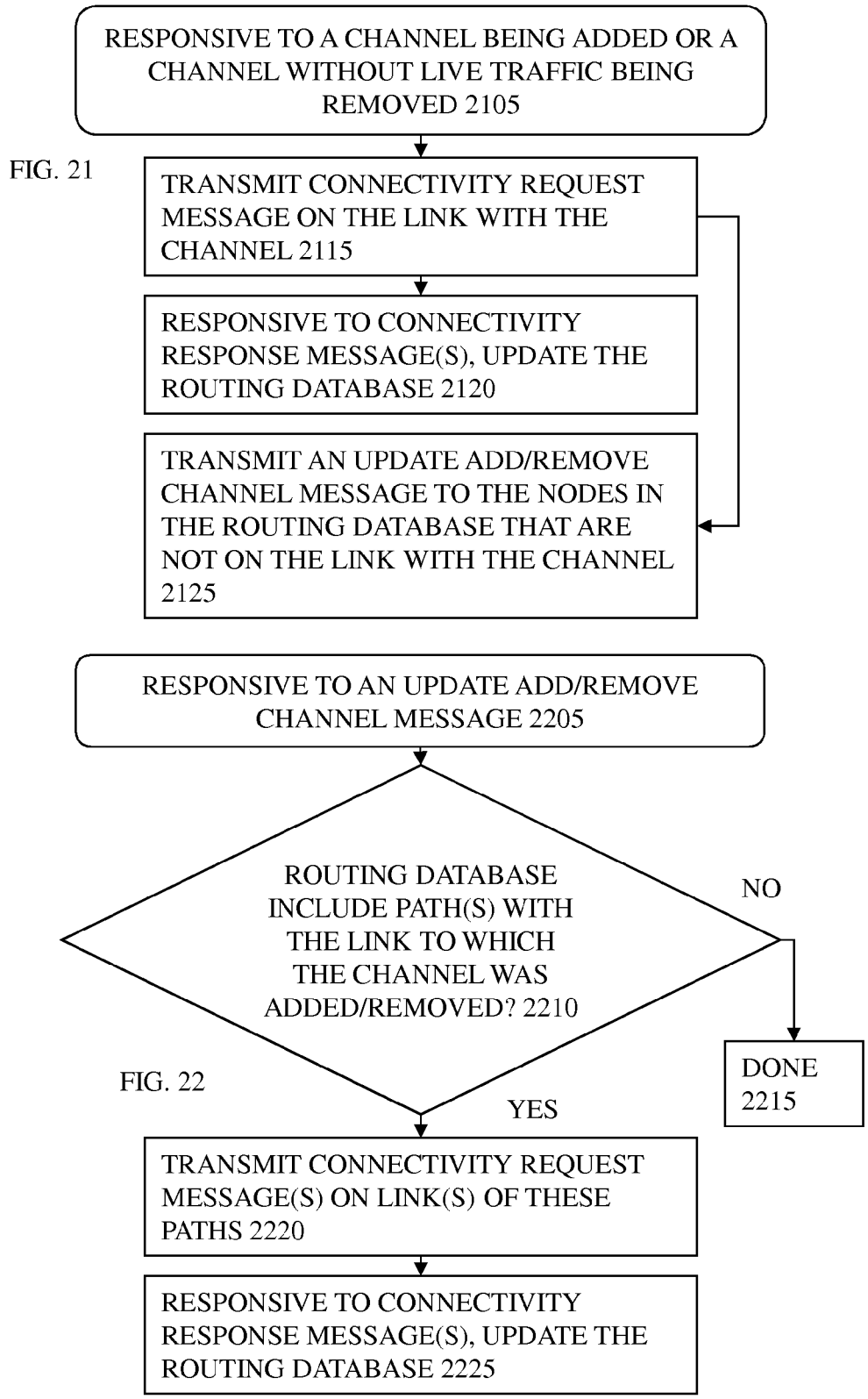

QUALITY OF SERVICE IN AN OPTICAL NETWORK

CROSS-REFERENCE TO RELATED APPLICATIONS

This divisional application claims priority to U.S. application Ser. No. 11/921,620, now issued as U.S. Pat. No. 8,244,127, filed Mar. 26, 2009, which claims the benefit of National Phase application under 35 U.S.C. §371 of International Application No. PCT/US2006/021986, filed on Jun. 6, 2006, entitled QUALITY OF SERVICE IN AN OPTICAL NETWORK which claims priority to U.S. Provisional Application No. 60/688,166 filed Jun. 6, 2005, which is hereby incorporated by reference.

BACKGROUND

1. Field

Embodiments of the invention relate to the field of networking; and more specifically, to optical networks.

2. Background

Generalized Multiprotocol Label Switching (GMPLS) [RFC3471] extends the Multiprotocol Label Switching (MPLS) architecture [RFC3031] to encompass time-division (e.g., Synchronous Optical Network and Synchronous Digital Hierarchy, SONET/SDH), wavelength (optical lambdas) and spatial switching (e.g., incoming port or fiber to outgoing port or fiber).

GMPLS extends MPLS to include network devices whose forwarding plane recognizes neither packet, nor cell boundaries, and therefore, can't forward data based on the information carried in either packet or cell headers. Specifically, such network devices include devices where the forwarding decision is based on time slots (TDM), wavelengths (lambda), or physical (fiber) ports. GMPLS supports uni-directional label switched paths (LSPs) and bi-directional LSPs (For bi-directional LSPs, the term "initiator" is used to refer to a node that starts the establishment of an LSP and the term "terminator" is used to refer to the node that is the target of the LSP; Note that for bi-directional LSPs, there is only one "initiator" and one "terminator") and a special case of Lambda switching, called Waveband switching (A waveband represents a set of contiguous wavelengths which can be switched together to a new waveband; The Waveband Label is defined to support this special case; Waveband switching naturally introduces another level of label hierarchy; As far as the GMPLS protocols are concerned there is little difference between a waveband label and a wavelength label.).

To deal with the widening scope of MPLS into the optical and time domains, there are several new forms of "label." These new forms of labels are collectively referred to as "generalized labels." A generalized label contains enough information to allow the receiving node to program its switch fabric, regardless of the type of this switch fabric, such that the ingress and egress segments of the path are properly joined. The Generalized Label extends the traditional label by allowing the representation of not only labels which travel in-band with associated data packets, but also out-of-band labels which identify time-slots, wavelengths, or space division multiplexed positions. For example, the Generalized Label may carry a label that represents (a) a single fiber in a bundle of fibers, (b) a single waveband within fiber, (c) a single wavelength within a waveband (or fiber), or (d) a set of time-slots within a wavelength (or fiber). It may also carry a label that represents a generic MPLS label, a Frame Relay label, or an ATM label (VCI/VPI).

Thus, GMPLS forms label switched paths (LSPs) through the network. Examples of two signaling protocols available to set up LSPs across a network are the Resource Reservation Protocol (RSVP) and the label distribution protocol (LDP).

Optical Networks

An optical network is a collection of optical network devices interconnected by links made up of optical fibers. Thus, an optical network is a network in which the physical layer technology is fiber-optic cable. Cable trunks can be interconnected with optical cross-connects (OXCs), and signals can be added and dropped at optical add/drop multiplexers (OADMs). The optical network devices that allow traffic to enter and/or exit the optical network are referred to as access nodes. Each optical link interconnects two optical network devices and typically includes an optical fiber to carry traffic in each direction. There may be multiple optical links between two optical network devices.

A given fiber can carry multiple communication channels simultaneously through a technique called wavelength division multiplexing (WDM). When implementing WDM, each of multiple carrier wavelengths (or, equivalently, frequencies or colors) is used to provide an independent communication channel. Thus, a single fiber looks like multiple virtual fibers, with each virtual fiber carrying a different data stream. Each of these data streams may be a single data flow, or may be multiple logical data flows (such logical data flows may be distinguished by a variety of technologies—e.g., time slots, virtual partitions (e.g., tunnels), etc.) Each of the wavelengths used for these channels is often referred to as a lambda.

A lightpath is the route through one or more concatenated links taken by a particular light signal as it enters the network at the ingress node (also referred to as the source node) to where it is removed from the network at the egress node (also referred to as the destination node), as well as the set of one or more lambdas used to carry the optical signal. A lightpath thus consists of the physical fiber links between the ingress and egress nodes as well as the optical switching that occurs at any pass-through nodes (also referred to as intermediate nodes) for that lightpath. It would also include any wavelength conversion device(s) that may be present to realize the required connectivity. A lightpath for which wavelength conversion is not performed is referred to as a conversion free lightpath and comprises a single lambda and a path (the series of optical nodes (and, of course, the interconnecting links) through which traffic is carried with that set of lambdas); A lightpath for which wavelength conversion is performed is comprises multiple lambdas and a path. An optical circuit is the logical pairing of lightpaths between two nodes where at least one of the lightpaths is traveling in the opposite direction so as to allow bi-directional communication between the two nodes. Specifically, when a given direction of the end to end path of an optical circuit will use a single wavelength, then a single end to end wavelength is provisioned for that direction (the source and destination nodes of that wavelength are access nodes of the optical network and are the same as the end nodes of the optical circuit). However, in the case where a single wavelength for a given direction will not be used, wavelength conversion is necessary and a lightpath with two or more wavelengths is provisioned for that direction of the end to end path of the optical circuit.

Put another way, the optical network can be thought of as consisting of the logical pairing of lightpaths to construct bi-directional associations between the access nodes providing ingress to and egress from the optical networks. In GMPLS terminology, each lightpath can be considered to be a uni-directional Label Switched path (LSP) and their pairing as optical circuits to be a Bi-Directional LSP. Each of these LSPs (uni-directional or bi-directional) forms an end to end path where the generalized label(s) are the wavelength(s) of the lightpath(s) used. When wavelength conversion is not used for a given bi-directional LSP, there will be a single conversion free, end to end lightpath in each direction (and thus, a single wavelength; and thus, a single generalized label).

The term disjoint path is used to describe a relationship between a given path and certain other network resources (e.g., nodes, links, etc.) wherein there is no sharing of network resources between the path taken by the optical circuit and the other network resources that were specified. For example, two optical circuits are said to be "fully link disjoint" if they do not pass along any of the same links. Similarly, two optical circuits are said to be 'fully node disjoint' if this do not pass through the same two nodes (except for the ingress and egress nodes). Note that it is possible to be "fully link disjoint" without being "fully node disjoint". There are various levels of disjointness (e.g., maximally link disjoint, fully link disjoint, maximally node disjoint, and fully node disjoint; and each can additionally be shared risk group (SRG) disjoint). For instance, a first and second path are disjoint if the network resources they use meet the required level of disjointness.

Disjoint paths are formed for a variety of reasons, including to form "restricted paths" and "protection paths". "Restricted paths" are light paths that have administrative restrictions placed on the specific links and/or nodes that they are allowed to traverse. For example, a path may be required to pass through a specific link or, alternatively, not to pass-though a particular node. Protection paths are used to provide physical redundancy; that is, they are used as alternate paths to working paths in case of a network failure of some kind. If the working path and the protection path are not disjoint and hence share one or more network resources, then in the event of a failure of that shared resource, neither the working nor the protect traffic can be transmitted between ingress and egress nodes. For this reason, it is desired, or even required, that the protection path be fully link and node disjoint from the working path. Protection paths are commonly implemented as either: 1) 1+1 protected; 2) 1:1 protected; or 3) 1:N protected. A 1+1 or 1:1 protected path is a disjoint path from node A to node B in the network where one of the paths is a working path, and the other is a protection path. The working path and the protection path are typically established at the same time. In the case of a 1+1 protected path, the same traffic is carried on both paths, and the receiving node selects the best of the paths (i.e., if the one currently selected by the receiving node degrades or fails, that node will switch to the other). In contrast, in the case of a 1:1 protected path, traffic is transmitted on the working path; when a failure occurs on the working path, traffic is switched to the protection path. In 1:N protection, multiple disjoint working paths share the same protection path.

An optical network device can be thought of comprising 2 planes: a data plane and a control plane. The data plane includes those optical components through which the light travels (e.g., the switch fabric; the input and output ports; amplifiers; wavelength multiplexers; optical splitters; etc.), and components that convert electrical signals into light (e.g. a laser) as well as those that convert light into electrical signals (e.g. a photodetector). The control plane includes those components that control the components of the data plane. For instance, the control plane is often made up software executing on a set of one or more microprocessors inside the optical network device which control the components of the data plane. To provide a specific example, the software executing on the microprocessor(s) may determine that a change in the switch fabric is necessary, and then instruct the appropriate optical components(s) to cause that action to occur. It should also be noted that the control plane of an optical network device is in communication with a centralized network management server and/or the control planes of one or more other network devices.

A number of different network topologies have been developed for optical network devices, including ring and meshed based topologies. Similarly, a number of different control planes and data planes implementations have been developed for optical network devices. For instance, various different technologies have been used to physically realize the switch fabric that the data (optical signals) gets re-directed to, including Micro-Electro-Mechanical Systems (MEMS), acousto-optics, planar waveguide, holographic, and optical phased array switch fabrics.

There are generally three approaches to operating an optical network: 1) centralized provisioning; 2) source based provisioning; and 3) hybrid provisioning. In centralized provisioning, a centralized network management server communicates with each of the optical network devices of a network and maintains a network database. In response to a demand request for an optical circuit, the network management server calculates lightpaths for the demand that meets both administrative and network performance requirements. The network management server then causes the allocation of the lightpaths and the configuring of the switch fabrics at all the network nodes along the lightpaths necessary to realize the establishment of that optical circuit.

In source based provisioning, each of the access nodes of the network performs the work of building/maintaining a network database (e.g., using OSPT-TE). In response to a demand for an optical circuit received by an access node, that node: 1) itself finds the shortest lightpaths; and 2) signals to each of the other nodes in the path to allocate resources to the requested lightpath. In response, each node will itself allocate resources (if it is still able to meet the request) and initiate any action required to ensure the proper connectivity for the lightpaths within itself.

In hybrid provisioning, each of the nodes of the network exchanges messages containing information relating to connectivity status of links directly connected to themselves, for example using OSPF link state advertisements to build network databases, and uses these messages to build network database and maintained in a centralized network management server. In response to a demand from a requesting entity, the network management server initiates 'third party' source based provisioning (i.e. the centralized server initiates the call set-up request on behalf of the 'originating node'). The call-set up subsequently proceeds as in the case of source-based provisioning.

Regardless of the approach used, operating an optical network typically requires: A) building and maintaining network databases; and B) establishing lightpaths. For example, the network databases can include: 1) link state databases that track resource usage and availability information (e.g., the link(s), lambda(s), etc.) regarding adjacent optical nodes (e.g., using a link management protocol (LMP)); and 2) topology databases that track information (e.g., nodes, links, lambdas, etc.) for the physical connectivity of the nodes in a domain and/or the entire network (e.g., using OSPF-TE). In order to establish an LSP, the following operations are typically performed: 1) determining a shortest path/wavelength between the source and destination; 2) allocate that path/wavelength within its own node; 3) affecting the connectivity required in its own node; and 4) requesting (aka 'signaling')

each of the other nodes in the calculated path to allocate and affect resources within themselves).

Generally, link state routing protocols such as OSPF and OSPF-TE operate by performing periodic link state advertisements (LSAs) to maintain a routing table that includes reachability information for each destination in the network. Within each period: every node in the network floods its link state information to other nodes in the network; this link state information is stored by every node; every node processes this information and builds a network map (this network map is also later on spread around to decrease processing); each node reduces these network maps to graph structures (adding redundant/dummy nodes to cover multiple channels on an optical link—thus, the graph separately represents the path/wavelength combinations on a given physical link as separate links); each node uses its graph structures as an input to a shortest path first algorithm (e.g., *Dijkstra's algorithm, BFS algorithm*, etc.) to form a shortest path first tree (which is actually a shortest path/wavelength combination first tree) that stores the shortest path/wavelength combination to each destination; and each node uses its shortest path first tree to update its maintained routing table. In addition, the graph structures may also be used as an input to a disjoint shortest path first algorithm (e.g., *Vertex splitting Method*1 algorithm, *vertex splitting Method*2 *algorithm, Surballes Algorithm* (for calculation of edge disjoint paths), etc.) that relies on applying a shortest path first algorithm to the graph structure. (see Bhandari, Ramesh. *Survivable Networks Algorithms for Diverse Routing*, Kluwer Academic Publishers (1999). The results of such a disjoint shortest path first algorithm are used to install an alternative next hop for a destination in the routing table. Ultimately, the routing table is maintained period to period and stores the "next hop" for each possible destination (i.e. the physical interface to be used to reach each destination). It does not store the path/wavelength combinations. This is also true for the OSPF-TE extension of OSPF. One difference between OSPF and OSPF-TE is the data that is carried by the LSAs. For example, the channel information present on a link can be embedded inside the LSAs for OSPF processing engine to be able to use channel information to finally obtain shortest path/wavelength combination.

One problem with the above approach is the relatively high computational intensity; especially in WDM optical networks. For example, a typical optical network having 10 nodes, each with 8 optical fibers capable of carrying 40 channels going out, results in 320 channels per node. In addition, as indicated above, the redundant/dummy nodes are added to represent multiple channels on each physical link, so each channel is associated with a separate node data structure so that it is represented as a separate link (that is, every path/wavelength combination on a physical link is represented in the graph as if it were a separate physical link). As such, the graph structure stores every node with degree 320 to represent a network having 3200 links. Each of these relatively large graph structures are then operated on: 1) by a shortest path first algorithm to select path/wavelength combinations from the resulting shortest path/wavelength combination first tree; and/or 2) by a disjoint shortest path first algorithm to select path/wavelength combinations from the result.

Methods to address the relatively large computational complexity of OSPF include: 1) pre-emption of Djikstra's algorithm during periodic route computation (after the algorithm has run for a certain maximum amount of time, it is stopped and the search context is saved; if a route miss occurs between the stopped time and the next update/refresh then the search is continued); and; 2) figuring out disjoint areas within an OSPF area based on the interfaces connecting to a router (when an update occurs, only the affected sub-area routes are re-computed).

Another problem with existing optical networks is the network databases used and the manner in which they are built and maintained. Specifically, these monolithic physical topology databases (e.g., built with OSPF or OSPF-TE) are very large because they must store all of the data to give a physical view of the network (not only connectivity at the link level, but connectivity at the lambda level because there are multiple lambdas per link and because different lambdas on a given link may provide different bit rates; etc.). These large network databases are relatively time consuming to parse and require a relatively long time and a relatively large amount of node intercommunication to propagate changes.

BRIEF SUMMARY

A method and apparatus for implementing optical network quality using bit error rate and chromatic dispersion is described. According to one embodiment of the invention, a method includes the provision of quality of service in a wavelength division multiplexing optical network that supports a plurality of bit rates. As part of this method, the cumulative noise and cumulative chromatic dispersion for each available path as a whole is determined, where an available path is a series of two or more nodes each connected by an optical link on which a set of wavelengths is available for establishing a lightpath. In addition, different grades of path quality are distinguished based on bit error rate (BER), where BER is based on cumulative noise and bit rate. Furthermore, a minimum path quality is required based on chromatic dispersion decibel penalty, where chromatic dispersion decibel penalty is based on cumulative chromatic dispersion and bit rate.

Also, a method and apparatus for collecting path based attributes in an optical network is described. According to one embodiment of the invention, a method is performed by each of a plurality of nodes in a wavelength division mesh optical network. The method includes each node determining their links to adjacent nodes of the wavelength division mesh optical network, the wavelengths on those links, and a value for each of a set of one or more segment based attributes of the segments formed by those links. In addition, the method includes each node participating in a distributed search based scheme to determine the available paths from itself to other nodes in the wavelength division mesh optical network, to determine the wavelengths on those available paths, and to determine a value for each of a set of path based optical attributes for path based quality checks of those available paths. Furthermore, the method includes each node participating in a source based scheme to provision the optical network.

Also, a method and apparatus for a path oriented routing database with path based attributes for an optical network is described. According to one embodiment of the invention, an apparatus includes an access node to be coupled in a wavelength division multiplexing optical network. The access node includes a routing database and a path based quality check module. The routing database is organized by the destination nodes of the available paths from the access node to other access nodes in said wavelength division multiplexing optical network, where each such destination node has associated to it in the routing database those of the available paths that lead to that destination node. In addition, each such available path has associated to it in the routing database a value for each of a set of path based optical attributes for path based quality checks of those available paths. Also, each such available path has associated to it in the routing database a path channel set that includes one or more wavelengths available to establish lightpaths. The path based quality check module is to determine whether a currently selected one of the available paths in said database meets a set of currently identified requirements based on the set of path based optical attributes for the currently selected path in said routing database.

BRIEF DESCRIPTION OF THE DRAWINGS

The invention may best be understood by referring to the following description and accompanying drawings that are used to illustrate embodiments of the invention. In the drawings:

FIG. 2A is a block diagram illustrating a segment according to one embodiment of the invention.

FIG. 2B is a block diagram illustrating an example of path based optical attributes according to some embodiments of the invention.

FIG. 3 is a flow diagram illustrating a segment based approach to determining path based optical attributes according to some embodiments of the invention.

FIG. 4 is a flow diagram for applying path based quality requirements according to some embodiments of the invention.

FIG. 5A is a flow diagram illustrating a method of performing a path based quality check according to some embodiments of the invention.

FIG. 5B is a flow diagram illustrating another method of performing a path based quality check according to some embodiments of the invention.

FIG. 9A illustrates the paths in FIG. 1C from N1 to N2, as well as the path channel set for each path, according to one embodiment of the invention.

FIG. 9B illustrates the paths in FIG. 1C from N1 to N3, as well as the path channel set for each path, according to one embodiment of the invention.

FIG. 9C illustrates the paths in FIG. 1C from N1 to N4, as well as the path channel set for each path, according to one embodiment of the invention.

FIG. 9D illustrates the paths in FIG. 1C from N1 to N5, as well as the path channel set for each path, according to one embodiment of the invention.

FIG. 10 is a flow diagram for walking and updating the database according to one embodiment of the invention.

FIG. 13 is a flow diagram performed by each access node when joining an optical network according to embodiments of the invention.

FIG. 14 is a flow diagram illustrating a topology build-up according to embodiments of the invention.

FIG. 15 is a flow diagram illustrating operations performed by nodes responsive to a connectivity request message received over a link according to certain embodiments of the invention.

FIG. 19 is a flow diagram illustrating operations performed by the source node of a path/wavelength combination responsive to that path/wavelength combination being deallocated according to certain embodiments of the invention.

FIG. 20 is a flow diagram illustrating the operations performed by access nodes responsive to receiving an update deallocate channel message according to certain embodiments of the invention.

FIG. 21 is a flow diagram illustrating the operations performed by the access nodes connected by a link on which a channel is added/removed according to certain embodiments of the invention.

FIG. 22 is a flow diagram illustrating the operations performed by an access node responsive to receiving an update add/remove channel message according to certain embodiments of the invention.

DETAILED DESCRIPTION

Figure 1A:
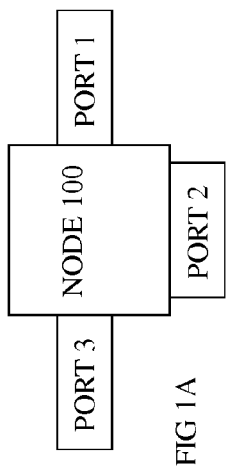
FIG. 1A is a block diagram of a node of an optical network according to one embodiment of the invention.

In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Of course, one or more parts of an embodiment of the invention may be implemented using any combination of software, firmware, and/or hardware. Such software and/or firmware can be stored and communicated (internally and with other access nodes over the network) using machine-readable media, such as magnetic disks; optical disks; random access memory; read only memory; flash memory devices; electrical, optical, acoustical or other form of propagated signals (e.g., carrier waves, infrared signals, digital signals, etc.); etc.

Overview

Aspects of the invention include a set of one or more path based attributes, as well as storage, use, and collection thereof. While some embodiments of the invention use a path based quality attribute of bit error rate (BER) to distinguish between different grades of path quality and use a path based quality attribute of chromatic dispersion decibel penalty to establish minimum path quality, alternative embodiments may use path based optical attributes in additional or different ways. While some embodiments of the invention use a distributed search based technique for collecting path based optical attributes, alternative embodiments of the invention may use other techniques for collecting path based optical attributes, use the distributed search based technique for collecting path based quality attributes, different information relevant to path dependent optical service levels, etc. While some embodiments of the invention use a path oriented routing database to store path based optical attributes, alternative embodiments of the invention may use other types of data structures to store path based optical attributes, use a path oriented routing database to store different information relevant to path dependent optical service levels, etc.

Exemplary Network

Embodiments of the invention are described with reference to a WDM (the term WDM is used herein to be inclusive of DWDM) mesh optical network using GMPLS in which all nodes have an optical switch fabric (e.g., an optical crossconnect); as such, a conversion free lightpath can extend through multiple intermediate nodes (including more than one hop between the source and destination nodes) without being converted into another wavelength or into the electrical domain (the optical switch fabrics of such intermediate nodes switch the light, as opposed to converting into the electrical domain for switching). However, alternative embodiments of the invention may be used with other networks and nodes (e.g., a non-mesh optical network (e.g., a ring or multi-ring), a non-WDM optical network, not all nodes have an optical switch fabric, using different or additional protocols, etc.)

It should be understood that in a network with a single link between nodes, a path may be described by the series of nodes through which that path travels (the links are impliedly distinguished). However, in a network with multiple links between nodes, a path is described by the series of nodes and interconnecting link(s) over which that path travels. There are a variety of ways to distinguish the links of an optical network (e.g., links could be individually labeled; if multiple line cards are used and each line card has one port, then "node number, outgoing line card, incoming line card, node number" may be used; if multiple line cards are used where some have multiple ports, then "node number, outgoing line card, outgoing port, incoming port, incoming line card, node number" may be used; if ports in a node are individually labeled (irrespective of which line card they are on), then "node number, outgoing port number, incoming port number, node number" may be used; etc.). By way of illustration, and not by limitation, the format "node number, outgoing port number, incoming port number, node number" is used herein to refer to optical links between those nodes.

Figure 1B:
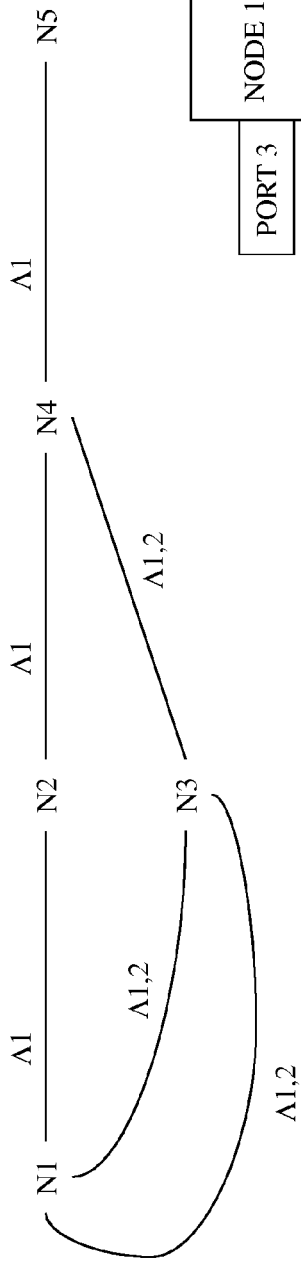
FIG. 1B is a block diagram illustrating an exemplary optical network according to one embodiment of the invention.
Figure 1C:
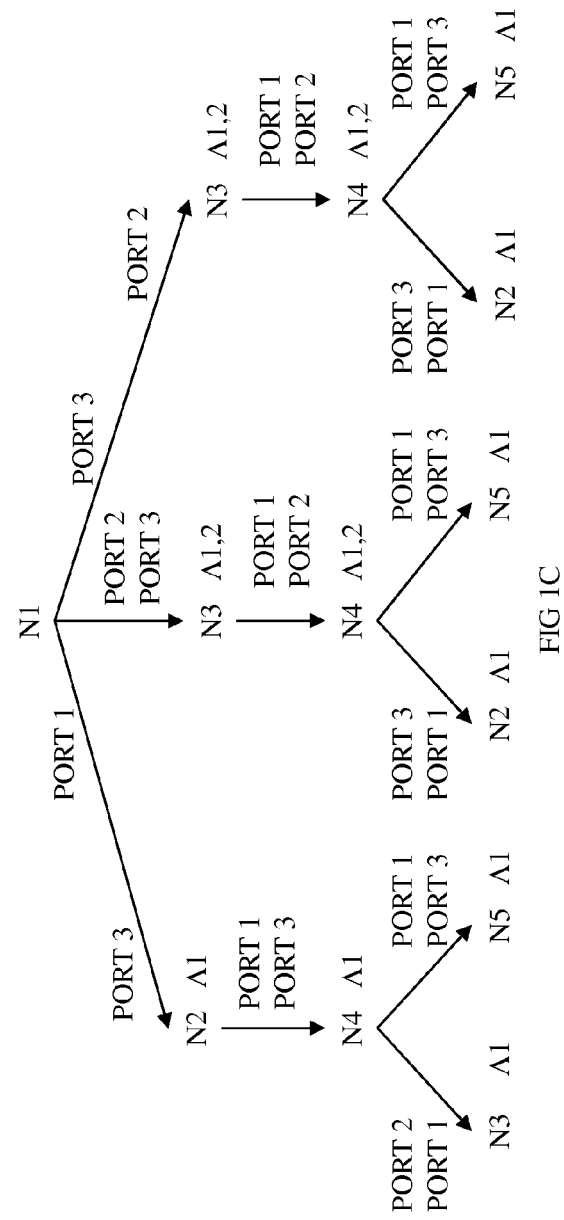
FIG. 1C illustrates the conversion free available paths for N1 of the optical network in FIG. 1B according to certain embodiments of the invention.

FIGS. 1A-C are block diagrams illustrating an exemplary optical network according to one embodiment of the invention. FIG. 1A is a block diagram of a node of an optical network according to one embodiment of the invention. In FIG. 1A, node 100 is illustrated having three ports: port 1 (P1) on the right, port 2 (P2) on the bottom and port 3 (P3) on the left. These ports and their orientation are just for illustrative purposes; specifically, the orientation is used for the nodes in FIG. 1B. Thus, a node of the optical network may have more or less ports and ports oriented in a variety of ways.

FIG. 1B is a block diagram illustrating an exemplary optical network according to one embodiment of the invention. The optical network of FIG. 1B includes 5 access nodes labeled N1, N2, N3, N4, and N5. The ability to implement multiple lambdas on a single link is represented in simplified form by numbering the lambdas; lambdas having the same number are the same wavelength. FIG. 1B shows the numbered lambdas available on each optical link of the exemplary optical network. The term "available" when used in conjunction with a lambda number indicates that the node is capable of using that wavelength; the terms allocated and unallocated are used to identify whether or not that available wavelength is currently provisioned. The format node number, outgoing port number, incoming port number, node number equals lambda number(s) indicates the wavelengths available on that link. Using the example discussed above, FIG. 1B shows: N1:P1:P3:N2=lambda 1; N2:P1:P3:N4=lambda 1; N4:P1: P3:N5:=lambda 1; N1:P2:P3:N3=lambda 1, 2; N1:P3:P2: N3=lambda 1, 2; and N3:P1:P2:N4=lambda 1.

It should be understood that the topology in FIG. 1B is exemplary, and that the invention can be used with any number of different topologies. In addition, while a limited set of specific wavelengths are identified as being available in FIG. 1B and embodiments of the invention will be described with reference to the wavelengths illustrated in FIG. 1B, it should be understood that this is merely for illustrative purposes (that is, a larger set of wavelengths is within the scope of the invention). In addition, while the exemplary optical network in FIG. 1 is made up of access nodes, embodiments of the invention are equally applicable to optical networks that include pass through nodes.

Furthermore, while FIG. 1B illustrates different wavelengths being available on different optical links, it is understood that the same wavelengths may be available on all of the optical links. Specifically, determining factors in what wavelengths a given optical network device (and thus a node of the optical network) supports may include the lasers used, the wavelengths the optical switch fabrics can switch, and how the lasers are physically connected to the optical switch fabric, as well as the operational status of these and other components in the optical network device. By way of example, some exemplary optical network device architectures are described below.

FIG. 1C illustrates the conversion free available paths for N1 of the optical network in FIG. 1B according to certain embodiments of the invention. Specifically, FIG. 1C illustrates the conversion free topology in the form of a tree having N1 as the root with branches representing links from node to node through the network. As used below, the phrase "path channel set" refers to the intersection set of the lambdas on the links of the path. For example, the path channel set for the path N1:P2:P3:N3:P1:P2:N4:P1:P3:N5 is the intersection set of the "link channel sets" of links N1:P2:P3:N3; N3:P1:P2: N4; and N4:P1:P3:N5. It should be understood that where a path has a length of a single link, the link channel set will be the same as the path channel set.

In FIG. 1C, the root N1 has a branch to N2. With regard to the branch to N2, lambda 1 is available (i.e., the link channel set of the link N1:P1:P3:N2 is lambda 1). Thus, for the path from N1 to N2, lambda 1 makes up the path channel set. From this representation of N2 in FIG. 1C, there is a branch to a representation of N4. The branch from N2 to N4 represents the path N1:P1:P3:N2:P1:P3:N4. Since the link channel sets for N1:P1:P3:N2 and for N2:P1:P3:N4 each include lambda 1, the intersection of these link channel sets includes lambda 1. As such, the path channel set for the path N1:P1:P3:N2: P1:P3:N4 includes lambda 1. From this representation of N4, there is a branch to each of N3 and N5. The branch to N3 represents the path N1:P1:P3:N2:P1:P3:N4:P2:P1:N3. Since the link channel sets for N1:P1:P3:N2, N2:P1:P3:N4, and N4:P2:P1:N3 respectively include lambda 1, lambda 1, and lambda 1, 2, the intersection of these link channel sets includes only lambda 1. As such, the path channel set for the path N1:P1:P3:N2:P1:P3:N4:P2:P1:N3 includes only lambda 1. The branch to N5 represents the path N1:P1:P3: N2:P1:P3:N4:P1:P3:N5 and has the path channel set of lambda 1.

When the path channel set of a path is not null, then that path is said to be available in a conversion free topology. Thus, the available paths of an optical network represent conversion free reachability. A superset of the available paths is referred to as the possible paths. The possible paths include all paths that exist based on the physical connections of nodes and links (irrespective of conversion free reachability). Thus, the possible paths include paths with non-null path channel sets (available paths) and paths with null path channel sets.

In the rest of this description, the format path=lambda number(s) will be used to identify the path channel set for that path. Returning to the root node N1, N1 has branches to two representations of N3 to reflect the two optical links between them: N1:P2:P3:N3=lambda 1,2 and N1:P3:P2:N3=lambda 1,2. Each of these has a branch to a different representation of N4 (representing the paths N1:P2:P3:N3:P1:P2:N4=lambda 1,2 and N1:P3:P2:N3:P1:P2:N4=lambda 1,2). Each of these representations of N4 have a branch to a representation of each of N2 and N5: (representing the paths N1:P2:P3:N3:P1: P2:N4:P3:P1:N2=lambda 1; N1:P2:P3:N3:P1:P2:N4:P1:P3: N5=lambda 1,2; N1:P3:P2:N3:P1:P2:N4:P3:P1:N2=lambda 1; and N1:P3:P2:N3:P1:P2:N4:P1:P3:N5=lambda 1,2).

Path Based Attributes

FIG. 2A is a block diagram illustrating a segment according to one embodiment of the invention. A path can be viewed as a set of one or more segments in the optical domain, where each such segment (215) represents one link (210) of the path and the various components in the optical switch part, between the optical switch fabrics (220 and 250), of the two nodes that the link interconnects (e.g., for a given lightpath, the optical components of the upstream node 200 (e.g., the optical switch fabric 220, wavelength multiplexer 225, booster 230, outgoing port, etc.) and the downstream node 205 (e.g., incoming port, pre-amp 240, wavelength demultiplexer 245, optical switch fabric 250, etc)). As such, the same formats for representing a link can be used to represent a segment (e.g., node number, outgoing port number, incoming port number, node number), and a path is a concatenated series of segments. While each of these segments individually has attributes (referred to as segment based attributes), the path as a whole has attributes (referred to as path based attributes). While FIG. 2A illustrates optical signal flow from the upstream node to the downstream node, it is understood that there can be optical signal flow in the opposite direction on the link and that the opposite direction may have similar, different, or the same segment based attributes (e.g., if the same components are used, if different components are used that have similar or the same attributes, etc.). While embodiments of the invention are described in which it is assumed that the segment based attributes are the same for both directions, alternative embodiments of the invention may keep separate attributes for each direction.

FIG. 2B is a block diagram illustrating an example of path based attributes according to some embodiments of the invention. FIG. 2B shows the segments N1:P3:P2:N3, N3:P1:P2: N4, and N4:P1:P3:N5 (illustrated as dotted lines) forming paths N1:P3:P2:N3, N1:P3:P2:N3:P1:P2:N4, and N1:P3:P2: N3:P1:P2:N4:P1:P3:N5 (illustrated as dashed lines) from FIG. 1C. Each of these segments has segment based attributes; similarly, each of these paths has path based attributes. A path based attribute is an attribute for a path as a whole, as opposed to its individual segments. However, it should be noted that where a path spans only a single segment (e.g., N1:P3:P2:N3), the segment based attributes and path based attributes are the same.

While some embodiments of the invention use path based "optical" attributes of noise and chromatic dispersion and path based "quality" attributes of bit error rate (BER) (based on noise and a specified bit rate) and chromatic dispersion decibel penalty (based on chromatic dispersion at a given bit rate), different embodiments of the invention may use more, less, and/or different ones. For example, chromatic dispersion is typically the largest contributor to signal distortion, and is calculated as discussed below in some embodiments of the invention. There are other contributors to signal distortion. While some embodiments of the invention calculate chromatic dispersion and use margin to cover other contributors of signal distortion, alternative embodiments of the invention may calculate more, less or different contributors to signal distortion and/or use signal distortion itself as a path based quality attribute (e.g., polarization mode dispersion, group delay ripple arising from optical filtering effects, etc.)

For any of these path based attributes, a requirement can be defined (referred to as a path based requirement) which the actual value for the path (the path based value) must meet. For instance, a path based optical requirement may be defined that the path based optical value must meet to be considered acceptable for a desired purpose. Path based requirements may be used for a variety of purposes, including distinguishing between different path dependent grades, establishing a minimum quality for all paths, etc.

Figure 2C:
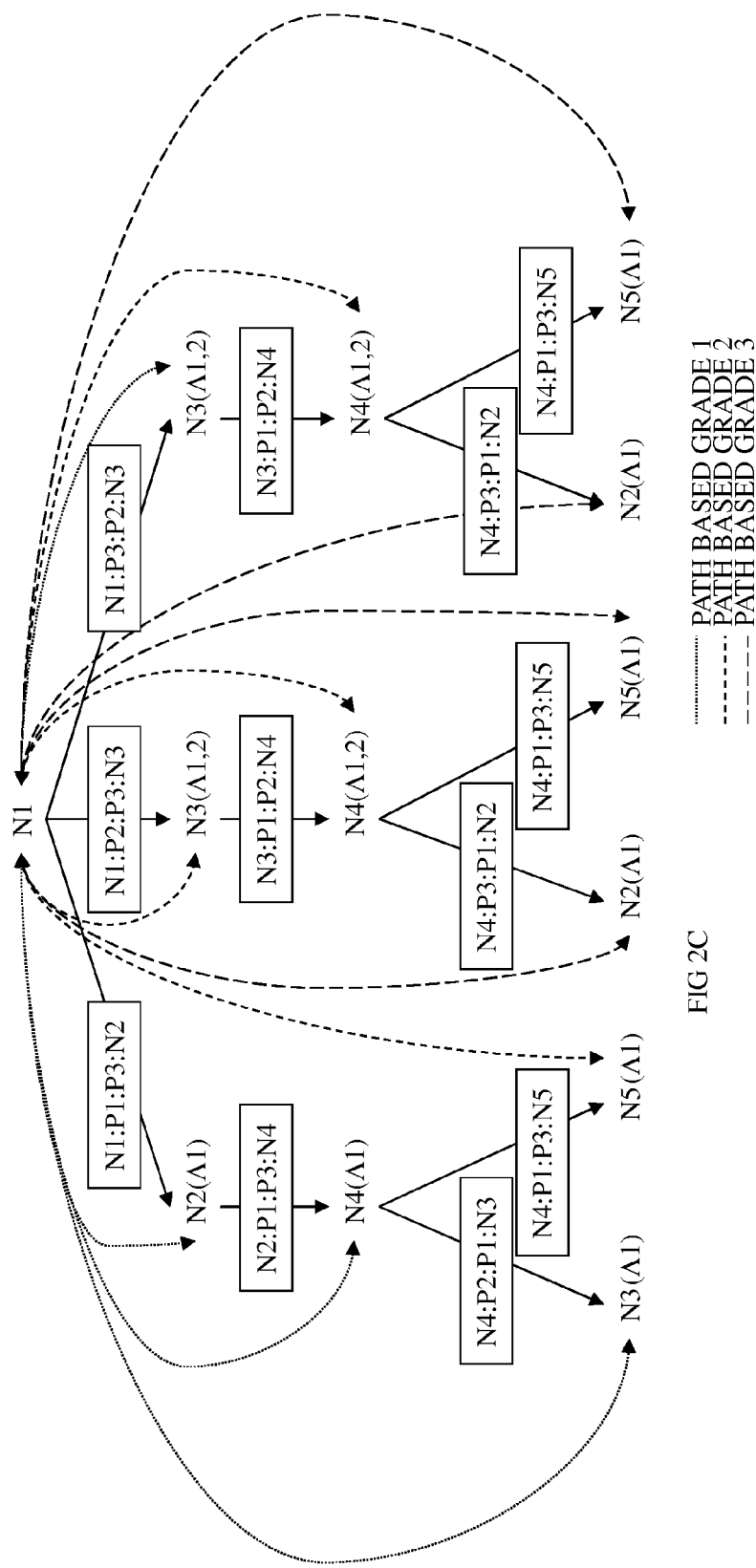
FIG. 2C is a block diagram illustrating an example of different paths for N1 of the exemplary optical network of FIG. 1B qualifying for different path dependent grades according to one embodiment of the invention.

FIG. 2C is a block diagram illustrating an example of different paths for N1 of the exemplary optical network of FIG. 1B qualifying for different path dependent grades according to one embodiment of the invention. FIG. 2C shows the tree structure from FIG. 1C, with the addition of dotted, small dash, and large dash lines; where dotted lines represent path dependent grade 1, small dash lines path represent dependent grade 2, and large dash lines represent path dependent grade 3. As such, each of these lines shows the exemplary path dependent grades of the path between N1 and another node in the tree. The path dependent grades of the available paths shown in FIG. 2C are illustrated in table 1 below.

TABLE 1

| Path | Path Dependent Grade |
|------|----------------------|
| N1:P1:P3:N2 | 1 |
| N1:P1:P3:N2:P1:P3:N4 | 1 |
| N1:P1:P3:N2:P1:P3:N4:P2:P1:N3 | 1 |
| N1:P1:P3:N2:P1:P3:N4:P1:P3:N5 | 2 |
| N1:P2:P3:N3 | 2 |
| N1:P2:P3:N3:P1:P2:N4 | 2 |
| N1:P2:P3:N3:P1:P2:N4:P3:P1:N2 | 3 |
| N1:P2:P3:N3:P1:P2:N4:P1:P3:N5 | 3 |
| N1:P3:P2:N3 | 1 |
| N1:P3:P2:N3:P1:P2:N4 | 2 |
| N1:P3:P2:N3:P1:P2:N4:P3:P1:N2 | 3 |
| N1:P3:P2:N3:P1:P2:N4:P1:P3:N5 | 3 |

It should be understood that qualification for a given grade is path dependent. Thus, as opposed to classifying each segment (or wavelength on a segment) into a grade, a given path is considered as a whole when determining its qualification for a grade. In other words, although all of the segments of a path may individually qualify for a given grade, the path itself may qualify for a different grade. For example, while the segments that make up the path N1:P1:P3:N2:P1:P3:N4:P1: P3:N5 may each qualify for grade 1, the path may qualify for grade 2. As such, path dependent grades are for the path as a whole.

It should be understood that path based attributes and path dependent grades are not limited to the granularity of the path itself, but may include the path/wavelength granularity. For instance, different embodiments of the invention may determine a given path based attribute at the path level of granularity (path attribute), the path/wavelength combination level of granularity (path/wavelength attribute), etc. As a more specific example, different embodiments of the invention may determine a given path based optical attribute at the path level of granularity (path optical attribute), the path/wavelength combination level of granularity (path/wavelength optical attribute), etc. As another example, different embodiments of the invention may determine a given path based quality attribute at the path level of granularity (path quality attribute), the path/wavelength combination level of granularity (path/wavelength quality attribute), etc. Embodiments of the invention that measure a given path based attribute at the path/wavelength combination level of granularity and use it for distinguishing path dependent grades, may therefore classify wavelengths on the same path into different grades; in such embodiments, qualification for a given grade is still path dependent, but it is also wavelength dependent. By way of illustration, and not by limitation, embodiments of the invention that operate on the path level of granularly are described below.

Exemplary Path Based Optical Attributes and Path Based Quality Attributes

Exemplary embodiments will be described in which: 1) the set of path based optical attributes include the cumulative noise and cumulative chromatic dispersion for each path; and 2) the set of path based quality attributes include: a) bit error rate (BER) to distinguish between different grades of path quality; and b) chromatic dispersion decibel penalty to establish a minimum path quality. Alternative embodiments of the invention may use more, less, or different path based optical attributes and path based quality attributes for more, less, or different purposes. In addition, while different embodiments may support more, less, or different bit rates, exemplary embodiments will be described in which bit rates of 2.5 Gigabits per second (Gbps) and 10 Gbps are supported.

Table 2 below shows different BER path based quality requirements, as well as the threshold amount of path based cumulative noise per bit rate according to one embodiment of the invention.

TABLE 2

Maximum Allowable Noise (Nmax) for supported bit rates and target BER (0.1 nm BW)

| BER Path Based Quality Requirements | Bit Rate = 2.5 Gbps | Bit Rate = 10 Gbps |
|---|---|---|
| Target BER = $10^{-15}$ | 19.5 uW (uW = microWatts) | 4.9 uW |
| Target BER = $10^{-12}$ | 47 uW | 11.7 uW |

In some embodiments of the invention, the path based optical requirement of cumulative noise per bit rate is used to distinguish between different path dependent grades. Since BER is based on bit rate and more than one bit rate is supported in table 2, whether a given path qualifies for a given path dependent grade depends on that path's cumulative noise and the required bit rate. Thus, a given path may qualify for a given path dependent grade at 2.5 Gbps and a different path dependent grade at 10 Gbps. As such, table 2 shows 4 path dependent grades (two different BERs by two different bit rates). In addition, since BER is based on a path based optical attribute that is cumulative (the sum of the noise of the segments of a path can be used to estimate the noise of the path), the segments of the path may qualify individually for better grades than the path as a whole at a given bit rate. By way of example with reference to FIG. 2B, even if each of the segments N1:P1:P3:N2, N2:P1:P3:N4, and N4:P1:P3:N5 have BERs at the 2.5 Gbps bit rate that qualify them for a path based grade of 1, the path as a whole may have a BER at the 2.5 Gbps bit rate that qualifies for a path based grade of 2.

Table 3 below shows the maximum allowable chromatic dispersion decibel penalty (CDdBmax), as well as the maximum allowable amount of path based cumulative chromatic dispersion (CDmax) for each bit rate according to one embodiment of the invention.

TABLE 3

|  | Bit Rate = 2.5 Gbps | Bit Rate = 10 Gbps |
| --- | --- | --- |
| CDdB max (2 dB penalty) | +/− 11000 ps/nm | +/− 800 ps/nm |

The values shown in tables 2 and 3 are exemplary, and thus may change based on various circumstances (e.g., different implementations). Exemplary techniques of determining values for these tables will be described. According to some embodiments of the invention, the BER values in Table 2 are based on determining the ideal case, then allowing for 'coding gain' from the use of Forward Error Correction (FEC) (this is optional, and may not be used or used only in certain places), and then adding extra 'margin' (determined based on knowledge of the implemented system—e.g., 12 dBs) to account for real world conditions (e.g., temperature changes, environmental effects, etc.). The quantity for linear Q is defined as the ratio of signal/noise at the receiver decision circuit. A theoretical approximation has been derived relating BER to linear Q for NRZ signals: $BER=(0.4/Qlinear)*exp(-0.5*Qlinear^2)$. QdB is defined as $20*log(Qlinear)$. The Optical Signal to Noise Ratio (OSNR) is commonly measured in a 0.1 nm bandwidth (approx. 12.5 GHz at DWDM wavelengths in the C-band of interest). An approximation that relates the OSNR to Q is: $Q(dB)=OSNR(dB)+10\log(Bo/Be)$, where Bo=optical bandwidth (0.1 nm~12.5 GHz at 1550 nm) and Be =electrical bandwidth (~0.7*bit rate). As such, QdB=OSNRdB+2.5 dB for 10 Gbps and OSNRdB+8.5 dB for 2.5 Gbps. Based on FEC and the margin, the exemplary values in Table 4 below may be generated:

TABLE 4

| BER after FEC for 10 Gbps System | | | | | |
| --- | --- | --- | --- | --- | --- |
| Linear Q | Q(dB) | OSNR min | OSNR(margin) | BER (raw) | BER (FEC) |
| 3.1 | 9.8 dB | 7.3 dB | 19.3 dB | $10^{-3}$ | $10^{-12}$ |
| 4.8 | 13.6 dB | 11.1 dB | 23.1 dB | $10^{-6}$ | $10^{-15}$ |

Some embodiment determine noise for each link as follows: OSNR=(signal power)/(total amplifier noise of the path)=Ps/Nt, or OSNRdB=Ps(dB)−Nt(dB), and if Ps(dB)=0 dBm, then Nt(dB)=−OSNR(dB). As such, Table 5 below shows the exemplary noise values from table 2 in the context of part of table 4:

TABLE 5

| Bit Rate | BER (FEC) | OSNR (margin) | Total optical noise (in 12.5 GHz) | |
| --- | --- | --- | --- | --- |
| 10 Gbps | $10^{-12}$ | 19.3 dB | −19.3 dBm | 11.7 uW |
| 10 Gbps | $10^{-15}$ | 23.1 dB | −23.1 dBm | 4.9 uW |
| 2.5 Gbps | $10^{-12}$ | 13.3 dB | −13.3 dBm | 47 uW |
| 2.5 Gbps | $10^{-15}$ | 17.1 dB | −17.1 dBm | 19.5 uW |

According to some embodiments of the invention, the chromatic dispersion values in table 3 are based on ratings provided by the manufacturers of the components used (typically the source WDM transmitter, but may also include the WDM receiver). To continue the above example in which the margin of 12 dB is used, some part of this (e.g., 2 dB) is allocated for CDdBmax. Based on this amount, ratings are provided per bit rate for the CDmax of a path as shown in table 3. While the table shows the same CDmax for both the positive and negative direction (see the +/− symbol), alternative embodiments may have different values for the positive and negative direction.

Exemplary Techniques for Determining Values for Path Based Optical Attributes

The values for path based optical attributes for different paths may be determined in a variety of ways and at different times (e.g., estimated, calculated and/or measured; during operation (e.g., in real-time; periodically; at installation; etc.) and/or predetermined and manually input; etc.), including those future developed. In addition, while embodiments of the invention may use a variety of approaches to determine the values of path based optical attributes for different paths (the path as a whole), some of embodiments of the invention use a segment based approach for determining values for path based optical attributes like noise and chromatic dispersion. As such, in some embodiments of the invention, the values for path based optical attributes like noise and chromatic dispersion of a given path are generated from combining the "segment based optical attributes" of the segments of that path. This combining can take a variety of forms (e.g., numerically combining).

FIG. 3 is a flow diagram illustrating a segment based approach to determining path based optical attributes according to some embodiments of the invention. In block 360, the values of the optical attributes for segments are determined. From block 360, control passes to block 365. Block 360 may be performed in a variety of ways and at different times (e.g., estimated, calculated and/or measured; during operation (e.g., in real-time; periodically; at installation; etc.) and/or predetermined and manually input; etc.), including those future developed. For example, in one embodiment of the invention: 1) the noise and chromatic dispersion of each new segment are estimated based on the components used and length and type of fiber used on that particular link; and 2) the estimates for each segment are entered into the system (e.g., into each node, into a centralized network management server, etc.). In other embodiments of the invention, for each node: 1) an estimate of the noise a node will contribute to a segment based on the components used is determined and stored in the node; 2) an estimate of the chromatic dispersion a node will compensate based on the components used for a segment is determined and stored in the node; and 3) these estimates are combined with the length of and type of fiber used at deployment for each segment to determine the noise and chromatic dispersion for that segment. In yet other embodiments of the invention, at installation of a new segment the noise and chromatic dispersion are measured and entered into the system. In still yet other embodiments of the invention, one or both nodes of each segment determine the noise and chromatic dispersion (at deployment and/or during operation).

As shown in block 365, the values of the path based optical attributes are determined from the determined values for the segment based optical attributes. As indicated above, block 360 may be performed in a variety of ways and at different times (e.g., during operation (e.g., for every path, for a given path responsive to selection criteria, etc.), pre-calculated, etc.), which in part depend on the approach used to operate the optical network. For example, some embodiments of the invention in which a centralized network management server is used, the values for the segment based optical attributes are determined by adjacent nodes and sent to the centralized network management server which determines the values for the path based optical attributes for the various available paths. As another example, some embodiments of the invention in which a source based scheme and a distributed search based technique are used, the values for the segment based optical attributes are determined by adjacent nodes and the values for the path based optical attributes are determined for the various available paths during discovery of the various paths through the distributed search based scheme. These and other embodiments of the invention are described in more detail later herein.

Segment Based Path Chromatic Dispersion

In some embodiments of the invention an assumption is made that the chromatic dispersion for a segment is similar or the same for all of the wavelengths traversing that segment. As such, these embodiments represent the chromatic dispersion for a segment with a single number—CDsegment. When using the segment based approach, the chromatic dispersion for the path (CDpath) is the sum of the chromatic dispersion of each segment of that path. While some embodiments of the invention assume chromatic dispersion for a segment is similar or the same for all of the wavelengths traversing that segment (and thus use a path level of granularity for this path based optical attribute), alternative embodiments determine the chromatic dispersion for each wavelength traversing each segment (and thus use a path/wavelength combination granularity for this path based optical attribute).

Some embodiments of the invention determine the chromatic dispersion for a segment based on: 1) the length and type of fiber; and 2) the amount and type (if any) of dispersion compensation used (e.g., in the pre-amp of the downstream node; a parameter that may be determined—e.g., known based on the component used, tuned by software once a fiber is physically plugged into the node and thus known when set by the software, etc.). As indicated above, different embodiments may determine the chromatic dispersion in different ways (e.g., manually input the chromatic dispersion for a segment when commissioned through a management interface; program nodes to measure loss to estimate length, estimate raw chromatic dispersion from the estimated length based on the type of fiber input through a management interface, and adjust this based on the amount of dispersion compensation used (if any); program nodes to calculate the chromatic dispersion for a segment from an input amount/type of dispersion compensation (e.g., when the module is installed) and an input amount length/type of fiber (e.g., when it is connected); program nodes with tunable dispersion compensators to adjust them, and then, based on rules dealing with component tolerances, assign a CDsegment for the link; etc.). By way of specific example, in some embodiments of the invention, a table of fiber types to values for ps/nm/kilometer is kept, from which, based on the length of the fiber (input into the system, estimated based on loss, etc.), the raw CD may be determined for a segment. This raw CD is then adjusted by any dispersion compensation employed for the segment to determine the CD for the segment (CDsegment).

Segment Based Path Noise

In some embodiments of the invention an assumption is made that the noise for a segment is similar or the same for all of the wavelengths of that segment. As such, these embodiments represent the noise for a segment with a single number—Nsegment. When using the segment based approach, the noise for the path (Npath) is based on the sum of the noise of each segment of that path. While some embodiments of the invention assume noise for a segment is similar or the same for all of the wavelengths of that segment (and thus use a path level of granularity for this path based optical service attribute), alternative embodiments determine the noise for each wavelength of each segment (and thus use a path/wavelength combination granularity for this path based optical service attribute).

Some embodiments of the invention determine the noise for a segment based on the booster in the up stream node and the pre-amp in the downstream node. Since both are optical amplifiers, noise from each may be determined from $N(EDFA)=NF*h*v*Bo(G-1)$, $h$=Planck's constant $(6.63*10^{-34}$ J/Hz), $v$=optical frequency (Hz), Bo=optical bandwidth in Hz, NF=noise figure of the amp (linear) (which in dB is written NFdB), and G=amplifier gain. By way of specific example, if $G=+20$ dB=100 (linear) and $G-1=99$, this equation may be simplified to $N(EDFA)=NF*h*v*Bo(G)$; and where v (although it depends on the channel) is set for approximately $1.94\times10^{14}$ Hz, and Bo is set for 0.1 nm=$1.25*10^{10}$ Hz, then $h*v*Bo=1.6*10^{-9}$ J-Hz=1.6e-9 Watts and the equation for the noise of a segment (Nsegment) is 1.6e-9*(noise figure of the booster $(NF_B)$*gain booster $(G_B)$+noise figure of the pre-amp $(NF_P)$*gain pre-amp $(G_P)$). $NF_B$ and $G_B$ are typically known parameters based on the component used, and in this specific example the values of $NF_B=4$ (6 dB) and $G_B=19$ dB (=x79 linear) result in the equation becoming Nsegment=1.6e-9*(79*4*+NFp*Gp) (watts). The pre-amp gain may vary depending on fiber characteristics and can vary in this example from approximately 10 dB (x10 linear) to 25 dB (x316 linear). For variable gain amplifiers, generally NFp will vary with Gp and different embodiments may use different techniques to determine a value (e.g., a table may be provided to determine NFp for a given Gp). Based on the exemplary values of NFp=4 (6 dB) and Gp=100 (20 dB), Nsegment=0.7 uW; and thus, with reference to table 5 above, a path could go through a concatenation of 4.9/0.7=7 such links before a bit error rate of $10^{-15}$ could no longer be guaranteed at 10 Gbps.

As indicated above, different embodiments may establish this information in different ways (e.g., input the noise for a segment when commissioned; program nodes to calculate the noise for a segment from knowledge of booster noise figure/gain and pre-amp noise figure (e.g., when the module(s) is installed) and an input amount length/type of fiber to determine pre-amp gain (e.g., when it is connected); program nodes to calculate the noise for a segment from an input amount of booster noise figure/gain and pre-amp noise figure (e.g., when the module(s) is installed) and a measured amount of pre-amp gain (e.g., when the fiber is connected and/or periodically during operation); etc.). While some embodiments determine noise for a segment based on the length/type of fiber and the booster and pre-amp used, alternative embodiments may use more, less or different characteristics (e.g., non-linear effects (such as cross phase modulation, etc.).

Exemplary Manners of Operation

By way of example, some embodiments of the invention perform the operations of FIG. 3 as follows: the nodes identify links that connect them to other adjacent nodes, the channels thereon, and the values for the set of segment based optical attributes of those segments; each node initiates in a distributed search based scheme to discover the available paths (and in some embodiments of the invention, all possible paths) from itself to other nodes, as well as the wavelengths on those paths, and to discover the values of the set of path based optical attributes of those paths by combining the segment based optical values; a source based scheme is used to provision the optical network. By way of a another example, some embodiments of the invention perform the operations of FIG. 3 as follows: the nodes identify links that connect them to adjacent nodes, the channels thereon, and the set of segment based optical values of those segments; each node reports this information of the centralized network management service which determines the available paths (and in some embodiments of the invention, all possible paths) in the network, as well as the wavelengths on those paths, and the path based optical values of those paths by combining the segment based optical values; a centralized network management or hybrid scheme is used to provision the optical network. By way of yet another example, some embodiments of the invention perform the operations of FIG. 3 as follows: the nodes, links, channels, paths, and path based optical values are input into the nodes and/or a centralized network management server; and a source based, centralized network management, or hybrid scheme is used to provision the optical network. Of course, these are only exemplary manners of operation and other embodiments of the invention may use other techniques.

Exemplary Techniques for Applying Path Based Quality Requirements

There are a variety of methods that may be used to determine if a given a given path (and/or path/wavelength combination) meets a set of one or more identified path based quality requirements (at a given bit rate, where different bit rates may be used). FIG. 4 is a flow diagram for applying path based quality requirements according to some embodiments of the invention. The flow diagram shown in FIG. 4 may be applied in one or more circumstances depending on the implementation (e.g., when paths and wavelengths thereon are being discovered, when a new path/wavelength combination is being selected for allocation, etc.). As such, the flow diagram in FIG. 4 is simply shown starting responsive to identified path based optical values and path based quality requirements (block 400). From block 400, control passes to block 405.

In block 405, a path based quality check is performed. As described below, there are a variety of ways for performing block 405. For example, when using the path based optical attributes and path based quality attributes of tables 2 and 3, embodiments of the invention may convert in either direction (optical attribute to quality attribute or quality attribute to optical attribute). Of course, some embodiments of the invention may additionally include other checks (e.g., a limit on the number of total hops allowed—referred to as Xmax—such as 40 hops for 2.5 Gbps; 10 hops for 10 Gbps). The result of performing block 405 would be used to determine if the path for which the path based optical values were supplied meets the identified path based quality requirements.

FIG. 5A is a flow diagram illustrating a method of performing a path based quality check according to some embodiments of the invention. In block 520, the path based optical requirement(s) are determined from the path based quality requirement(s). From block 520, control passes to block 525. Assuming that the values show in tables 2 and 3 are used, the following are determined: 1) the maximum chromatic dispersion allowed ($CD_{max}$); and 2) the maximum noise allowed ($N_{max}$). For example, if the identified BER requirement is $10^{-15}$ and the identified bit rate is 2.5 Gbps, the set of path based optical requirements are maximum chromatic dispersion of +/−11000 ps/nm and the maximum noise of 19.5 uW. Thus, in the flow of FIG. 5A, path based optical requirements are determined through the conversion of path based quality requirements and the specified bit rate.

As shown in block 525, it is determined if the path based optical value(s) meet the determined path based optical requirement(s). The manner of accessing the values for path based optical attributes for that path is based on the manner of storage thereof (several examples are described later herein). Assuming that the values shown in tables 2 and 3 are used, the following are determined: 1) if the chromatic dispersion for the path ($CD_{path}$) is less than or equal to the maximum chromatic dispersion allowed ($CD_{max}$); and 2) if the noise of the path ($N_{path}$) is less than or equal to the maximum noise allowed ($N_{max}$). To continue the example from above where the identified BER requirement is $10^{-15}$ and the identified bit rate is 2.5 Gbps, if the chromatic dispersion of the path is 9000 ps/nm and the noise of the path is 15 uW, then the path based optical values meet the determined path based optical requirements.

FIG. 5B is a flow diagram illustrating another method of performing a path based quality check according to some embodiments of the invention. For the flow of FIG. 5B, path based quality values are determined through conversion of path based optical values and the specified bit rate. In block 540, the path based quality value(s) are determined from the path based optical value(s). From block 540, control passes to block 545. Assuming that the values shown in tables 2 and 3 are used, the BER and chromatic dispersion decibel penalty are determined for the path (respectively, $BER_{path}$ and $CDdB_{path}$).

As shown in block 545, it is determined if the path based quality value(s) meet the determined path based quality requirement(s). Assuming that the values shown in tables 2 and 3 are used, the following are determined: 1) if the chromatic dispersion decibel penalty for the path ($CDdB_{path}$) is less than or equal to the maximum chromatic dispersion decibel penalty allowed ($CDdB_{max}$); and 2) if the BER of the path ($BER_{path}$) is less than or equal to the maximum BER allowed ($BER_{max}$).

Thus, there are a variety of methods that may be used to determine if a given path (and/or path/wavelength combination) meets a set of path based quality requirements. It should be understood that the operations of these methods may be done on the fly, periodically, or in advance. For example, with reference to block 540, the path based quality values for all available paths at all supported bit rates may be determined in advance, and then the previously determined values for the path accessed prior to performing block 545. As another example, the path dependent grade for all available paths may be determined in advance, and then the previously determined grade accessed to determine if a path passes the quality check. As another example, the operations in these methods may be performed at different times for different the path based quality attributes (e.g., it may be determined in advance or periodically, which paths meet the chromatic dispersion decibel penalty requirement at which bit rates; but it may be determined on the fly whether a given path meets the BER requirement of a given path dependent grade).

Path Dependent Optical Service Levels

In some embodiments of the invention, paths and wavelengths thereon are selected and allocated responsive to incoming requests for establishment of optical connections (referred to as optical demands). These optical demands may be responsive to a variety of different events, including a request to handle new traffic, an internal event (e.g., a failure of a node, link, etc.), etc. Each such optical demand is described by its associated optical demand requirements.

The optical demand requirements may include different requirements depending on the optical network device, the features supported, the reason for the optical demand, etc. By way of example, optical demand requirements may include source node (unless this is implicit in that the operations are being performed by the source node in a system using a source based scheme), destination node, path type(s) (e.g., regular or disjoint; if disjoint, whether restricted or protection; if protection, then protection type if more than one is supported (e.g., one or more of 1+1 protected, 1:1 protected, 1:N mesh restored, optical reroutable, unprotected, etc.)), bit rate, one or more path based quality requirements, etc.

Each of these optical demand requirements may be determined a variety of ways, including being predetermined, derived from other requirements, specified, defaulted if unspecified, etc. For instance, where multiple bit rates are supported as described above, the bit rate may be specified by a received external request, selected internally, etc. As another example, where the path based quality attribute of decibel penalty chromatic dispersion is used as described in table 3, the chromatic dispersion levels for the different bit rates are predetermined, but the chromatic dispersion to be used for the current optical demand is determined from the bit rate requirement of that optical demand.

One manner of identifying different optical demand requirements for optical demands is path dependent optical service levels. Path dependent optical service levels are useful, for example, to: 1) simplify the specification of the demand requests; and 2) specify performance requirements in terms of parameters that customers may find relevant and would be willing to pay for. Path dependent optical service levels may be distinguished based upon a set of one or more path based quality requirements, as well as zero or more other requirements (e.g., protection type, bit rate, etc.).

By way of a specific example of defining path dependent optical service levels, Table 6 below shows path dependent optical service levels distinguished based upon protection type, rerouting priority, and the path based quality requirements shown in table 2 above.

TABLE 6

| Path Dependent Optical Service Level | Protection Type | Reroute Priority | BER |
|---|---|---|---|
| A | 1 + 1 | 0 | Target BER = $10^{-15}$ |
| B | 1:1 | 0 | Target BER = $10^{-15}$ |
| C | 1:N | 1 | Target BER = $10^{-15}$ |
| D | 1:N | 1 | Target BER = $10^{-12}$ |
| E | 1:N | 2 | Target BER = $10^{-15}$ |
| F | Optical Reroutable | 2 | Target BER = $10^{-12}$ |
| G | None | 3 | Target BER = $10^{-12}$ |

Figure 6:
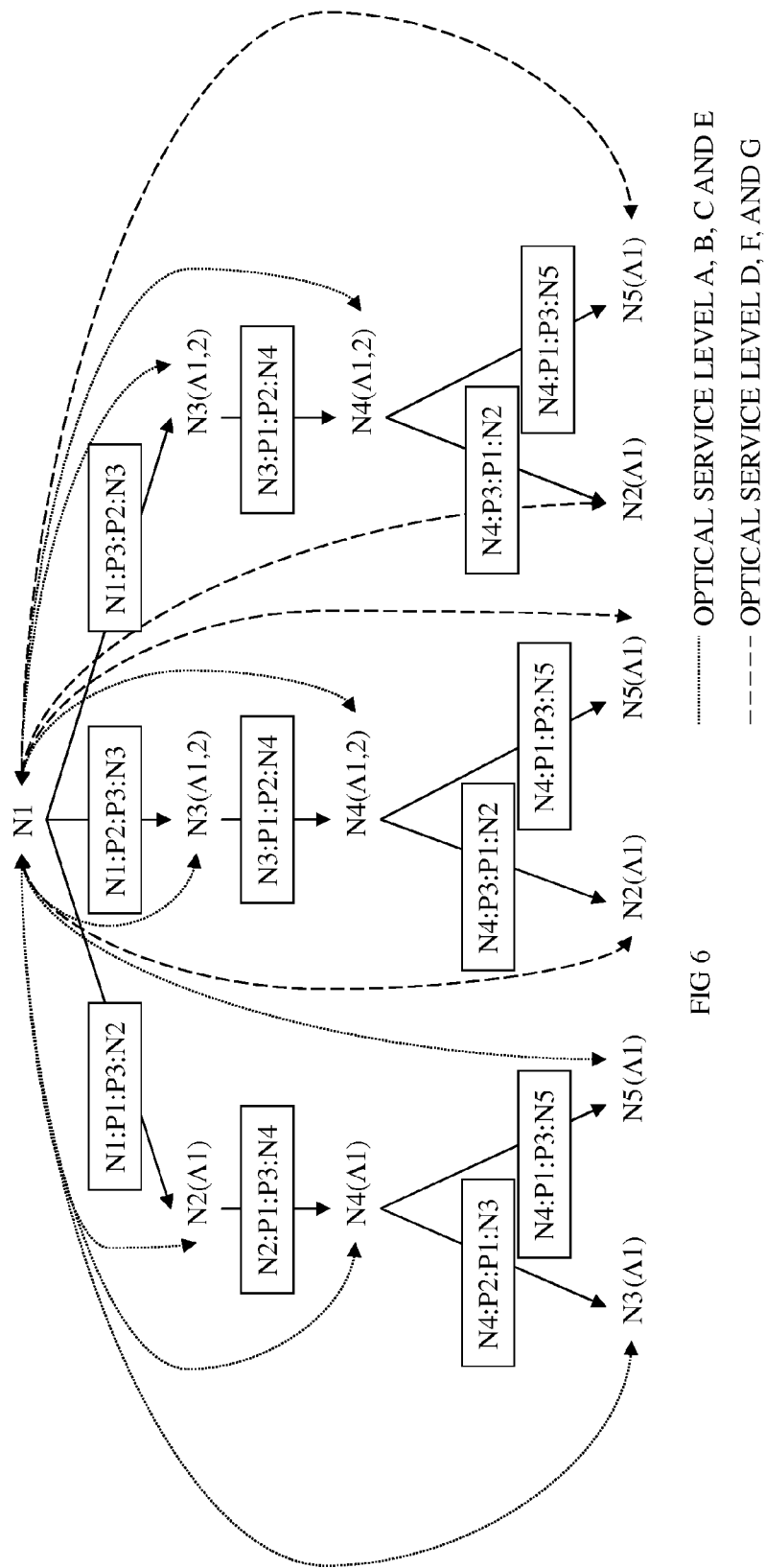
FIG. 6 is a block diagram illustrating an example of different paths for N1 of the exemplary optical network of FIG. 1B qualifying for different optical service levels at a given bit rate according to some embodiments of the invention.

With regard to the path dependent optical service levels defined in Table 6, responsive to an optical demand for new path/wavelength combination(s) (as opposed to responding to a failure) that includes optical demand requirements that include an identified one of the supported bit rates and of the path dependent optical service levels, the following would be performed: 1) the path dependent service level is used to determine what paths are needed based upon the protection type of the identified path dependent optical service level (a regular path for a working path, as well as possibly a disjoint path for a protection path of the type specified); and 2) the path based quality check information is determined based upon the bit rate and the BER of the identified path dependent optical service level. FIG. 6 is a block diagram illustrating an example of different paths for N1 of the exemplary optical network of FIG. 1B qualifying for different optical service levels at a given bit rate according to some embodiments of the invention. FIG. 6 shows the tree structure from FIG. 1C, with the addition of dotted and dashed lines; where dotted lines represent path dependent optical service levels A, B, C and E (paths qualify for all of these path dependent optical service levels because they use the same BER, but they are distinguished by protection type and/or reroute priority); and where dashed lines represent optical service levels D, F, and G. As such, each of these lines shows the exemplary path dependent optical service levels at a give bit rate of the path between N1 and another node in the tree. The path dependent optical service levels of the available paths in FIG. 6 are illustrated in table 7 below.

TABLE 7

| Path | Path Dependent Optica Service Levels |
|---|---|
| N1:P1:P3:N2 | A, B, C, and E |
| N1:P1:P3:N2:P1:P3:N4 | A, B, C, and E |
| N1:P1:P3:N2:P1:P3:N4:P2:P1:N3 | A, B, C, and E |
| N1:P1:P3:N2:P1:P3:N4:P1:P3:N5 | A, B, C, and E |
| N1:P2:P3:N3 | A, B, C, and E |
| N1:P2:P3:N3:P1:P2:N4 | A, B, C, and E |
| N1:P2:P3:N3:P1:P2:N4:P3:P1:N2 | D, F, and G |
| N1:P2:P3:N3:P1:P2:N4:P1:P3:N5 | D, F, and G |
| N1:P3:P2:N3 | A, B, C, and E |
| N1:P3:P2:N3:P1:P2:N4 | A, B, C, and E C |
| N1:P3:P2:N3:P1:P2:N4:P3:P1:N2 | D, F, and G |
| N1:P3:P2:N3:P1:P2:N4:P1:P3:N5 | D, F, and G |

Similar to path dependent grades, it should be understood that qualification for a given optical service level is path dependent. Thus, as opposed to classifying each segment (or wavelength on a segment) into an optical service level, a given path is considered as a whole when determining its optical service level. In other words, although all of the segments of a path may individually qualify for a given optical service level at a given bit rate, the path itself may qualify for a different path dependent optical service level at that same bit rate. For example, while the segments that make up the path N1:P1:P3:N2:P1:P3:N4:P1:P3:N5 may each qualify for optical service levels A, B, C and E, the path may qualify for path dependent optical service levels D, F, and G.

By way of another example of defining path dependent optical service levels, the path dependent optical service levels could be distinguished based the BER path based quality requirements in table 2 and bit rates Similar to path based grades, embodiments of the invention that measure a given path based quality attribute at the path/wavelength combination level of granularity and use it for distinguishing path dependent optical service levels, may therefore classify wavelengths on the same path into different optical service levels; in such embodiments, qualification for a given optical service level is still path dependent, but it is also wavelength dependent.

Figure 7:
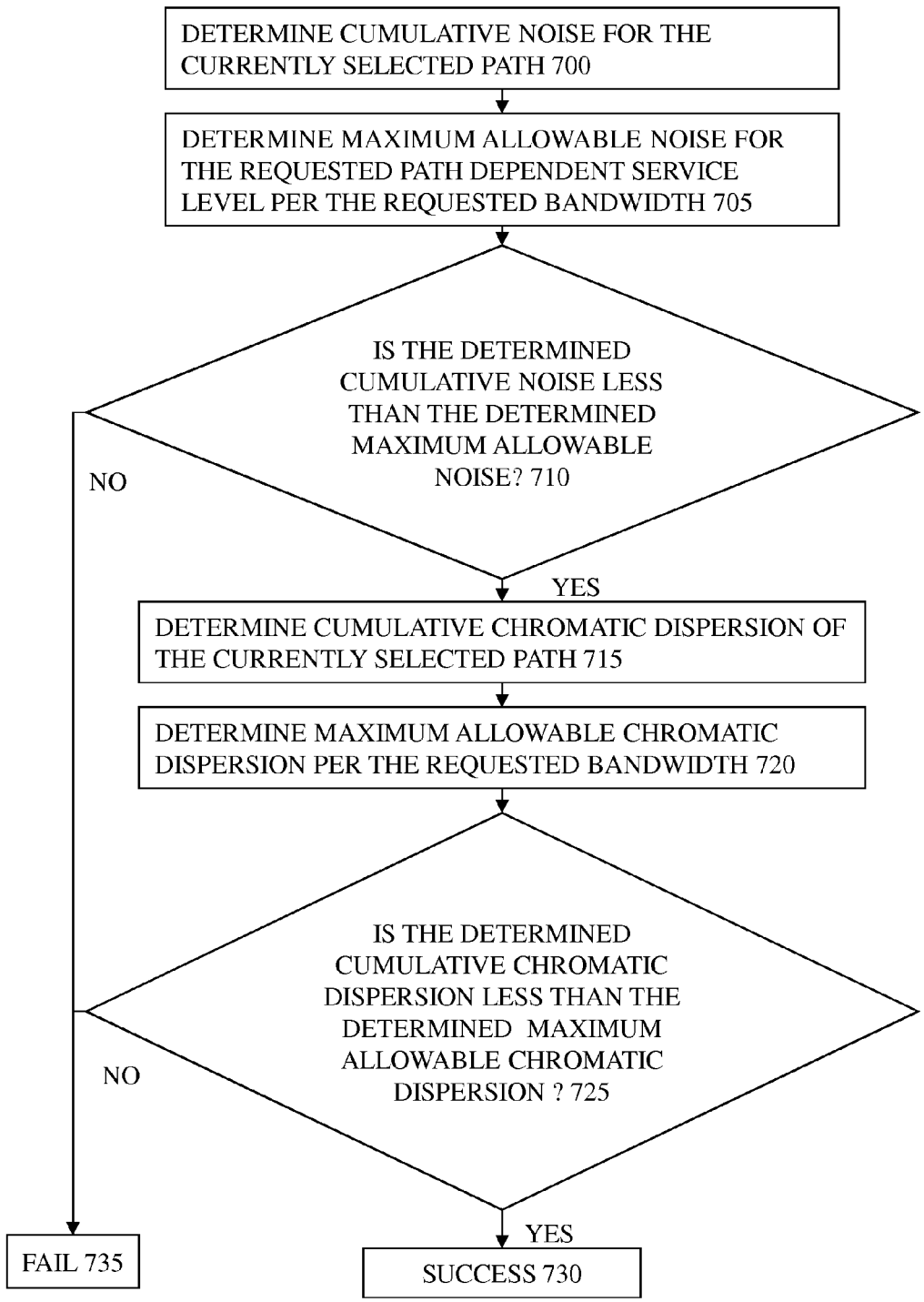
FIG. 7 is a flow diagram for a path based quality check for a currently selected path using the path dependent optical service levels of table 6 and the chromatic dispersion levels of table 3 according to some embodiments of the invention.

FIG. 7 is a flow diagram for a path based quality check for a currently selected path using the path dependent optical service levels of table 6 and the chromatic dispersion levels of table 3 according to some embodiments of the invention. In block 700, the cumulative noise for the currently selected path is determined and control passes to block 705. Thus, the path based optical value for noise is determined in block 700.

As shown in block 705, the maximum allowable noise for the requested path dependent optical service level per the requested bit rate is determined and control passes to block 710. According to one embodiment of the invention, the requested path dependent optical service level is used to access table 6 to determine the path based quality requirement for BER. This BER, along with the requested bit rate, is used to access table 2 to determine the path based optical requirement for noise.

In block 710, it is determined if the determined cumulative noise is less than the determined maximum allowable noise. If so, control passes to block 715. Otherwise, control passes to block 735. Thus, the path based optical value is compared to the path based optical requirement for cumulative noise.

As shown in block 715, the cumulative chromatic dispersion for the currently selected path is determined and control passes to block 720. Thus, the path based optical value for chromatic dispersion is determined in block 715

In block 720, the maximum allowable chromatic dispersion per the requested bit rate is determined and control passes to block 725. According to one embodiment of the invention, the requested bit rate is used to access table 3 to determine the path based optical requirement for chromatic dispersion.

In block 725, it is determined if the determined chromatic dispersion is less than the determined maximum allowable chromatic dispersion. If so, control passes to block 730. Otherwise, control passes to block 735. Thus, the path based optical value is compared to the path based optical requirement for chromatic dispersion.

In block 730, the currently selected path has passed the quality check; In block 735, the currently selected path has failed the quality check. The result in blocks 730 and 735 would be used during path/wavelength selection to determine if a currently selected path meets the quality requirements.

While FIG. 7 shows a flow for performing a quality check, it should be understood that alternative embodiments may use other techniques. For instance, the path quality check of FIG. 7 is similar to the flow of FIG. 5B; Alternative embodiments of the invention could operate similar to the flow of FIG. 5A. As another example, certain blocks could be performed in a different order or in parallel. As yet another example, some embodiments of the invention additionally include a limit on the number of hops that are allowed (as previously described).
Path Types By way of example, two types of paths are described: regular paths (paths selected irrespective of their disjointness from other network resources) and disjoint paths. In the case of a disjoint path, selection of path may include the use of disjointness constraints (e.g., a disjointness level such as none, maximally link disjoint, fully link disjoint, maximally node disjoint, fully node disjoint) and the network resources to be disjoint from (e.g., a path in the case of, for example, a protection path; a set of nodes and/or links in the case of, for example, a restricted path; etc.). Specifically, the selection of a disjoint path would require that the path be sufficiently disjoint from the network resources per the disjointness constraints.

For example, assuming that the disjointness constraints specify some level of node disjointness, in one embodiment of the invention, the nodes of the selected path are determined from the database and each node, excluding the source and destination nodes, is compared to each node in the network resources to be disjoint from until either the number of intersections indicates the selected path is not sufficiently disjoint or all of the nodes have been compared. By way of more particular example, assuming that a regular path and a path disjoint from that regular path are requested; in certain embodiments, the regular path would be selected from the database, and then a path other than the path selected for the regular path would be selected for the intersection comparison (excluding source and destination nodes).

By way of another example, assuming that the disjointness constraints specify some level of link disjointness, in one embodiment of the invention, the links of the selected path are determined from the database (e.g., where the format described above is used, the node:outgoing port:incoming port:node for each link is accessed) and each link is compared to each link in the network resources to be disjoint from until either the number of intersections indicates the selected path is not sufficiently disjoint or all of the links have been compared. By way of more particular example, assuming that a regular path and a path disjoint from that regular path are requested; in certain embodiments, the regular path would be selected from the database, and then a path other than the path selected for the regular path would be selected for the intersection comparison.

If the disjoint constraint cannot be met, certain embodiments of the invention may lower the level of disjointness (e.g., the descending order may be fully node disjoint, maximally node disjoint, fully link disjoint, maximally link disjoint; in the case of maximally disjoint, lowering the number of network resources in common; etc.).

Certain embodiments of the invention allow for the provisioning of optical circuits in real-time (or on the fly). Such real-time provisioning of optical circuits allows for a redundancy (protection) scheme referred to herein as optical reroutable. In the optical reroutable redundancy scheme, upon learning of a failure affecting an optical circuit, a new optical circuit is provisioned in real time and the traffic moved to it. For example, in certain embodiments of the invention in which the optical network includes optical network nodes that have optical cross-connects, upon learning of a failure affecting a given optical circuit, one end node of that optical circuit (e.g., the one that originally received the demand that caused the provisioning of that optical circuit) causes the provisioning of a new optical circuit in real time and both end nodes move the traffic to it. By way of particular example, in such embodiments of the invention that use a source based scheme and are conversion free, upon learning of a failure affecting a given optical circuit, the end node that originally received the demand causes the provisioning of a lightpath in either direction (where both lightpaths share the same path to the other end node) and both end nodes switch the traffic to these lightpaths. The selection of such paths in the optical reroutable protection scheme may be performed in a variety of different ways (e.g., updating the network database with the failure and selecting a new regular path, selecting a path disjoint from the path on which the failure occurred from the network database before it has been updated with the failure, etc.). While some embodiments of the invention support such an optical reroutable redundancy scheme, alternative embodiments of the invention may implement optical reroutable redundancy schemes differently, not implement an optical reroutable redundancy scheme, etc.

Exemplary Optical Network Device Architecture Embodiments

An optical network device with an optical cross connect that acts as an access node can be thought of comprising two parts (an optical switch part and an add/drop part). The optical switch part includes those components that switch the light (e.g., the switch fabric; the optical network ports; amplifiers; buffers; wavelength splitters; adjustable amplifiers; etc.). The add/drop part may perform a variety of functions depending upon implementation, including accepting non-DWDM signals from external equipment, internally electrically switching and multiplexing those signals to common destinations/OSLs and generating DWDM wavelengths (sometimes called 'native wavelengths' because they are generated within the node itself) as well as the reverse functions on the egress side. As such, in an optical network using optical network devices with optical switching capability, traffic may enter at the add/drop part of a source access node, be electrically switched or transformed to a DWDM signal, the DWDM signal be directed, and switched to the appropriate output port by the optical switch part of the source access node for transmission along a lightpath (which may include passage through the optical switch part of one or more intermediate nodes, but not their add/drop parts), be received by the optical switch part of the destination access node, and be provided to the add/drop part of the destination access node. The optical switch parts of the nodes of an optical network are considered to be part of the optical domain.

Some embodiments of the invention include an optical network device having an architecture to which: 1) different DWDM transceiver cards (DTMs) (that each include one or more DWDM transceiver interfaces (DTIs), which in turn each include a transmit part and a receive part; each transmit part includes a tunable laser (a laser that can generate a variety of different DWDM wavelengths)) that can be modulated at different bit rates (e.g., some support a bit rate of 2.5 Gbps and some a bit rate of 10 Gbps) can be both inserted and removed from the system; and 2) different optical switch fabric cards that switch different wavelengths can be added and removed. In such embodiments of the invention, the available wavelengths from the perspective of the optical switch part of the optical network device depends on the wavelengths the optical switch fabric cards can switch; where the ability to generate a wavelength of a given bit rate from the perspective of the add/drop part of the optical network device depends on the availability of a DWDM transceiver interface with a laser tunable to the right wavelength and of the right bit rate and the nature of its physical connection to the optical switch part. As such, as part of selecting and allocating network resources for transmitting traffic, a routing protocol may: 1) select unallocated DWDM transceiver interfaces in the source and destination node; 2) select a new path/wavelength combination; 3) provision the selected DWDM transceiver interfaces and selected path/wavelength combination, including associating the selected DWDM transceiver interfaces to the path/wavelength combination.

Of course, alternative embodiments of the invention may include optical network devices having other architectures (e.g., architectures that support more, less, and/or different bit rates; architectures for which each network device supports all of the network's wavelengths (e.g., a single optical switch fabric card that supports all of the network's wavelengths)—and thus, the available wavelengths from the perspective of the optical switch part of such optical network devices will be the same; architectures that use non-tunable lasers—and thus, the ability to generate a wavelength of a given bit rate from the perspective of the add/drop part of the optical network device depends on the availability of a laser of that wavelength; etc.)

Exemplary Routing Database Embodiments

Exemplary Routing Database Organizations

Figure 8:
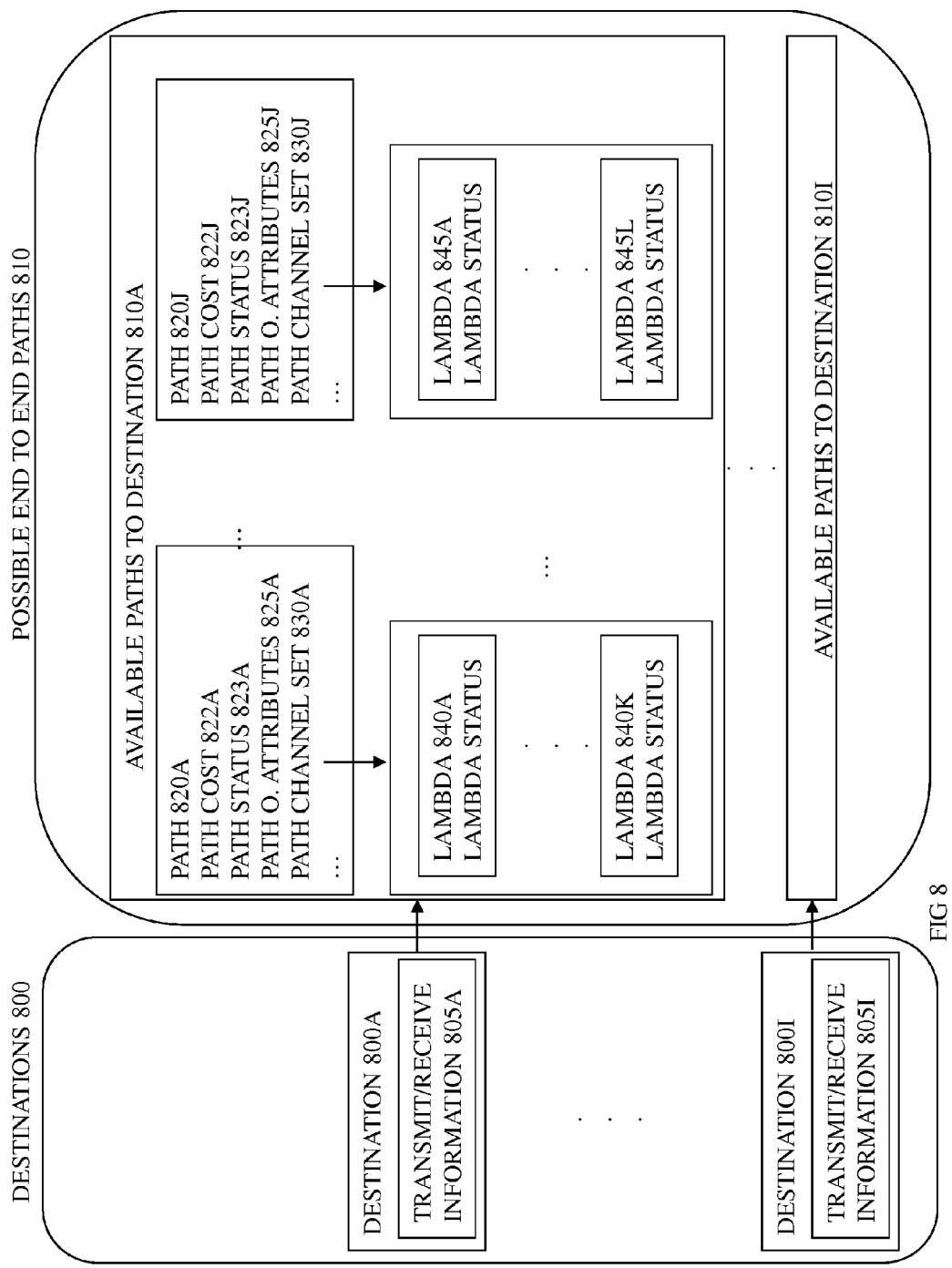
FIG. 8 is a block diagram of an exemplary routing database organization according to one embodiment of the invention.

FIG. 8 is a block diagram of an exemplary routing database organization according to one embodiment of the invention. FIG. 8 illustrates a path oriented routing database including a destinations structure 800 and a representation of the possible end to end paths 810 (in some alternative embodiments of the invention, only the available paths are stored). The destinations structure 800, having destination entries 800A to 800I, is to store each of the other nodes in the optical network in a single, separate entry (in alternative embodiments of the invention that store only the available paths, only those nodes in the optical network reachable with conversion free paths are stored). With reference to the exemplary network in FIGS. 1 and 2, for N1 this would be nodes N2, N3, N4, and N5.

Each of the destination entries 800A to 800I is associated with transmit/receive information 805A-805I. The transmit/receive information for a given destination identifies the transmit and receive capability and status of the DTIs in that destination node with regard to transmitting and receiving light (e.g., number, status (e.g., allocated, unallocated, broken, etc.), type/wavelength (tunable laser, wavelength of non-tunable laser, etc.), bit rate supported, etc.). While in certain embodiments of the invention this transmit/receive information is stored in a separate database (and associated by node IDs), in alternative embodiments of the invention the transmit/received information is associated more directly (e.g., stored in the destination entries themselves, pointers to the information is stored in the destinations entries, etc.)

Each of the destination entries 800A to 800I is also associated with the possible paths to that destination 810A-810I. Specifically, in FIG. 8 the destination 800A has associated to it paths 820A-820J. In other words, the possible paths are grouped by common destinations. Each path has associated to it its path channel set; paths 820A-820J respectively have path channel sets 830A-830J. Each of these path channel sets 830A-830J includes a set zero or more lambdas (e.g., path channel set 830A includes lambdas 840A-840K; path channel set 830J includes lambdas 845A-845L).

FIG. 8 additionally shows that each path 820A-820J has a path cost 822A-822J, a path status 823A-823J, and path optical attributes 825A-J. The path costs are to identify the relative costs of the paths (in terms of the amount of network resources consumed, as opposed to dollars) so that they may be distinguished for shortest path purposes. Thus, in the exemplary embodiment shown, this cost is on a per path basis, as opposed to a per path/wavelength combination basis. The path status identifies the status of the path (e.g., up, down, etc.—where up means that the path is usable and down means that the path is currently not usable (e.g., a path would have a status down if one or more links in the path has been removed)). The path optical attributes identify values of the path optical attributes for the path.

In addition, each lambda has stored with it a lambda status. The lambda status may not be limited to being allocated or unallocated. For example, a lambda that has failed due to a fiber cut could be assigned a status of "broken". For embodiments in which only bi-directional paths can be allocated, the granularity for tracking allocated/unallocated status may be simply the lambda level. However, in embodiments that allow for unidirectional path allocation, the granularity of allocated/unallocated status is a status for each direction for each lambda. It should be understood, that an embodiment of the invention that supported path/wavelength optical attributes may store them with each lambda, similar to lambda status.

Based on a given destination, the database is accessed to locate the available paths to that destination (e.g., the group of paths to select from for allocation can be located). In certain embodiments of the invention, the paths for each destination are also sorted by a set of one or more path characteristics (e.g., any available wavelengths, number of available wavelengths, any unallocated wavelengths, number of unallocated wavelengths, the cost, path based optical attributes, load balancing issues, etc.) As a result, depending on the sort, the next path to select for allocation to a given destination will be at the beginning of the group. In one embodiment, responsive to a path being selected, a path based quality check may be performed based on the path optical attributes in the routing database for the currently selected path; if the check fails, other paths may be selected as the currently selected path until all paths are exhausted. If and when the currently selected path passes the path based quality check, the available wavelengths on that path and their status can be accessed for selection therefrom. In certain embodiments of the invention, the wavelengths of a path channel set are sorted by lambda status so that the next unallocated lambda to select is first.

Figure 32:
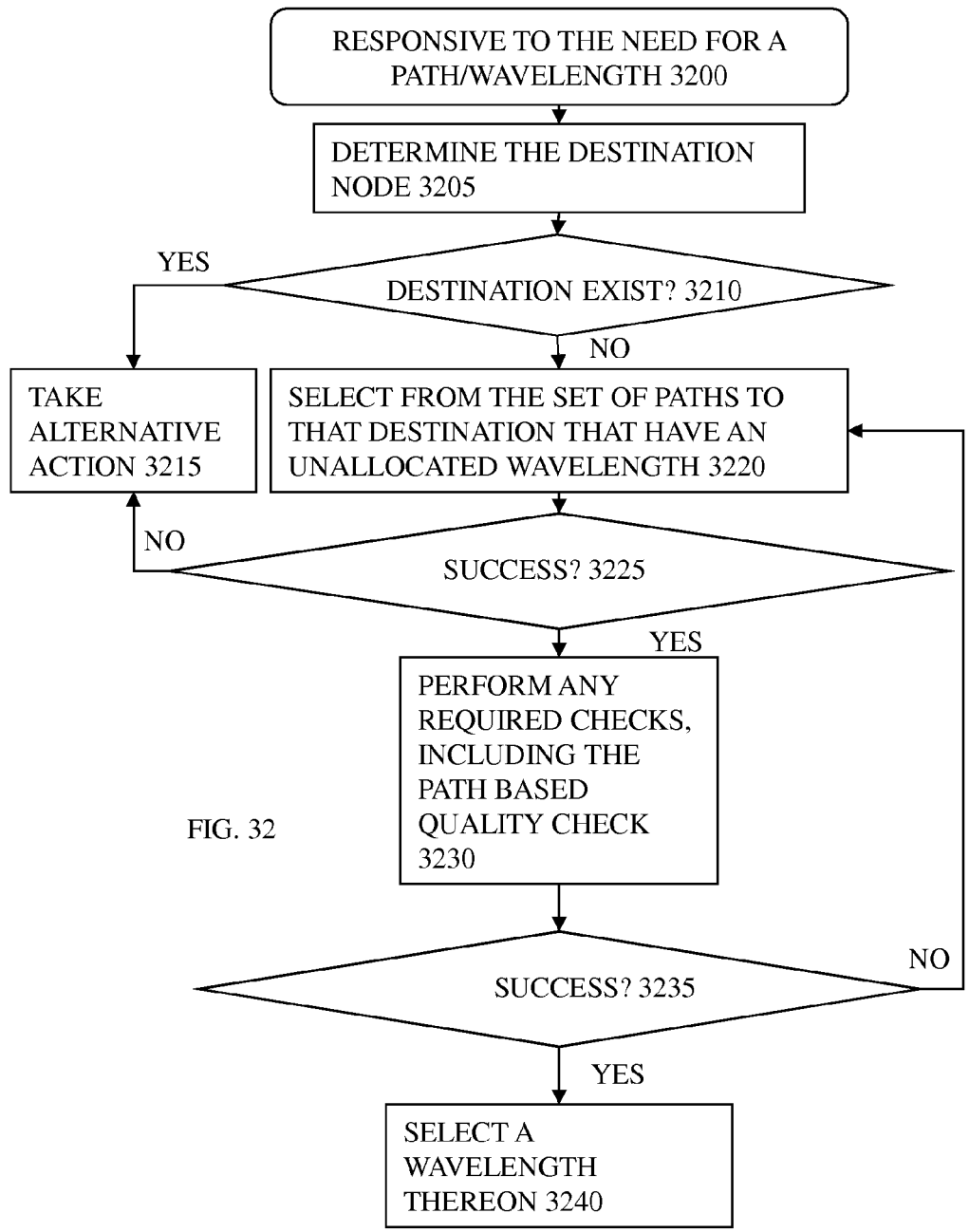
FIG. 32 is a flow diagram for selecting a path and a wavelength according to one embodiment of the invention.

FIG. 32 is a flow diagram for selecting a path and a wavelength according to one embodiment of the invention. In FIG. 32, responsive to the need for a path/wavelength combination (3200), the destination node is determined in block 3205 (e.g., the destination node may be identified in the demand) and control passes to block 3210. In block 3210, it is determined if the destination is in the database. If no, control passes to block 3215 where an alternative action is taken (e.g., generating a notification message). If so, control passes to block 3220 where a path is selected from the set of paths to the destination that have an unallocated wavelength. If block 3220 is not successful (block 3225), control passes to block 3215. Otherwise, control passes to block 3230 wherein any required checks are performed, including a path based quality check (e.g., a path based quality check may is performed based on the path optical attributes in the routing database for the currently selected path). If the checks are not passed (block 3235), control flows back to block 3220. Otherwise, control passes to block 3240 where a wavelength on the currently selected path is selected from the set of unallocated wavelengths. Thus, while in one embodiment of the invention the path based quality check is at the path level of granularity and the path based quality check is passed prior to selecting a wavelength on that path, alternative embodiments may operate differently (e.g., in embodiments of the invention where the path based quality check is at both the path level and granularity and the path/wavelength level of granularity, the path level of granularity check may be cleared prior to picking from wavelengths thereon for the path/wavelength granularity check; etc.).

While FIG. 8 shows an embodiment of the invention which stores path optical attributes, it should be understood that alternative embodiments of the invention may store other path based attributes in addition to or instead of the path optical attributes (e.g., path/wavelength attributes, path based quality values for each supported bit rate, path dependent grades, path dependent optical service levels for each supported bit rate, etc.) Of course, what is stored in dependent on implementation (e.g., number of bit rate supported, number and type of path based quality requirements and path dependent optical service levels supported, etc.)

To provide an example, FIGS. 9A-4D illustrate the paths from FIG. 1C grouped by destination, as well as the path channel set for each path, according to one embodiment of the invention. In particular, FIG. 9A illustrates the paths in FIG. 1C from N1 to N2, as well as the path channel set for each path, according to one embodiment of the invention; FIG. 9B illustrates the paths in FIG. 1C from N1 to N3, as well as the path channel set for each path, according to one embodiment of the invention; FIG. 9C illustrates the paths in FIG. 1C from N1 to N4, as well as the path channel set for each path, according to one embodiment of the invention; and FIG. 9D illustrates the paths in FIG. 1C from N1 to N5, as well as the path channel set for each path, according to one embodiment of the invention.

The exemplary organization of the database in FIG. 8 could be implemented in a variety of ways. For example, the destinations structure 800 could be stored as a separate structure (e.g., a linked list, a tree, etc.), each entry of which includes a pointer to a structure (e.g., a linked list, a tree, etc.) for each group of paths; each entry for the path group structure could include a pointer to a structure (e.g., a linked list, a set, etc.) for the path channel set of that path.

While FIG. 8 illustrates an exemplary database organization, it should be understood that alternative embodiments of the invention could have different organizations and structures. For example, rather than have a separate destinations structure, the paths could be grouped through the sorting of a table having each path as an entry. As another example, rather than having a separate lambdas structure for each path, the available lambdas could be stored along with the path. As yet another example, while certain information is stored along with the paths and lambdas (cost and status), alternatively embodiment could store more, less, and/or different information.

It should be understood that different embodiments of the invention may rely on different relationships of sorting and searching. For instance, while in certain embodiments the lambdas in the path channel sets are sorted, alternative embodiments of the invention may rely on searching an unsorted path channel set. As another example, while certain embodiments of the invention sort the paths by cost and whether there are any unallocated channels thereon, alternative embodiments of the invention may sort the paths in the groups by cost but not by whether there are any unallocated channels; such embodiments would rely on searching to locate the lowest cost path with an unallocated channel.

Database Updates

There are a variety of processes to perform on the database. For example, addition/removal of channels, paths, destinations, transmit/receive capabilities and other types of updates (e.g., path status, lambda status, etc.); selecting path and lambda combinations for allocation; etc.

FIG. 10 is a flow diagram for walking and updating the database according to one embodiment of the invention. It should be noted that in some embodiments of the invention, the same update may be received twice; in such embodiments of the invention, such duplicative updates do not result is changes to the database. In block 1000, an update is received and control passes to block 1005. For example, assume the update includes the addition of the node N5 to the database of node N1, the three paths to node N5, and the path channel sets for those paths shown in FIG. 1C. It should be understood that additional information may be received depending upon the embodiment of the invention (e.g., transmit/receive information, path cost, path status, path based optical attributes, lambda statuses, etc.). While FIG. 10 illustrates that the addition of a node includes the addition of path(s) and path channels set(s), alternative embodiments of the invention may operate differently (e.g., perform these as separate operations).

As shown in block 1005, the destination node of the update is determined and control passes to block 1010. In the above example, the destination node would be N5.

In block 1010, it is determined if the destination is already stored in the database. If not, control passes to block 1015. Otherwise, control passes to block 1030. While in some embodiments of the invention the update will identify the nature of the update (in the above example, the addition of a node), updates in alternative embodiments of the inventions may operate differently (e.g., require a search of the database to determine if the node is already present).

As shown in block 1015, the destination node is added to the database and control passes to block 1020. The manner of implementing this block would be dependent on the structure used to store the destination nodes.

As shown in block 1020, the path(s) is stored in the database associated to the destination and control passes to block 1025. In the above example, the paths N1:P2:P3:N3:P1:P2:N4:P1:P3:N5, N1:P2:P3:N3:P1:P2:N4:P1:P3:N5, and N1:P3:P2:N3:P1:P2:N4:P1:P3:N5 are stored associated with destination node N5. By way of particular example where the destination structure 800 is separate from the paths structures, the paths would be stored (as one of the groups of possible paths to a destination 810) and a pointer in the destination entry modified to point to the paths.

In block 1025, the path channel set(s) are stored associated to the path(s). In the above example, lambda 1 is stored associated to each of the paths N1:P2:P3:N3:P1:P2:N4:P1:P3:N5, N1:P2:P3:N3:P1:P2:N4:P1:P3:N5, and N1:P3:P2:N3:P1:P2:N4:P1:P3:N5.

In block 1030, the destination of interest is located and control passes to block 1035. In some embodiments of the invention, the database would be searched for the destination node; as such, the manner of performing block 1030 depends on the implementation of the database. By way of particular example, the exemplary destinations structure 800 would be searched for the destination node. By way of another particular example where the paths are stored as separate entries in a large collective table, the table would be searched for the destination node.

As shown in block 1035, it is determined if the update is to the existing destination node. If so, control passes to block 1040; otherwise, control passes to block 1045. By way of a different example, assume that the transmit/receive capabilities of a destination node were being updated and the update indicates as such.

In block 1040, the destination node's information in the database is updated. In the above example, the transmit/receive capabilities of the destination node would be modified according to the update. While FIG. 10 illustrates embodiments of the invention in which an update to an existing item (e.g., a destination node) does not include updates to other items, alternative embodiments of the invention may.

As shown in block 1045, it is determined if the update is the addition of a new path. If so, control passes to block 1050; otherwise, control passes to block 1055. By way of a different example, assume that the path N1:P3:P2:N3:P1:P2:N4:P1:P3:N5 is not yet associated with N5 in the database.

In block 1050, the location for the path in the sorted order of the group of paths to that destination in the database is determined, and control passes to block 1020. Again, the manner of implementing this block would be dependent on the structure used to store the paths. While block 1050 specifies that the group is sorted, alternative embodiments of the invention may not sort the group (in which case, the location may be chosen by a variety of techniques). In the above example, blocks 1020 and 1030 would result in the path N1:P3:P2:N3:P1:P2:N4:P1:P3:N5 being associated with N5 in the database, while lambda 1 would be associated to that path.

In block 1055, the existing path is located and control passes to block 1060. As discussed above, the manner of performing block 1055 depends on the implementation of the database.

As shown in block 1060, it is determined if the update is to the existing path. If so, control passes to block 1065; otherwise, control passes to block 1070. By way of a different example, assume that the path status is being updated.

In block 1065, the path's information in the database is updated. In the above example, the path's path status would be modified according to the update.

As shown in block 1070, it is determined if the update is the addition of new channel(s). If so, control passes to block 1075; otherwise, control passes to block 1085. By way of a different example, assume that lambda 2 is being added to the path N1:P3:P2:N3:P1:P2:N4:P1:P3:N5 in the database.

In block 1075, the location for the new channel(s) in the sorted order of the path channel set is determined, and control passes to block 1080. Again, the manner of implementing this block would be dependent on the structure used to store the channels. While block 1075 specifies that the path channel set is sorted, alternative embodiments of the invention may not sort the set (in which case, the location may be chosen by a variety of techniques).

As shown in block 1080, the new channel(s) are associated to the path. Again, the manner of implementing this block would be dependent on the structure used to store the destination. In the above example, lambda 2 would be associated with path N1:P3:P2:N3:P1:P2:N4:P1:P3:N5 in the database.

In block 1085, the existing channel(s) is located and updated. As discussed above, the manner of performing block 1085 depends on the implementation of the database. By way of a different example, assume that the status of lambda 1 of path N1:P3:P2:N3:P1:P2:N4:P1:P3:N5 has changed (e.g., a path/wavelength combination is being allocated). As a result, the database entry for lambda 1 associated with path N1:P3:P2:N3:P1:P2:N4:P1:P3:N5 would be updated.

It should be understood that other updates (e.g., removal of destinations, paths, channels, transmit/receive capabilities; etc.) may be made in a similar or other manner depending on the database structure.

It should also be understood that different updates are made responsive to different events depending on different embodiments of the invention. For instance, assuming that the network device architecture described above (one having: 1) different DTIs that can be of different bit rates; and 2) different optical switch fabric cards that switch different wavelengths), the following updates may be performed: 1) the addition/removal of a switch fabric card would result in updates to the path channel sets, and possibly the paths and destinations; 2) the addition/removal of a fiber would result in updates to the paths, the path channel sets, and possibly the destinations; 3) the addition/removal of a node would result in updates to the destinations, paths, and path channel sets; 4) the addition/removal of DTIs of a destination would result in updates to that information for that destination; etc.)

Exemplary Database Building/Maintaining and Path/Wavelength Combination Management Embodiments As previously indicated, a number of different techniques may be used for building and maintaining network databases in systems that use path based optical attributes, path based quality attributes, path dependent grades, and/or path dependent optical service levels. According to embodiments of the invention, a set of one or more connectivity constraints is imposed on the building/maintaining of network databases. According to another aspect of the invention, the set of one or more connectivity constraints includes a conversion free constraint; this allows for establishing conversion free optical circuits. According to another aspect of the invention, a distributed search based technique is used for building and maintaining network databases based on a set of connectivity constraints. According to another aspect of the invention, an optical network uses a source based scheme in which network databases, based on a set of connectivity constraints, are kept in access nodes.

Since each of the above aspects is independent, different embodiments may implement different ones and/or combinations of the above aspects of the invention. For example, while certain embodiments of the invention implement source based schemes and build/maintain the network databases using a distributed search based technique, others of these embodiments may use a different scheme and/or a different database building/maintaining technique (e.g., OSPF-TE is used to collect information on the network, and this information is used to build and maintain a database like that described in FIG. 8; thus, rather than using the graphs to build a shortest path first tree, the graphs would be used to build and maintain the database like that in FIG. 8.) As another example, while certain embodiments of the invention use a distributed search based technique for building and maintaining in source nodes network databases based on a set of connectivity constraints that include conversion free constraints, alternative embodiments may use a distributed technique, but not build and maintain the databases in the source nodes (e.g., they may be built and maintained in a centralized network management server). Similarly, alternative embodiments of the invention may not include the conversion free connectivity constraint, or relax it when necessary (e.g., when there is no conversion free end to end path at the requested service level)

By way of illustration, and not limitation, embodiments of the invention will be described in the context of a WDM mesh optical network that uses a source based scheme with a distributed search based technique to build/maintain conversion free path oriented routing databases, with each node being an access node, with each node having an optical switch fabric (as opposed to an electrical switch fabric in its optical switch part), with the path dependent optical service levels from table 6, with the path based attributes from tables 2 and 3, with a segment based approach for determining values for path based optical attributes, and with an optical network device architecture in which: 1) different DWDM transceiver cards (DTMs) (that each include one or more DWDM transceiver interfaces, which in turn each include a transmit part and a receive part; each transmit part includes a tunable laser (a laser that can generate a variety of different wavelengths)) that can be of different bit rates (e.g., some support a bit rate of 2.5 Gigabits per second (Gbps) and some a bit rate of 10 Gbps) can be added and removed; and 2) different optical switch fabric cards (implemented using waveguides) that switch different wavelengths can be added and removed. Alternative embodiments of the invention may be implemented different (e.g., the various alternatives previously describe herein).

It should be understood that various well known and/or future developed techniques may be used for sending the messages discussed below (e.g., in band or out of band).

Exemplary Access Node Embodiments

Figure 11:
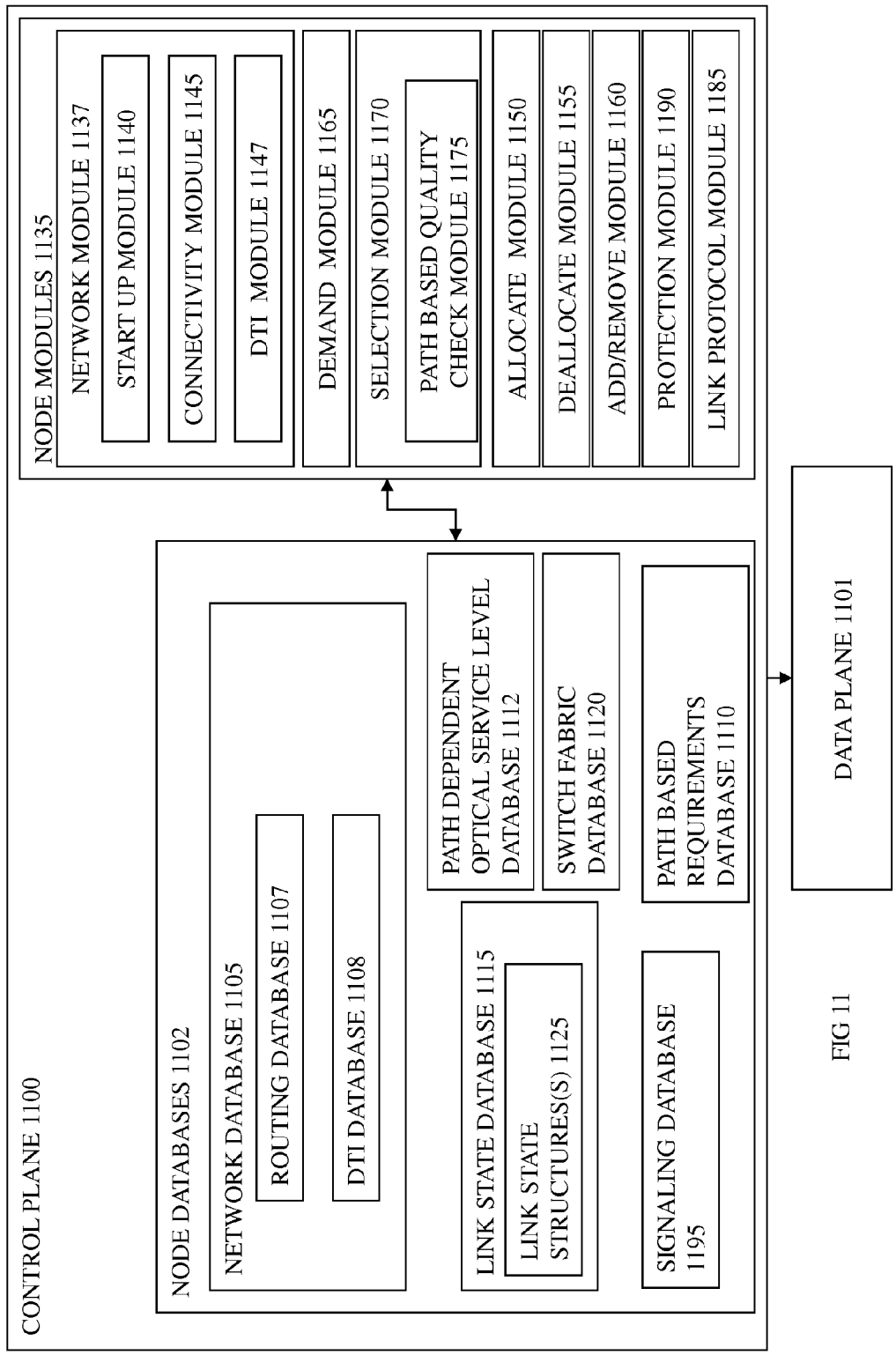
FIG. 11 is a block diagram illustrating an exemplary access node according to certain embodiments of the invention.

FIG. 11 is a block diagram illustrating an exemplary access node according to certain embodiments of the invention. While FIG. 11 illustrates an access node for use in a source based scheme with a distributed search technique and with tables 2, 3, and 4 above, the invention is not so limited. FIG. 11 shows a control plane 1100 coupled with a data plane 1101. The control plane 1101 includes node databases 1102 coupled with node modules 1135. Of course, the control plane 1100 and data plane 1101 include other items that are not illustrated in order to not obscure the understanding of this description.

FIG. 11 shows the node databases 1102 include a network database 1105, a link state database 1115, a switch fabric database 1120, a path dependent optical service level database 1112, a path based requirements database 1110, and a signaling database 1195.

The network database 1105 includes a routing database 1107 and a DTI database 1108. The routing database 1107 is a set of one or more structures to store the available paths (and in some embodiments of the invention, all possible paths) as previously described herein (e.g., see FIGS. 8-10 and related description), as well as the path based optical attributes for each path. The DTI database 1108 stores the transmit/receive capabilities of the DTIs in this node, as well as other nodes in the optical network (while some embodiments of the invention store transmit/receive capabilities of the DTIs of all nodes in the network, alternative embodiments may store less—such as only those nodes that are part of available paths). While certain embodiments of the invention store a separate routing database 1107 and DTI database 1108, alternative embodiments of the invention may combine these into a single database.

The link state database 1115 includes a set of one or more link state structures 1125, one for each link connected to that node. While in certain embodiments these links are discovered through a link management protocol (link protocol module 1185), alternative embodiments may use other techniques. In certain embodiments of the invention, each link state structure records a neighboring node, a port through which that neighboring node is connected, and segment based optical attributes of the segment including that link (through the port).

The switch fabric database 1120 stores the configuration of the optical switch fabric of the node. In certain embodiments of the invention, the switch fabric database 1120 is redundant in that it stores a representation of the part of the paths in the routing database that travel through the access node.

The path dependent optical service levels database 1112 stores the requirement(s) to define the supported service levels (e.g., table 6 above). The path based requirements database 1110 stores the path based quality requirements being applied (e.g., tables 2 and 3) (of course, alternative embodiments may store additional or different data, such as the path based optical requirements).

The signaling database 1195 stores the paths (working path for paths that are not protected; working path and protection path pairs for protected paths) and optionally their respective status. Of course, alternative embodiments may use more, less, and/or different databases and/or duplicate information in other databases.

The node modules 1135 include a network module 1137, a demand module 1165, a selection module 1170, an allocate module 1150, a deallocate module 1155, an add/remove module 1160, a protection module 1190, and the link protocol module 1185.

The network module 1137 builds and maintains the network database 1105, specifically the routing database 1107 and the DTI database 1108. The network module 1137 includes a startup module 1140, a connectivity module 1145, and a DTI module 1147.

The demand module 1165 translates demands into the optical demand requirements needed to satisfy the demands, as well as invokes the selection module 1170 and allocate module 1150.

The selection module 1170 includes a path based quality check module 1175. The selection module 1170 receives optical demand requirements and accesses the network database 1105 to select path/wavelength combinations and DWDM transceiver interfaces. While in certain embodiments, the routing database 1107 and DTI database 1108 are accessed responsive to a demand, alternative embodiments of the invention generate derivative structures that are faster to parse and/or pre-select (and may pre-allocate) various paths. As part of this selection, in some embodiments of the invention the path based quality check module 1175 accesses the path dependent optical service level database 1112 and path based requirements database 1110 to perform path based quality checks. While in certain embodiments the path based quality check module 1175 is part of the selection module 1170, alternative embodiments may implement it differently (e.g., as a module outside of the selection module 1170; as two separate modules for different checks, such as one inside the selection module 1170 and one outside; etc.).

The allocate module 1150 causes the selected path/wavelength combinations and DWDM transceiver interfaces to be allocated (e.g., the access node's signaling database 1195, switch fabric, switch fabric database 1120, and network database 1105, as well as, in certain embodiments, communication to other nodes), while the deallocate module 1155 causes path/wavelength combinations and DWDM transceiver interfaces to be deallocated. The add/remove module 1160 addresses additions and removals of transmit/receive capabilities, channels, links, and nodes in the optical network. The protection module 1190 is called responsive to the add/remove module 1160 to implement any supported redundancy schemes when necessary. Exemplary manners of implementing the start up module 1140, connectivity module 1145, DTI module 1147, allocate module 1150, deallocate module 1155, and add/remove module 1160 are described respectively with respect to FIGS. 13-14, 15, 16;31, 17-18, 19-20, and 21-30. In some embodiments of the invention the connectivity module 1145 and DTI module 1147 represent code invoked by the other modules as necessary for handling transmission and receipt of connectivity messages and DTI messages, respectively (e.g., blocks 1410, 1415, 2115, 2120, and so on, utilize the connectivity module 1145; blocks 1415, 1755, and so on, utilize the DTI module 1147); alternative embodiments of the invention may duplicate parts of this code into the other modules as needed, combine these modules, etc.

Start Up

Figure 12:
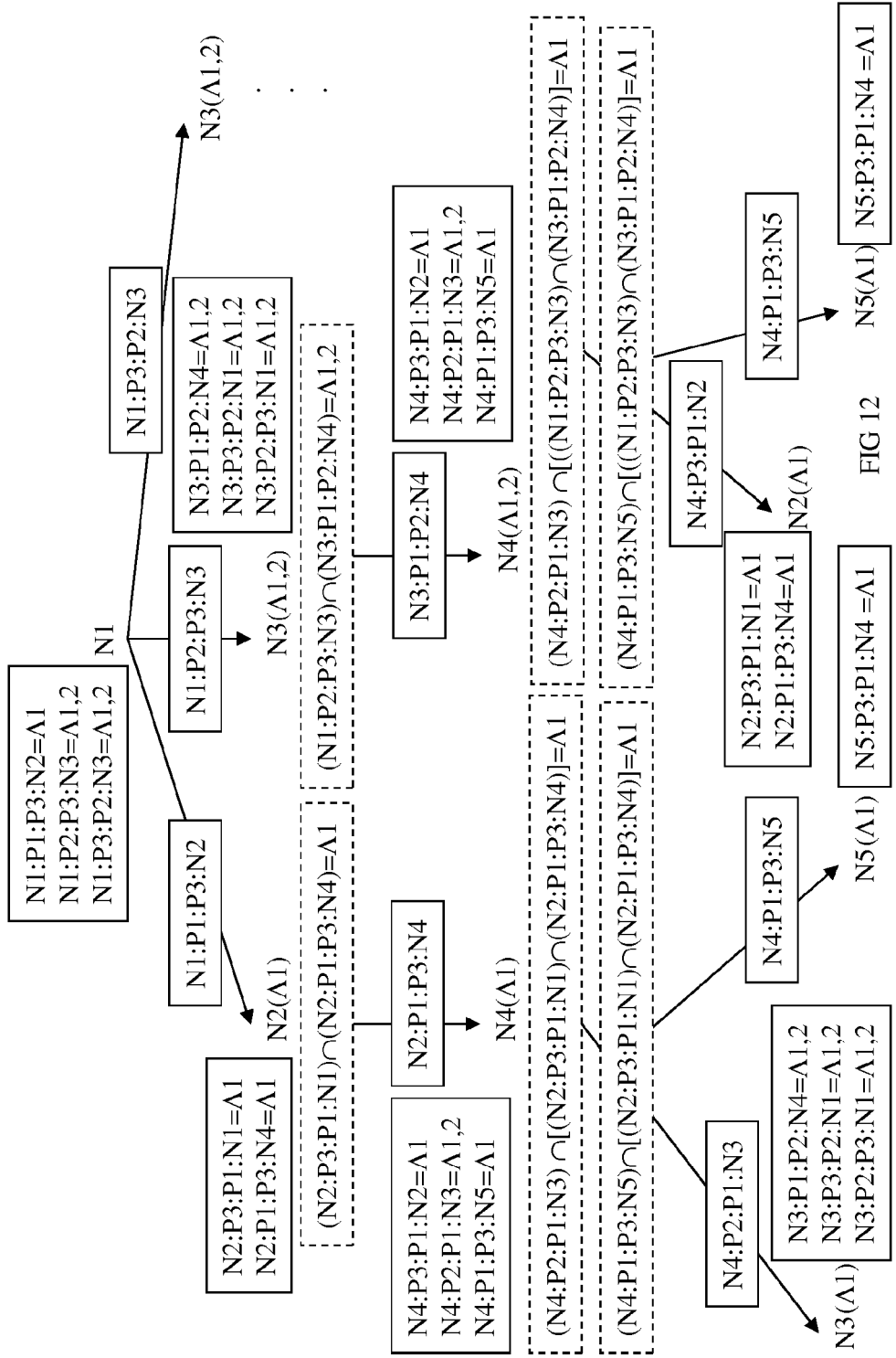
FIG. 12 is an exemplary data flow diagram of a distributed search based technique's formation of part of the topology for N1 of the optical network in FIG. 1C according certain embodiments of the invention.

FIG. 12 is an exemplary data flow diagram of a distributed search based technique's formation of part of the topology for N1 of the optical network in FIG. 1C according certain embodiments of the invention. FIG. 13-14 are flow diagrams for a distributed search based technique for building conversion free network databases in access nodes of an optical network. To provide an example, FIGS. 13-14 will be described with reference to the exemplary data flow diagram of FIG. 12. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

FIG. 13 is a flow diagram performed by each access node when joining an optical network according to embodiments of the invention.

As shown in block 1315, for each link to an adjacent node, the link channel set and segment based optical values are determined. With reference to FIG. 12, the link channel set for each node shown in FIG. 12 is illustrated by a box next to that node. With reference to FIG. 11, the link state database 1115 of each node is populated. From block 1315, control passes to block 1320.

In block 1320, a topology build-up is initiated. With reference to FIG. 11, the network database 1105 of each node is populated.

FIG. 14 is a flow diagram illustrating a topology build-up according to embodiments of the invention. Thus, the flow of FIG. 14 would be performed by each access node in response to block 1320.

In block 1405, a network database is instantiated and populated with any adjacent nodes and any internal DWDM transceiver interfaces. With reference to FIG. 11, a routing database 1107 and a DTI database 1108 are instantiated and populated with adjacent nodes and transmit/receive capabilities of internal DWDM transceiver interfaces, respectively. With reference to FIG. 12, N1 would instantiate a routing database 1107 to include entries for N2 and N3, as well as associated path channel sets, path optical attributes (which are equivalent to segment optical attributes in this case), etc. From block 1405, control passes to block 1410.

As shown, in block 1410, connectivity request message(s) are transmitted to the adjacent node(s) and control passes to block 1415. With respect to FIG. 12, N1 transmits a connectivity request message to each of N2 and N3 (the source node ID is N1). The handling of such a message by a recipient node is described later herein with reference to FIG. 15 and includes the transmission of a connectivity response message. In certain embodiments of the invention, each connectivity request message includes a request ID (e.g., to be included in responses for matching purposes), a source node ID, a forward node ID, and a computed set (a set of one or more paths, as well as the path channel set and path based optical value(s) for each). Such embodiments may be implemented in a variety of ways (e.g., they may transmit the same message to all adjacent nodes (in which case, the computed set sent by N1 would include multiple paths because there are multiple adjacent nodes), they may transmit a different message to each adjacent node (in which case, the computed set sent by N1 would include a single path—the path to that adjacent node). With regard to FIG. 12 and the transmission of a connectivity request message from N1 to N2, this connectivity request message would include the path N1:P1:P3:N2, as well as its path channel set (which in this case equal the link channel set) and its path based optical attributes (which in this case equal the segment based optical attributes). However, as the connectivity request message gets updated and forwarded to other nodes as described later with regard to block 1545, the computed set to the recipient nodes will include a path traveled that includes more than one segment, as well as its path channel set (the intersection set of the link channel sets of the links traveled) and its path based optical value(s). While all of these fields are not needed for block 1410 (e.g., the source node is the same as the forward node, the needed information in the computed set is already known by the adjacent nodes), they are used as the search moves through the network (see FIG. 15). Thus, while in certain embodiments of the invention each connectivity request message includes the above noted fields, alternative embodiments could be implemented other ways (e.g., while full versions of connectivity request message could be used for FIG. 15, reduced versions of connectivity request messages could be used for block 1410). Also, while certain embodiments of the invention include in the computed set of connectivity request messages channels in the path channel sets that are of any lambda status, alternative embodiment may exclude channels due to their current lambda status (e.g., broken).

In block 1415, responsive to connectivity response messages received, the routing database is updated and update new DTI messages are transmitted. The nodes transmitting such connectivity response messages are described later herein with respect to FIG. 15. Upon receipt of a connectivity response message, any received data is added to the routing database and an update new DTI message is transmitted back to the node that sent the connectivity response message. With respect to the example optical network described herein, the topology for N1 would represent something similar to that shown in FIG. 1C, and may be stored in the routing database with an organization and structure the same as or similar to FIGS. 8-10 and the associated description. It should also be noted that, at least in certain embodiments of the invention, such a routing database is maintained during operation of the access node (as opposed to being flushed and recalculated on a periodic basis as in the case with OSPF-TE graphs); that is, it is not rebuilt unless there is some failure that compromises it. In block 1415, in certain embodiments, each update new DTI message includes the source node ID, as well as the transmit/receive capabilities of the internal DWDM transceiver interfaces of the node. The handling of such a message by a recipient node is described later herein with reference to FIG. 16.

FIG. 15 is a flow diagram illustrating operations performed by nodes responsive to a connectivity request message received over a link according to certain embodiments of the invention. With respect to FIG. 12, the example of node N2 receiving the connectivity request message from node N1 will be used. In this regard, a path in the computed set of the received connectivity request message is the path that the connectivity request message traveled. As described below, the recipient node of such a connectivity request message will determine if there are any additional segments that may be added to the path the connectivity request message already traveled to discover other longer paths (in other words, to add to the received path by another hop to discover an extended path.)

As shown in block 1525, the intersection of the received path channel set for the path to this node with the link channel set for each eligible propagation port is determined. From block 1525, control passes to block 1535. The phrase eligible propagation port is used to refer to any ports other than: 1) the one the connectivity request message was received on; 2) a port connected to the source node (i.e., when the source node is made adjacent to this node through that port); and 3) a port coupled to an adjacent node already in the path the received connectivity request message (block 1505) already traveled (e.g., in an embodiment of the invention where the connectivity request message received includes a computed set, by checking the set of paths). In certain embodiments of the invention, the eligible propagation ports are determined by selecting links from the link state database that are not connected to the forward node ID and source node ID identified in the connectivity request message, as well as any adjacent node IDs (e.g., in the computed set). Each eligible propagation port represents a segment that may be added to an already identified available path in the received connectivity request message so as to identify another available path. With reference to FIG. 12, since N2 received the connectivity request over the link to N1 and since N1 is the source node, N2 would select the port through which a link to node N4 is connected. N2 would then determine the intersection of the path channel set for N1:P1:P3:N2 (e.g., retrieved from the computed set of the connectivity request message received in block 1505) with the link channel set for N2:P1:P3:N4. This intersection set is the path channel set for N1:P1:P3:N2:P1:P3:N4 (path channel sets are shown in FIG. 12 by dashed boxes, such as the one under N2). Specifically, N2 determines the intersection of the path channel set (N1:P1:P3:N2=lambda 1) and the link channel set (N2:P1:P3:N4)=lambda 1) to be lambda 1 (which is also represented herein using the format N1:P1:P3:N2:P1:P3:N4=lambda 1). In this manner, where the path the connectivity request message already traveled is an available path (the path channel set of that path is not null), N2 determines if there are any segments that may be added to that received available path to discover other longer available paths (in other words, to add to the received available path by another hop per eligible propagation port to discover extended available paths).

While one technique for eliminating loops has been described, alternative embodiments of the invention may use other techniques.

In block 1535, the path based optical values for eligible propagation port are determined and control passes to block 1540. Exemplary ways of performing the determining in block 1535 have been previously described. To provide an example, each eligible propagation port represents a segment to be added to the path the connectivity request message already traveled to discover other longer possible paths (in other words, to add to the received possible path by another hop to discover an extended possible path.) For each such extended possible path, some embodiments of the invention determine path based optical value(s) by combining the segment based optical value(s) of the segment with the path based optical value(s) of the path the connectivity request message already traveled (where the path based optical value(s) are provided in the received connectivity request message). Such segment based optical values may be determined a variety of way as previously described (e.g., periodically measured, entered in to the node, etc.) While one embodiment of the invention determines the path based optical values for each path through an eligible propagation port (possible paths), alternative embodiments of the invention only determine the path based optical values for each non-null intersection set path (available paths).

As shown in block 1540, a connectivity response message (with any intersection set(s) as path channel set(s)) is transmitted to the source node and control passes to block 1545. In certain embodiments of the invention, each connectivity response message includes the request ID (of the received connectivity request message in block 1505), response node ID, and computed set(s) (the set of one or more paths, as well as the following for each path in the set: 1) the path based optical values; 2) path channel set and the lambda status for each channel in that path channel set (certain such embodiments may also include path cost or other information). With regard to node N2, N2 would transmit to N1 a connectivity response message including as the computed set N1:P1:P3:N2:P1:P3:N4=lambda 1 and the path based optical values for the same. While in this example there is only one extended path from N2, situations described later herein where there is more than one extended path would result, in at least sending information about each of the extended paths (e.g., by sending one connectivity response message that includes multiple computed sets where each set includes only one path; by sending one connectivity response message that includes one computed set that includes information regarding multiple paths; by sending a separate connectivity response message for each path; etc.) Thus, in such embodiments of the invention, the path(s) in the connectivity response message represent paths (available and possible) from the source node of the connectivity request message. It should be noted that, in certain embodiments of the invention in which path based optical values are determined for each eligible propagation port, even though a path channel set for a path is null, there may still be path based optical value(s) for that path in the connectivity response message. In addition, in certain embodiments, when there are no eligible propagation ports, the set of paths is null and it indicates to the source node that the path is complete (sometimes referred to as a connectivity stop message).

In block 1545, a connectivity request message (with any intersection set(s) as path channel set(s)) is transmitted on any eligible propagation ports. With regard to node N2, N2 would transmit to N4 a connectivity request message. With regard to embodiments of the invention in which connectivity request messages include request ID, a source node ID, a forward node ID, and a computed set, N2 would respectively fill these fields with the request ID, N1, N2, and the computed set (N1:P1:P3:N2:P1:P3:N4=lambda 1 and the set of path based optical values for the same). From the perspective of node N2, a path in this computed set represents the path the connectivity request message will travel; from the perspective of the recipient node N4, that path in this computed set is the path that the connectivity request message traveled. In addition, from the perspective of N4, this computed set includes the intersection of the preceding link channel sets for the path the connectivity request message has traveled. In this manner, as the connectivity request message gets updated and forwarded to other nodes, the computed sets to the recipient nodes represents the paths traveled, as well as their path based optical value(s) and their path channel sets (the intersection set of the link channel sets of the links traveled) with lambda statuses.

To complete the example of FIG. 12, responsive to N2's connectivity request message, N4 determines intersection sets to N3 and N5, transmits these back to N1 in a connectivity response message, and transmits connectivity request messages to N3 and N5. Responsive to N4's connectivity request message, both N3 and N4 transmit connectivity response messages to N1 (these are connectivity stop messages). Responsive to these connectivity response messages, N1 transmits to N2, N3, and N4 an update new DTI message. Meanwhile, N1 is transmitting connectivity request messages on its other adjacent links and all other access nodes are doing the same.

Figure 16:
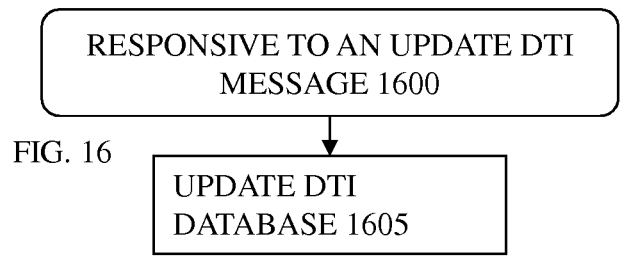
FIG. 16 is a flow diagram illustration operations performed by an access node responsive an update DTI message according to certain embodiments of the invention.

FIG. 16 is a flow diagram illustrating operations performed by an access node responsive an update DTI message according to certain embodiments of the invention. In block 1600, an update DTI message is received and control passes to block 1605. An update DTI message may be received for a variety of reasons, and thus have different formats (e.g., an update new DTI message). For example, in block 1415 an update new DTI message is transmitted during the topology build up. Other examples, including changes to transmit/receive capabilities of DTIs, will be described later herein with reference to FIG. 30.

In block 1605, the DTI database is updated with the received information. With reference to an update new DTI message generated responsive to block 1415, the DTI database of the recipient node would be updated to include the transmit/receive capabilities of the DWDM transceiver interfaces of the transmitting node. With reference to an update add DTI message or an update remove DTI message (described later herein), the DTI database of the recipient node would be updated to reflect the changes to the transmit/receive capabilities of the DWDM transceiver interfaces of the transmitting node.

Embodiments of the invention are described in which the nodes, responsive to connectivity request messages, transmit back connectivity response messages regarding any extension(s) therefrom to the already discovered paths. For instance, in the above example, when N2 receives the connectivity request message from N1, it transmits back the extension, from N2 to N4, to the already discovered path from N1 to N2. Alternative embodiments of the invention may operate in a different way. For example, in some alternative embodiments of the invention, the nodes, responsive to a connectivity request message, transmit back a connectivity response message regarding extension(s) of the already discovered paths that end at that node. For example, N2 would transmit a connectivity response back to N2 about the path from N1 to N2, whereas N4 would transmit a connectivity response back to N1 regarding the extension of that path to N4.

Allocate

Figure 17:
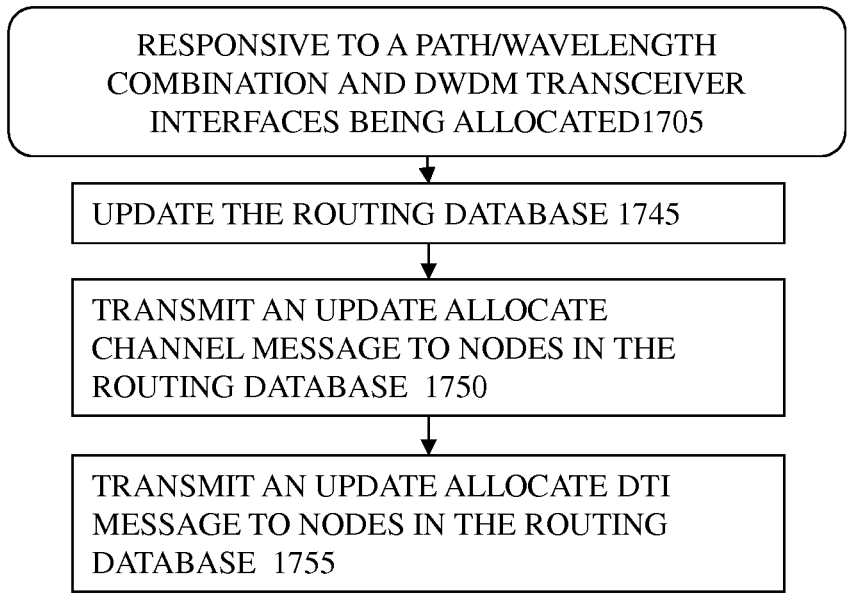
FIG. 17 is a flow diagram illustrating operations performed by the source node responsive to allocation of a path/wavelength combination according to certain embodiments of the invention.
Figure 18:
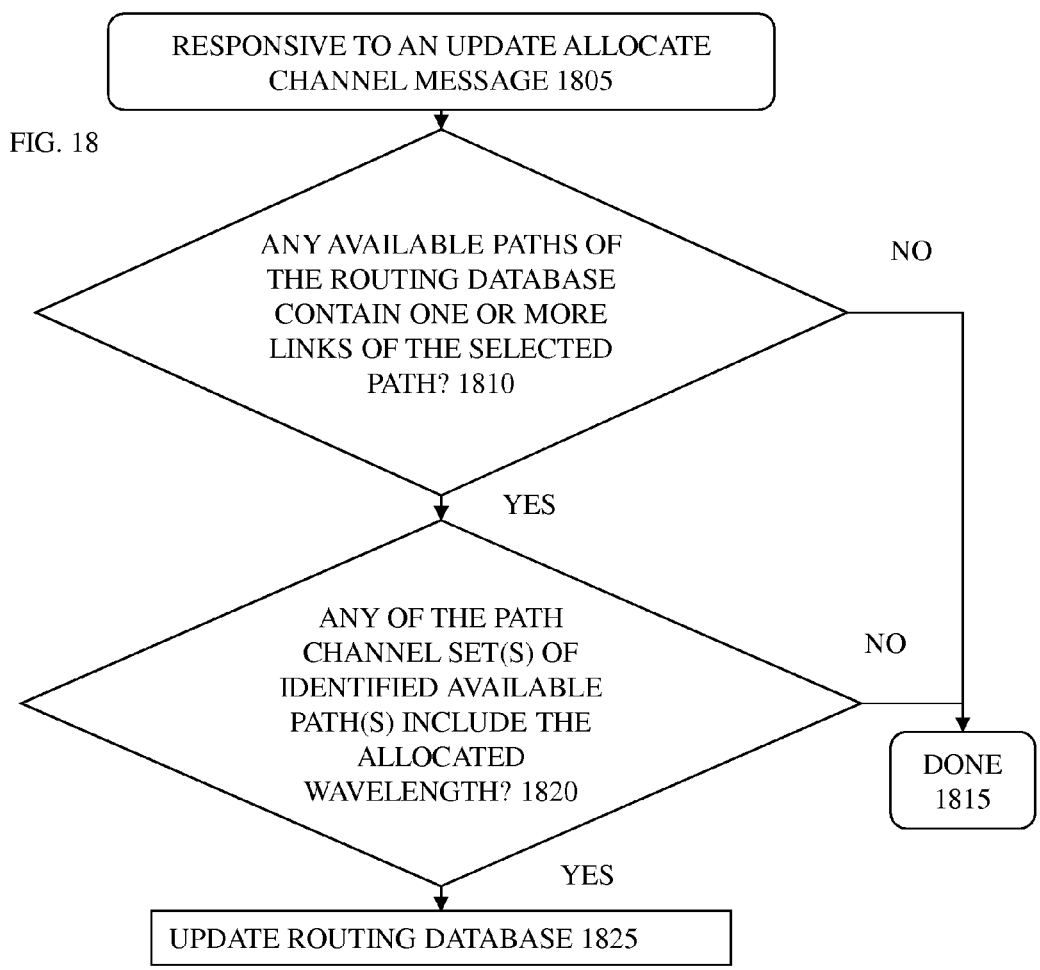
FIG. 18 is a flow diagram illustrating the operations performed by an access node responsive to an update allocate channel message according to certain embodiments of the invention.

FIGS. 17-18 are flow diagrams illustrating the allocation of a path/wavelength combination according to certain embodiments of the invention. In certain embodiments of the invention, responsive to the source node selecting DWDM transceiver interfaces and a path/wavelength combination for a demand, a signaling protocol (e.g., RSVP, CR-LDP, etc.) is used to: 1) cause configuration of that source node's switch fabric and selected DWDM transceiver interface; and 2) signal the path (communicate with the other intermediate nodes on the path to cause them to configure their switch fabrics, and communicate with the destination node to cause it to configure its switch fabric and the selected DWDM transceiver interface). Responsive to success, the switch fabric databases in the nodes of the path and the signaling databases in the source and destination nodes are updated; the DTI databases in the source and destination nodes are updated. FIG. 17 is the flow diagram illustrating operations performed by the source node responsive to allocation of a path/wavelength combination according to certain embodiments of the invention. The operations in FIG. 17 result in: 1) update allocate channel message(s) being sent; and 2) update DTI messages being sent. FIG. 18 is a flow diagram illustrating the operations performed by an access node responsive to an update allocate channel message according to certain embodiments of the invention.

In block 1705, a path/wavelength combination and DWDM transceiver interfaces are received and control passes to block 1745.

As shown in block 1745, the routing database is updated and control passes to block 1750. In particular, the selected channel is marked as allocated in all path channel sets down stream of a link in the selected path. In other words, the selected channel is marked allocated in the path channel set(s) of the available path(s) that include one or more links of the selected path. To provide an example, assume the path N1:P1:P3:N2:P1:P3:N4 with lambda 1 is allocated in FIG. 1C. As such, lambda 1 would need to be marked as allocated from the path channel set of N1:P1:P3:N2, N1:P1:P3:N2:P1:P3:N4, N1:P1:P3:N2:P1:P3:N4:P2:P1:N3, N1:P1:P3:N2:P1:P3:N4:P1:P3:N5, N1:P2:P3:N3:P1:P2:N4:P3:P1:N2 and N1:P3:P2:N3:P1:P2:N4:P3:P1:N2 because each contains one or more links on the selected path. While in one embodiment block 1745 is performed at this point, in alternative embodiments of the invention the selection module 1570 performs this update when the path and wavelength are selected. Whether a path/ wavelength combination is allocated in both directions depends on whether it is bi-directional or not.

In block 1750, an update allocate channel message is transmitted to nodes in the routing database and control passes to block 1755. In certain embodiments, each update allocate channel message includes an update ID, a path, and an allocated channel. While the nodes to which the message is to be sent can be determined in a variety of ways, certain embodiments of the invention parse the routing database to identify all of the destination nodes.

As shown in block 1755, an update allocate DTI message is transmitted to nodes in the routing database. In certain embodiments, each these update allocate DTI message includes an update ID, the allocated DWDM transceiver interface in the source node, and the allocated DWDM transceiver interface in the destination node. These messages are processed as shown in FIG. 16.

FIG. 18 is a flow diagram illustrating operations performed by an access node responsive to an update allocate channel message according to certain embodiments of the invention. In block 1810, it is determined if any of the available paths of the routing database contain one or more links of the selected path. If not, control passes to block 1815 where the flow diagram ends. If so, control passes to block 1820. In certain embodiments of the invention, block 1810 is performed by parsing the routing database to determine if any links on the selected path are represented therein.

As shown in block 1820, it is determined if any of the path channel set(s) of the available paths identified in block 1810 include the allocated wavelength. If not, control passes to block 1815. Otherwise, control passes to block 1825. In certain embodiments of the invention, block 1820 is performed by parsing the path channel set(s) of the identified path(s) to determine if the allocated wavelength is present.

As shown in block 1825, the routing database is updated. In certain embodiments of the invention, block 1825 is performed by marking the allocated wavelength as allocated in the path channel set(s) identified in block 1820.

Deallocate

Responsive to a request to deallocate a channel (e.g., communication received by the source node for the path using the channel), in certain embodiments of the invention a signaling protocol is used to disconnect the existing switch fabrics on the path and un-configure the DWDM transceiver interfaces in the source and destination nodes. Responsive to success, the switch fabric databases in the nodes of the path and the signaling databases in the source and destination nodes are updated; the DTI databases in the source and destination nodes are updated. FIG. 19 is a flow diagram illustrating operations performed by the source node of a path/wavelength combination responsive to that path/wavelength combination being deallocated according to certain embodiments of the invention. As part of the flow diagram in FIG. 19, the source node of the path transmits update deallocate channel message(s) to other nodes. FIG. 20 is a flow diagram illustrating the operations performed by access nodes responsive to receiving an update deallocate channel message according to certain embodiments of the invention.

In block 1905, a path/wavelength combination and DWDM transceiver interfaces are received and control passes to block 1920.

As shown in block 1920, the routing database is updated and control passes to block 1925. Block 1920 is performed in a similar fashion to block 1745, with the exception that the channel is marked unallocated. In particular, the deallocated channel is marked as unallocated in all path channel sets down stream of a link in the deallocated path. In other words, the deallocated channel is marked unallocated in the path channel set(s) of the available path(s) that include one or more links of the deallocated path. To provide an example, assume the path N1:P1:P3:N2:P1:P3:N4 with lambda 1 is deallocated in FIG. 1C. As such, lambda 1 would need to be marked as deallocated from the path channel set of N1:P1:P3:N2, N1:P1:P3:N2:P1:P3:N4, N1:P1:P3:N2:P1:P3:N4:P2:P1:N3, N1:P1:P3:N2:P1:P3:N4:P1:P3:N5, N1:P2:P3:N3:P1:P2:N4:P3:P1:N2 and N1:P3:P2:N3:P1:P2:N4:P3:P1:N2 because each contains one or more links on the selected path. Whether a path/wavelength combination is deallocated in both directions depends on whether it was bi-directional or not.

As shown in block 1925, an update deallocate channel message is transmitted to nodes in the routing database and control passes to block 1955. In certain embodiments of the invention, the update deallocate channel message includes the path, the channel deallocated, and the update ID. While the nodes to which the message is to be sent can be determined in a variety of ways, certain embodiments of the invention parse the routing database to identify all of the destination nodes.

As shown in block 1955, an update deallocate DTI message is transmitted to nodes in the routing database. In certain embodiments, each these update deallocate DTI message includes an update ID, the deallocated DWDM transceiver interface in the source node, and the deallocated DWDM transceiver interface in the destination node. These messages are processed as shown in FIG. 16.

FIG. 20 is a flow diagram illustrating operations performed by access nodes responsive to an update deallocate channel message according to certain embodiments of the invention. In block 2010, it is determined if any of the available paths of the routing database contains one or more links of the path in the message. If not, control passes to block 2015 where the flow diagram ends. If so, control passes to block 2020. In certain embodiments of the invention, block 2010 is performed by parsing the routing database to determine if any links on the deallocated path are represented therein.

As shown in block 2020, it is determined if any of the path channel set(s) of the available paths identified in block 2010 include the deallocated wavelength. If not, control passes to block 2015. Otherwise, control passes to block 2025. In certain embodiments of the invention, block 2020 is performed by parsing the path channel set(s) of the identified path(s) to determine if the allocated wavelength is present.

As shown in block 2025, the routing database is updated. In certain embodiments of the invention, block 2025 is performed by marking the deallocated wavelength as unallocated in the path channel set(s) identified in block 2020.

Add and Remove Channels

When a channel is added or removed, the link state database is updated in the access nodes connected to the link (e.g., in certain embodiments of the invention, LMP recognizes the channel added or removed). FIGS. 21 and 22 are flow diagrams illustrating operations performed when either a channel is added or a channel without live traffic is removed according to certain embodiments of the invention. The operations of FIG. 21 are performed by the access nodes connected by a link on which a channel is added or removed (also referred to as the adjoining nodes or the access nodes made adjacent by that link). As part of these operations, an update add/remove channel message is transmitted to certain other nodes. The operations of FIG. 22 are performed by an access node responsive to such an update add/remove channel message.

FIG. 21 is a flow diagram illustrating the operations performed by the access nodes connected by a link on which a channel is added/removed according to certain embodiments of the invention. It should be understood that an event may occur in a node that adds the same channel to multiple links of that node; this flow is performed for each such link by that node and each node made adjacent by that link.

As shown in block 2115, a connectivity request message is transmitted on the link carrying the channel and control passes to blocks 2120 and 2125. Block 2115 is performed in a similar manner to block 1415 of FIG. 14.

In block 2120, the routing database is updated responsive to connectivity response messages received. In certain embodiments of the invention, block 2120 is performed in a similar manner to block 1415 of FIG. 14 with a variation. Since certain data already exists in the routing database, the received data in the connectivity response messages is used to update (add, remove, and/or alter) the existing routing database. In the case of a channel removal, in certain embodiments of the invention, the channel on each path with the link may be either removed from the routing database or marked broken. In the case of a channel addition where the channel already exists but is marked broken, in certain embodiments of the invention the channel may be marked unallocated. It should be understood that where the channel is to be removed from the routing database, then in certain embodiments the channel will not be included in the path channel set of the computed set of the connectivity request message of block 2115.

As shown in block 2125, an update add/remove channel message is transmitted to the nodes in the routing database that are not on the link with the channel. In certain embodiments of the invention, each update add/remove channel message includes an update ID, the wavelength, whether this is an addition or removal, and an identification of the link (the adjacent node IDs and the ports). The adjacent nodes identified are the access nodes connected by the link on which the channel was added/removed. The message is sent to all destination nodes in the routing database other than the nodes made adjacent by the link.

FIG. 22 is a flow diagram illustrating the operations performed by an access node responsive to receiving an update add/remove channel message according to certain embodiments of the invention. As shown in block 2210, it is determined if the routing database includes path(s) with the link to which the channel was added/removed. If not, control passes to block 2215 where the flow diagram ends. If so, control passes to block 2220. In certain embodiments of the invention, block 2210 is performed by searching the routing database for the link identified in the received update add/remove channel message.

In block 2220, connectivity request message(s) are transmitted on link(s) of these paths and control passes to block 2225. In particular, the access node transmits a connectivity request message on each of its links that are part of these paths. These connectivity request messages are similar to those in FIG. 21.

In block 2225, the routing database is updated responsive to connectivity response messages received. Block 2225 is performed in a similar fashion to block 2120 of FIG. 21.

With regard to the removal of a channel with live traffic, in certain embodiments of the invention, the source nodes of any allocated path(s) that includes the link and uses the removed channel execute a redundancy (protection) scheme for those of the path(s) that are protected. These source nodes can learn of the failure any number of ways. For example, these access nodes may learn responsive to the operations in FIGS. 21 and 22—In particular, each involved access node (the access nodes connected by the link with the channel and the access nodes that receive an update add/remove channel message), determines if they are the source node of any allocated path(s) that includes the link and uses the removed channel. As another example, these access nodes may learn due to detection of a loss of light; specifically, when an access node detects a loss of light on a channel of a link connected to it, it determines if it is the source node of any allocated path that uses the channel on which a loss of light was detected.

Link Removal

Figure 23:
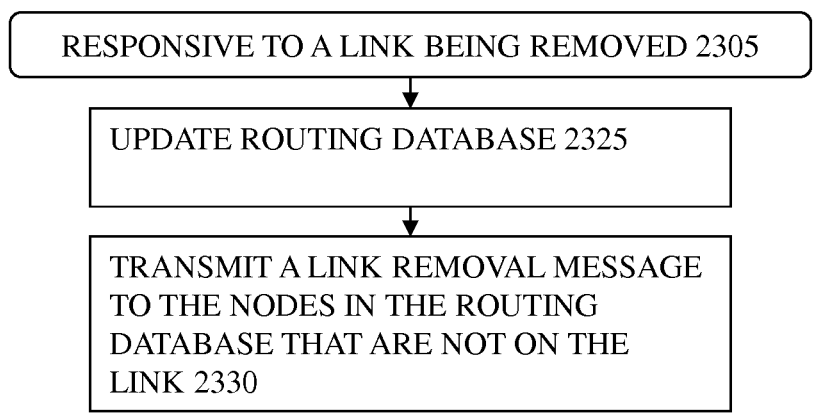
FIG. 23 is a flow diagram illustrating the operations performed by the access nodes connected by the removed link according to certain embodiments of the invention.
Figure 24:
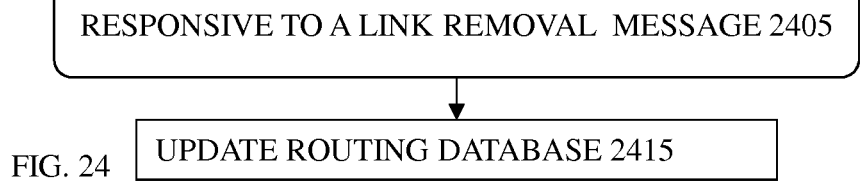
FIG. 24 is a flow diagram illustrating the operations performed by an access node responsive to receiving a link removal message according to certain embodiments of the invention.

When a link is removed (e.g., it fails or is permanently removed) between two nodes within the network, all the channels on that link are lost. When a link is removed, the link state database is updated in the access nodes connected to the link (e.g., in certain embodiments of the invention, LMP recognizes the removal of the link). While certain embodiments perform the channel removal operations of FIGS. 21 and 22 for each such channel, other embodiments of the invention reduce the number of messages generated by addressing the link as a whole. In particular, FIGS. 23 and 24 are flow diagrams illustrating operations performed when a link is removed according to certain embodiments of the invention. The operations of FIG. 23 are performed by the access nodes connected by the link (also referred to as the adjoining nodes or the access nodes made adjacent by that link). As part of these operations, a link removal message is transmitted to certain other nodes. The operations of FIG. 24 are performed by an access node responsive to such a link removal message.

FIG. 23 is a flow diagram illustrating the operations performed by the access nodes connected by the removed link according to certain embodiments of the invention.

In block 2325, the routing database is updated and control passes block 2330. In certain embodiments of the invention, any paths in the routing database that include the removed link are marked down and any of the channels in these path's path channel set(s) that are in common with the link channel set of the removed link are marked broken (indicating that the channel(s) cannot be used). In other embodiments of the invention, alternative marking schemes may be used (e.g., only the paths or the channels are altered). While in certain embodiments of the invention channels and/or paths marked broken/down are maintained indefinitely, other embodiments of the invention delete such channels and paths after a period of time if the link is not reestablished. In other embodiments of the invention, these path(s) and channels are simply deleted immediately and added back in (see the link addition section) if they are reestablished.

As shown in block 2330, a link removal message is transmitted to the nodes in the routing database that are not on the link. In certain embodiments of the invention, each link removal message includes an identification of the link (the adjacent node IDs and the ports) and an update ID. The adjacent nodes identified are the access nodes connected to the removed link. The message is sent to all destination nodes in the routing database other than the nodes made adjacent by the link. While in some embodiments of the invention, both adjacent nodes send out such a message, in alternative embodiments of the invention a selection may be made such that only one adjacent node sends out such a message (e.g., selection may be based on IP address).

FIG. 24 is a flow diagram illustrating the operations performed by an access node responsive to receiving a link removal message according to certain embodiments of the invention. As shown in block 2410, it is determined if the routing database includes path(s) with the removed link. If not, control passes to block 2420. If so, control passes to block 2415. In certain embodiments of the invention, block 2410 is performed by searching the routing database for the link identified in the received link removal message.

In block 2415, the routing database is updated and control passes block 2420. In certain embodiments of the invention, any paths in the routing database that include the removed link are marked down and any of the channels in these path's (identified in block 2410) path channel set(s) that are in common with the link channel set of the removed link are marked broken (indicating that the channel(s) cannot be used). In other embodiments of the invention, alternative marking schemes may be used (e.g., only the paths or the channels are altered). While in certain embodiments of the invention channels and/or path(s) marked broken/down are maintained indefinitely, other embodiments of the invention delete such channels and paths after a period of time if the link is not reestablished. In other embodiments of the invention, these path(s) and channels are simply deleted immediately and added back in (see the link addition section) if they are reestablished.

With regard to the removal of a link with live traffic, in certain embodiments of the invention, the source nodes of any allocated path(s) that includes the link execute a redundancy (protection) scheme for those of the path(s) that are protected. These source nodes can learn of the failure any number of ways. For example, these access nodes may learn responsive to the operations in FIGS. 23 and 24—In particular, each involved access node (the access nodes connected by the removed link and the access nodes that receive the link removal message), determines if they are the source node of any allocated path(s) that includes the link. As another example, these access nodes may learn due to detection of a loss of light; specifically, when an access node detects a loss of light on a link connected to it, it determines if it is the source node of any allocated path(s) that uses the link on which a loss of light was detected.

Link Addition

Figure 25:
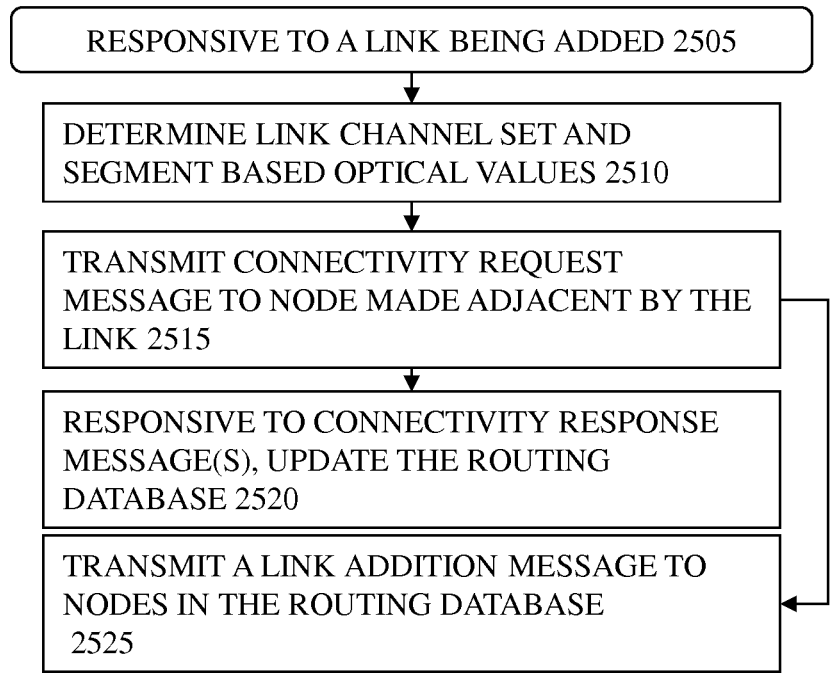
FIG. 25 is a flow diagram illustrating the operations performed by the access nodes connected by the added link according to certain embodiments of the invention.
Figure 26:
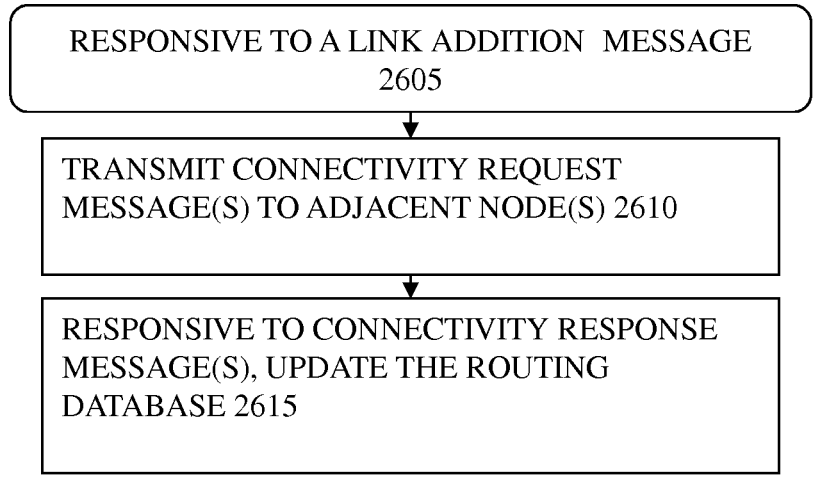
FIG. 26 is a flow diagram illustrating the operations performed by an access node responsive to receiving a link addition message according to certain embodiments of the invention.

When a link is added, the link state database is updated in the access nodes connected to the link (e.g., in certain embodiments of the invention, LMP recognizes the new link). When a link is added between two nodes within the network, a number of channels on that link can be available all at once. While certain embodiments perform the channel addition operations of FIGS. 21 and 22 for each such channel, other embodiments of the invention reduce the number of messages generated by addressing the link as a whole. In particular, FIGS. 25 and 26 are flow diagrams illustrating operations performed when a link is added according to certain embodiments of the invention. The operations of FIG. 25 are performed by the access nodes connected by the link (also referred to as the adjoining nodes or the access nodes made adjacent by that link). As part of these operations, a link addition message is transmitted to certain other nodes. The operations of FIG. 26 are performed by an access node responsive to such a link addition message.

FIG. 25 is a flow diagram illustrating the operations performed by the access nodes connected by the added link according to certain embodiments of the invention. In block 2510, the link channel set and segment based optical values are determined and control passes to block 2515. In certain embodiments of the invention, block 2510 is performed in a similar manner to block 1315, with the exception that only the added link is processed.

As shown, in block 2515, a connectivity request message is transmitted to the node made adjacent by the link and control passes to blocks 2520 and 2525. In certain embodiments, block 2515 is performed in a similar manner to block 1410.

In block 2520, the routing database is updated responsive to connectivity response messages received. In certain embodiments of the invention, block 2520 is performed in a similar manner to blocks 1405 and 1415 of FIG. 14 with a variation. With regard to the variation on block 1405, the routing database is populated with the access node (if not already present) made adjacent by the added link. With regard to the variation on block 1415, since certain data already exists in the routing database, the received data in the connectivity response messages is used to update the existing routing database (add what is not already present, alter channel and/or path statuses, etc.).

In block 2525, a link addition message is transmitted to nodes in the routing database. In certain embodiments, each link addition message includes an identification of the link (the adjacent node IDs and the ports) and an update ID. While in some embodiments of the invention, both adjacent nodes send out such a message, in alternative embodiments of the invention a selection may be made such that only one adjacent node sends out such a message (e.g., selection may be based on IP address).

FIG. 26 is a flow diagram illustrating the operations performed by an access node responsive to receiving a link addition message according to certain embodiments of the invention.

As shown, in block 2610, connectivity request message(s) are transmitted to the adjacent node(s) and control passes to block 2615. In certain embodiments, block 2610 is performed in a similar manner to block 1410.

In block 2615, the routing database is updated responsive to connectivity response messages received. Block 2615 is performed in a similar fashion to block 1415 of FIG. 14 with a variation. With regard to the variation on block 1415, since certain data already exists in the routing database, the received data in the connectivity response messages is used to update the existing routing database (add what is not already present, alter channel and/or path statuses, etc.).

Node Removal

Figure 27:
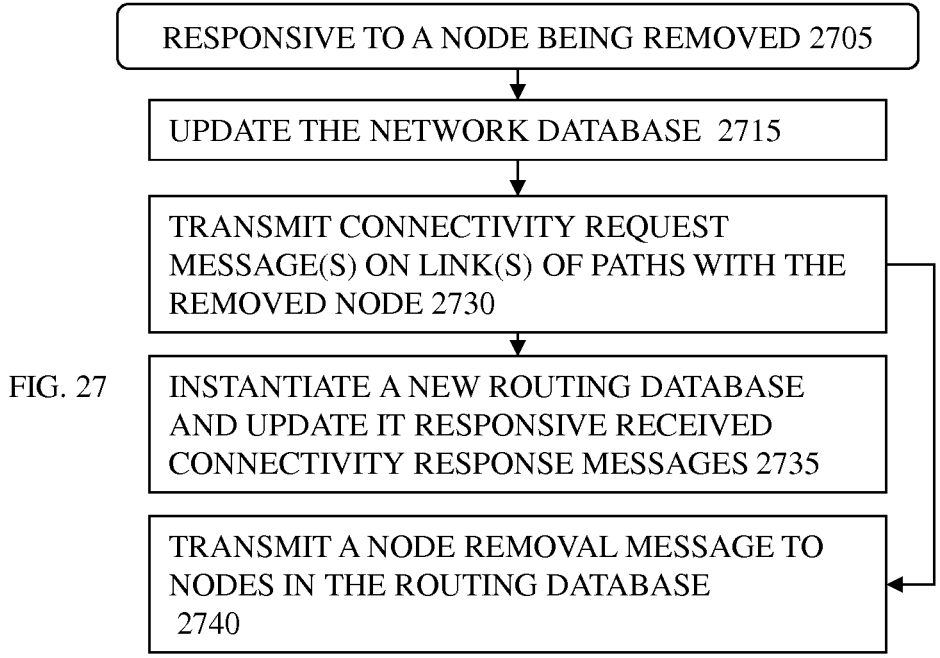
FIG. 27 is a flow diagram illustrating the operations performed by the access node(s) adjacent a removed node according to certain embodiments of the invention.
Figure 28:
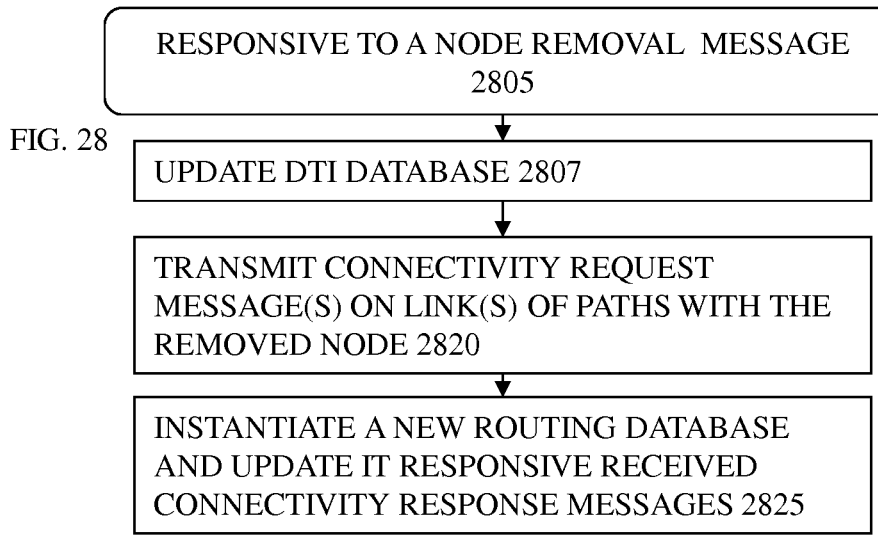
FIG. 28 is a flow diagram illustrating the operations performed by an access node responsive to receiving a node removal message according to certain embodiments of the invention.

When a node is removed, the link state database is updated in the adjacent access node(s) (e.g., in certain embodiments of the invention, LMP recognizes the removal of the node). When a node is removed, the channels on its link(s) are no longer available all at once. In certain embodiments of the invention, the link removal operations of FIGS. 23 and 24 are performed for each such link; and, in certain embodiments of the invention, added to each of FIGS. 23 and 24 are the operations of: if all the paths to a particular destination node have a path status of down, then that node and all paths that include that node (as a destination or intermediate node) are deleted. While certain embodiments perform the link removal operations of FIGS. 23 and 24 for each such link or the channel removal operations of FIGS. 21 and 22 for each channel on each such link, other embodiment of the invention reduce the number of messages generated by addressing the node as a whole. In particular, FIGS. 27 and 28 are flow diagrams illustrating operations performed when a node is removed according to certain embodiments of the invention. The operations of FIG. 27 are performed by the adjacent access node(s). As part of these operations, a node removal message is transmitted to certain other nodes. The operations of FIG. 28 are performed by an access node responsive to such a node removal message.

FIG. 27 is a flow diagram illustrating the operations performed by the access node(s) adjacent a removed node according to certain embodiments of the invention.

In block 2715, the network database is updated and control passes to block 2730. In certain embodiments of the invention, block 2715 is performed by removing: 1) from the routing database the removed node as it appears as a destination (e.g., if the exemplary database of FIG. 8 is used, if the removed node is in a destination 800); and 2) from the DTI database the transmit/receive capabilities of the DWDM transceiver interfaces, if any, for the removed node.

As shown, in block 2730, connectivity request message(s) are transmitted on link(s) of paths with the removed node and control passes to blocks 2735 and 2740. In certain embodiments of the invention, the paths that include the removed node are determined by searching the routing database for the presence of the removed node. The access node transmits a connectivity request message on each of its links that are part of these paths.

In block 2735, a new routing database is instantiated and updated responsive to connectivity response messages received. In certain embodiments, block 2735 is performed in a similar manner as blocks 1405 and 1415 with a variation. In particular, the new routing database preserves the channel states from the current routing database (which is kept until the new routing database is completed).

In block 2740, a node removal message is transmitted to nodes in the routing database. In certain embodiments of the invention which instantiate a new routing database as in block 2735, the routing database used for block 2730 is the current routing database. In certain embodiments, each link removal message includes a removed node ID and an update ID. While in some embodiments of the invention, each adjacent node sends out such a message, in alternative embodiments of the invention a selection may be made such that only one adjacent node sends out such a message (e.g., selection may be based on IP address)

FIG. 28 is a flow diagram illustrating the operations performed by an access node responsive to receiving a node removal message according to certain embodiments of the invention.

In block 2807, the DTI database is updated and control passes to block 2820. In certain embodiments of the invention, block 2807 is performed by removing from the DTI database the transmit/receive capabilities of the DWDM transceiver interfaces, if any, for the removed node.

As shown, in block 2820, connectivity request message(s) are transmitted on link(s) of paths with the removed node and control passes to block 2825. In particular, the access node transmits a connectivity request message on each of its links that are part of these paths.

In block 2825, a new routing database is instantiated and updated responsive to connectivity response messages received. In certain embodiments, block 2825 is performed in a similar manner as blocks 1405 and 1415 with a variation. In particular, the new routing database preserves the channel states from the current routing database (which is kept until the new routing database is completed).

While in certain embodiments of the invention, nodes, their paths, and their entries in the DTI database are deleted immediately and added back in (see the node addition section) if they are reestablished, alternative embodiments provide other mechanisms (e.g., marking down and either maintaining indefinitely or deleting after a period of time if the node is not reestablished, etc.).

With regard to the removal of a node with live traffic, in certain embodiments of the invention, the source nodes of any allocated path(s) that includes the removed node execute a redundancy (protection) scheme for those of the path(s) that are protected. These source nodes can learn of the failure any number of ways. For example, these access nodes may learn responsive to the operations in FIGS. 27 and 28—In particular, each involved access node (the access nodes adjacent the removed node and the access nodes that receive the node removal message), determines if they are the source node of any allocated path(s) that includes the removed node. As another example, these access nodes may learn due to detection of a loss of light; specifically, when an access node detects a loss of light on a link connected to it, it determines if it is the source node of any allocated path(s) that use the link on which a loss of light was detected.

Node Addition

Figures 29, 30:
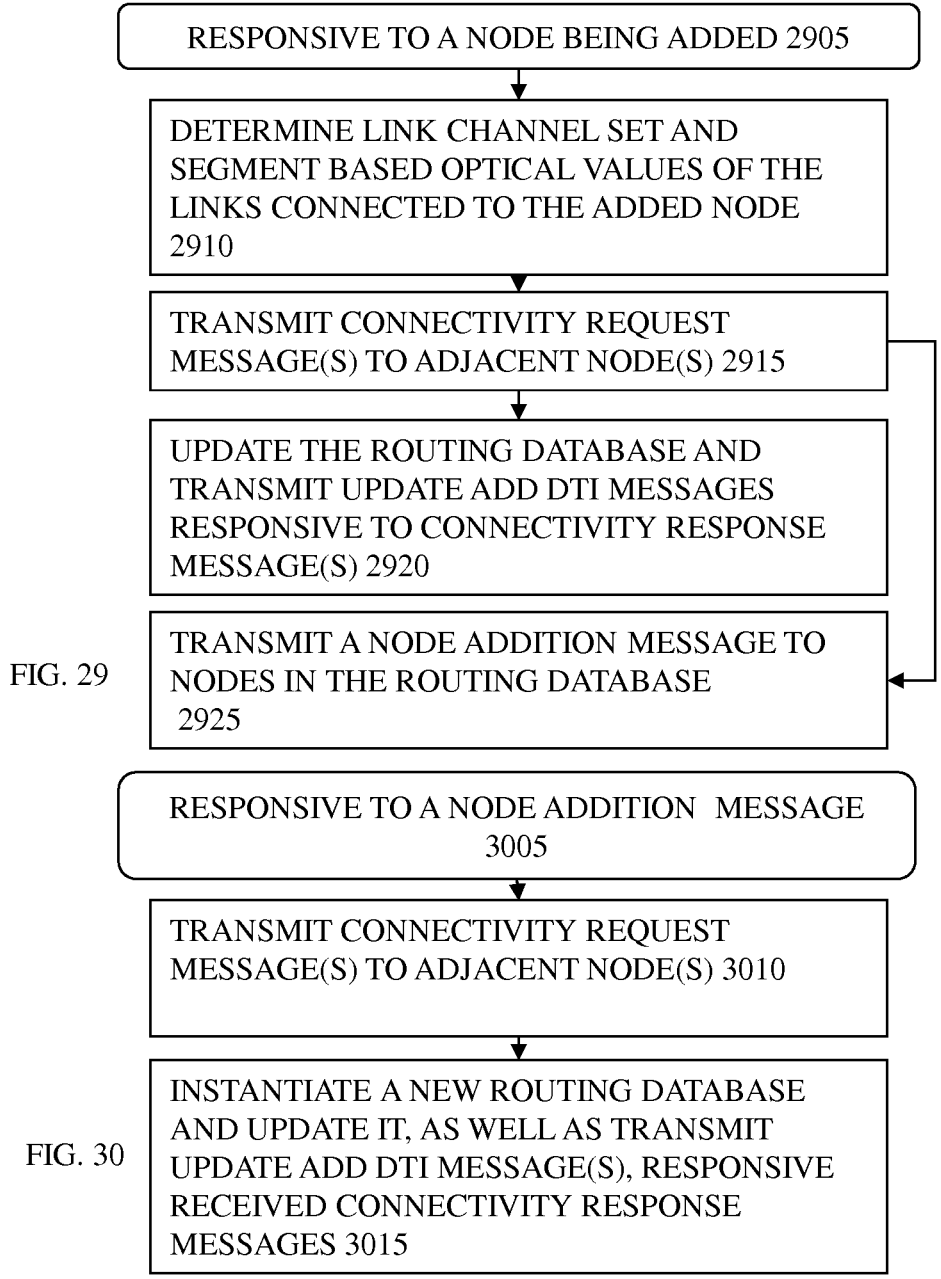
FIG. 29 is a flow diagram illustrating the operations performed by the access node(s) connected to the new node according to certain embodiments of the invention.
FIG. 30 is a flow diagram illustrating the operations performed by an access node responsive to receiving a node addition message according to certain embodiments of the invention.

When a node is added, the added node performs the flows in FIGS. 13 and 14. In addition, the link state database is updated in the adjacent access node(s) (e.g., in certain embodiments of the invention, LMP recognizes the addition of the node). Additionally, for each of the adjacent nodes, there has effectively been one or more links added to the new node. While certain embodiments perform the link addition operations of FIGS. 25 and 26 for each such link or the channel addition operations of FIGS. 21 and 22 for each channel on each such link, other embodiment of the invention reduce the number of messages generated by addressing the node as a whole. In particular, FIGS. 29 and 30 are flow diagrams illustrating operations performed when a node is added according to certain embodiments of the invention. The operations of FIG. 29 are performed by the existing node(s) adjacent to the added node. As part of these operations, a node addition message is transmitted to certain other nodes. The operations of FIG. 30 are performed by an access node responsive to such a node addition message.

FIG. 29 is a flow diagram illustrating the operations performed by the access node(s) connected to the new node according to certain embodiments of the invention. In block 2910, the link channel set and segment based optical values for the links to the added node are determined and control passes to block 2915. In certain embodiments of the invention, block 2910 is performed in a similar manner to block 1315, with the exception that only the link(s) to the added node are processed.

As shown, in block 2915, connectivity request message(s) are transmitted to the adjacent node(s) and control passes to blocks 2920 and 2925. In certain embodiments, block 2915 is performed in a similar manner to block 1410.

In block 2920, the routing database is updated and update new DTI messages are transmitted responsive to connectivity response message(s). In certain embodiments of the invention, block 2920 is performed in a similar manner to blocks 1405 and 1415 of FIG. 14 with a variation. With regard to the variation on block 1405, the routing database is populated with the added access node as a first hop (the routing database was already populated with any other adjacent nodes). With regard to the variation on block 1415, since certain data already exists in the routing database, the received data in the connectivity response messages is used to update the existing routing database (add what is not already present, alter channel and/or path statuses, etc.).

In block 2925, a node addition message is transmitted to nodes in the routing database. In certain embodiments, each node addition message includes an identification of the ID of the added node and an update ID. While in some embodiments of the invention, each adjacent nodes send out such a message, in alternative embodiments of the invention a selection may be made such that only one adjacent node sends out such a message (e.g., selection may be based on IP address)

FIG. 30 is a flow diagram illustrating the operations performed by an access node responsive to receiving a node addition message according to certain embodiments of the invention.

As shown, in block 3010, connectivity request message(s) are transmitted to the adjacent node(s) and control passes to block 3015. In certain embodiments, block 3010 is performed in a similar manner to block 1410.

In block 3015, a new routing database is instantiated and updated, as well as update new DTI messages transmitted, responsive to connectivity response messages received. In certain embodiments, block 3015 is performed in a similar manner as blocks 1405 and 1415 with a variation. In particular, the new routing database preserves the channel states from the current routing database (which is kept until the new routing database is completed). In addition, the DTI database already has data, and is thus is updated based on the received information.

DTI Addition/Removal

Figure 31:
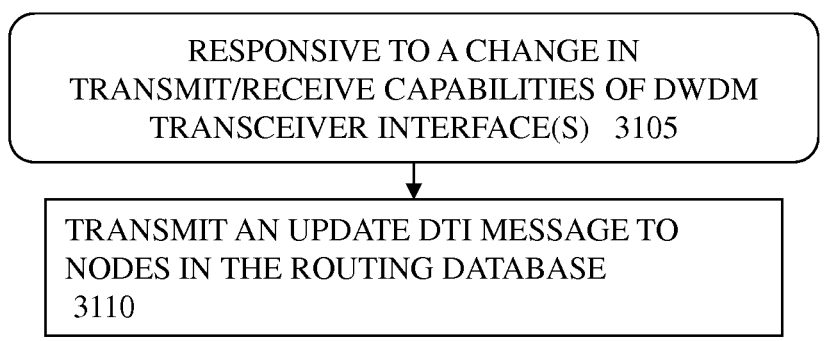
FIG. 31 is a flow diagram illustrating the operations performed by an access node responsive to a change in the transmit/receive capabilities of one or more of its DWDM transceiver interfaces according to certain embodiments of the invention.

FIG. 31 is a flow diagram illustrating the operations performed by an access node responsive to a change in the transmit/receive capabilities of one or more of its DWDM transceiver interfaces according to certain embodiments of the invention. In certain embodiments, such changes may be recognized by the node's internal status monitoring system.

In block 3110, an update DTI message is transmitted to the nodes in the routing database. In the case of the addition of transmit/receive capabilities (e.g., one or more new DWDM transceiver interfaces being added, a failed DWDM transceiver interface being repaired, etc.), an update add DTI message is transmitted. In the case of the removal of transmit/receive capabilities (e.g., one or more new DWDM transceiver interfaces being removed, a failure of a DWDM transceiver interface, etc.), an update remove DTI message is transmitted. In certain embodiments, each update add/remove DTI message includes the source node ID, as well as the transmit/receive capabilities of the internal DWDM transceiver interface(s) of the node that changed.

Service Level Changes

In certain embodiments of the invention, the service provider may update the path dependent optical service levels and push a fresh copy on each node. If and when a change is made, certain embodiments of the invention perform the following:
1. The contents of the path dependent optical service level database is copied and kept in the memory.
2. The path dependent optical service level database is populated with new data.
3. Block 1320 is performed to create a new routing database, keeping the existing routing database.
4. The new routing database is used for new connections.
5. The previous service levels are mapped to the current service levels by comparing the requirements.
6. The connection status from the old routing database is mapped to the new routing database to relevant service levels.
7. The old routing database and old path dependent optical service level database are deleted.

Of course, alternative embodiments may handle such changes in other ways.

Exemplary Load Balancing

Where there are multiple shortest paths available, the issue of load balancing comes into play. For instance, certain embodiments of the invention implement load balancing to allow the service provider some options. Specifically, when a demand is received, there can either be: 1) a set of multiple shortest paths; or 2) a single shortest path. Where there is a set of multiple shortest paths, wavelengths are selected from each member of the set in round robin fashion. However, when there is a single shortest path, different schemes may be used. For example, in one scheme, a threshold is specified (e.g., specified by the service provider) for any link in the network. If the number of channels crosses the threshold on that link, then that link becomes unavailable for any future demand. This allows the service provider to tailor the traffic flow on the network. In another scheme, a distribution ratio system is used. Specifically, the ratio is the number of new paths "allocated to non-shortest path" to "the shortest path."

Exemplary Contention Resolution

Since requests for paths by different access nodes may overlap, there is a need for contention resolution. Certain embodiments of the invention resolve contention issues by giving priority to the source with the higher IP number. However, this brings in a special case where a source node may be receiving demand request at a higher frequency than the other source node. The other source node, thus, potentially may starve.

Other embodiments of the invention may use one of the following exemplary contention resolution schemes to overcome this deficiency.
1. One such scheme is to pre-allocate a lightpath for the next demand in advance. This result in each access node preallocating lightpaths to each accessible node at each service level. As such, this scheme can put a relatively high amount of strain on network resources.
2. Another such scheme is referred to herein as highest service level preallocation. Instead of preallocating lightpaths to each accessible node for each service level, this is done only for the highest service level. In the case of an unfavorable settlement of contention during demand allocation, the demand is allocated on the preallocated lightpath at the highest service level. As such, this scheme puts a relatively lower amount of strain on network resources, but can cause the highest service level lightpaths to get used up the fastest.
3. Yet another such scheme is referred to herein as default service level preallocation. In particular, for each source to destination pair, an indication of the default service level is maintained (e.g., the most common service level for historically received demands). Instead of preallocating lightpaths to each accessible node for each service level or preallocating lightpaths to each accessible node at the highest service level, preallocation is done only for the default service level for each source to destination pair. In the case of an unfavorable settlement of contention during demand allocation, the demand is allocated on the preallocated lightpath at the default service level. As such, this scheme puts a relatively lower amount of strain on network resources than scheme 1 and attempts to avoid using up the highest service level the fastest by predicting the most common service level.

Aggregating

While embodiments have been described in which separate messages are transmitted, alternative embodiments aggregate different ones of such messages. For instance, certain embodiments aggregate messages for routing database updates and DTI database updates.

Alternative Embodiments

While various embodiments of the invention have been described, alternative embodiments of the invention can operate differently. For instance, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

As another example, while embodiments of the invention have been described in which the recipients of messages (e.g., the update allocate and deallocate channel message, the update channel add/remove messages, the link removal and addition messages, the node removal and addition message, etc.) are selected a particular way, alternative embodiments of the invention may use other ways. For example, an alternative embodiment of the invention may try to reduce communications between nodes by using a sent-to-set. By way of particular example, assuming that a node determines an event has occurred which requires it to initiate a message (e.g., an update allocate channel message), the node would form the message to additionally include a sent-to-set. The sent-to-set represents the set of nodes to which the message is going to be sent. While the nodes to which the message is to be sent can be determined in a variety of ways, certain embodiments of the invention parse the routing database to identify all of the nodes (removing duplicates) apart from the source node to which there are available paths. Responsive to receiving a message with a sent-to-set, a recipient node (in addition to taking the needed actions identified in the message) would select the nodes in its routing database that are not identified in the received message. In certain embodiments of the invention, this includes: 1) identifying as "new set" all of the nodes in the routing database for which the update is relevant (e.g., are included in available paths affected) that are not in the sent-to-set in the received message; and 2) forming an updated version of the sent-to-set that is the union of the new set and the sent-to set in the received message. Then, the message, updated with the updated version of the set-to-set, is transmitted by the recipient node to the nodes in the new set.

As another example, while certain embodiments of the invention have been described with respect to distributed search techniques for building/maintaining network databases and with respect to a source based scheme, alternative embodiments could be implemented different ways or combinations of ways (e.g., centralized network database building/maintaining, centralized provisioning, hybrids, etc.). As another example, while certain embodiments have been described with reference to FIGS. 12-31 that determine path based optical values as part of the connectivity request and response messages, alternative embodiments may determine path based quality values as part of the connectivity request and response messages (e.g., where the path based quality values are not dependent on bit rate, where only one bit rate is supported, where the path based quality requirements are determined for each bit rate supported, etc.); such embodiments may store these values in addition to or instead of the path base optical values in the routing database. As another example, while certain embodiments have been described with reference to FIGS. 12-31 that determine path based optical values as part of the connectivity request and response messages, alternative embodiments may determine qualification for path dependent optical service levels as part of the connectivity request and response messages; such embodiments may store these qualifications in addition to or instead of the path base optical values in the routing database.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for performing a path based quality check for a specified bit rate in a wavelength division multiplexing optical network comprising:
    selecting from a database, which stores a representation of available paths from an access node of the optical network to other access nodes of the optical network, one of the available paths as a currently selected path, wherein said database also stores a representation of wavelengths available on each of the available paths, and wherein an available path is a series of two or more nodes each connected by an optical link on which a set of wavelengths is available for establishing a lightpath;
    determining cumulative noise for the currently selected path;
    determining a maximum allowable noise for the specified bit rate;
    determining cumulative chromatic dispersion of the currently selected path;
    determining a maximum allowable chromatic dispersion for the specified bit rate;
    determining whether the currently selected path passes the path based quality check based on whether the cumulative noise for the currently selected path is less than the maximum allowable noise at the specific bit rate and whether the chromatic dispersion is less than the maximum allowable chromatic dispersion at the specified bit rate.

2. The method of claim 1, wherein the database also stores a representation of cumulative noise and cumulative chromatic dispersion for each of the available paths, and wherein said determining the cumulative noise and said determining the cumulative chromatic dispersion includes accessing the database.

3. The method of claim 1, wherein the determining the maximum allowable noise includes,
    accessing the maximum allowable noise based from a table, which correlates a plurality of bit error rates (BERs) and a plurality of bit rates to maximum allowable noise levels, based on a specified bit error rate (BER) and the specified bit rate.

4. The method of claim 2, wherein the determining the maximum allowable noise includes,
    accessing the maximum allowable chromatic dispersion from a table, which correlates a chromatic dispersion decibel penalty and a plurality of bit rates to maximum allowable chromatic dispersion levels, based on the specified bit rate.

5. The method of claim 1, further comprising:
    determining a number of hops of the currently selected path;
    determining a maximum number of hops allowed at the specified bit rate;
    wherein the determining whether the currently selected path passes the path based quality check is also based on whether the number of hops is less than the maximum number of hops.

* * * * *